US008589845B2

(12) United States Patent
Albrecht et al.

(10) Patent No.: US 8,589,845 B2
(45) Date of Patent: *Nov. 19, 2013

(54) OPTIMIZING INTEGRATED CIRCUIT DESIGN THROUGH USE OF SEQUENTIAL TIMING INFORMATION

(76) Inventors: Christoph Albrecht, Berkeley, CA (US);
Philip Chong, Berkeley, CA (US);
Andreas Kuehlmann, Berkeley, CA (US); Ellen Sentovich, Berkeley, CA (US); Roberto Passerone, Trento (IT)

( * ) Notice: Subject to any disclaimer, the term of this patent is extended or adjusted under 35 U.S.C. 154(b) by 633 days.

This patent is subject to a terminal disclaimer.

(21) Appl. No.: 12/624,395

(22) Filed: Nov. 23, 2009

(65) Prior Publication Data

US 2010/0115477 A1 May 6, 2010

Related U.S. Application Data

(63) Continuation of application No. 11/743,356, filed on May 2, 2007, now Pat. No. 7,624,364.

(51) Int. Cl.
*G06F 17/50* (2006.01)
(52) U.S. Cl.
USPC .......................................... 716/113; 716/114
(58) Field of Classification Search
USPC ................................................. 716/110–114
See application file for complete search history.

(56) References Cited

U.S. PATENT DOCUMENTS

| 6,763,506 | B1 | 7/2004 | Betz et al. |
| 7,137,090 | B1 | 11/2006 | Manaker et al. |
| 7,222,318 | B2 | 5/2007 | Srinivasan |
| 7,559,040 | B1 * | 7/2009 | Albrecht et al. ............... 716/132 |
| 7,624,364 | B2 | 11/2009 | Albrecht et al. |
| 2003/0009734 | A1 * | 1/2003 | Burks et al. ........................ 716/6 |
| 2004/0216064 | A1 * | 10/2004 | Gass ................................. 716/7 |

OTHER PUBLICATIONS

"U.S. Appl. No. 11/743,356, Non Final Office Action mailed Oct. 17, 2008", 10 pgs.
"U.S. Appl. No. 11/743,356, Notice of Allowance mailed Sep. 9, 2009", 7 pgs.
"U.S. Appl. No. 11/743,356, Preliminary Amendment filed Nov. 9, 2007", 5 pgs.
"U.S. Appl. No. 11/743,356, Response filed Mar. 17, 2009 to Non Final Office Action mailed Oct. 17, 2008", 14 pgs.
"U.S. Appl. No. 11/373,670, filed Mar. 10, 2006, entitled Optimization of Combinational Logic Synthesis Through Clock Latency Scheduling, invented by C. Albrecht, A. Kuehlmann, D. Seibert and S. Richter".

(Continued)

*Primary Examiner* — Binh Tat
(74) *Attorney, Agent, or Firm* — Holland & Knight LLP; Mark H. Whittenberger, Esq.

(57) ABSTRACT

A method is provided that includes: determining a minimum clock cycle that can be used to propagate a signal about the critical cycle in a circuit design; wherein the critical cycle is a cycle in the design that has a highest proportionality of delay to number of registers; determining for a circuit element in the circuit design, sequential slack associated with the circuit element; wherein the sequential slack represents a minimum delay from among respective maximum delays that can be added to respective structural cycles of which the circuit element is a constituent, based upon the determined limit upon clock cycle duration; using the sequential slack to ascertain sequential optimization based design flexibility throughout multiple stages of a design flow.

14 Claims, 25 Drawing Sheets

(56) References Cited

OTHER PUBLICATIONS

Albrecht, C, et al., "Maximum mean weight cycle in a digraph and minimizing cycle time of a logic chip", Discrete Applied Mathematics, vol. 123, (Nov. 2002), 103-127.

Albrecht, C., et al., "Cycle Time and Slack Optimization for VLSI-Chips", Digest of Technical Papers, IEEE/ACM International Conference onComputer-Aided Design, (1999), 232-238.

Allen, D, et al., "A clock distribution network for microprocessors", Journal of Solid-State Circuits, vol. 36, No. 5, (2001), 792-799.

Brayton, R K, et al., "Retiming and resynthesis: Optimizing sequential networks with combinational techniques", IEEE Transactions on Computer-Aided Design, vol. 10 No. 1, (Jan. 1991), 74-84.

Broderson, R, et al., "Methods for true power minimization", Digest of Technical Papers of the IEEE International Conference on Computer-Aided Design, (San Jose, California), (Nov. 2002), 35-42.

Caldwell, A E, et al., "Can recursive bisection alone produce routable placements?", ACM/ IEE Design Automation Conference, (2000), 477-482.

Carrig, K M, et al., "Chip clocking effect on performance for IBM's SA-27E ASIC technology", IBM Micronews vol. 6, No. 3, (2000), 12-16.

Chao, L, et al., "Retiming and clock skew for synchronous systems", IEEE international Symposium on Circuits and Systems (ISCAS '94), (1994), 226-233.

Chaudhary, K, et al., "Ritual: A performance-driven placement algorithm", IEEE Transactions on Circuits and Systems, vol. 39, No. 11, (Nov. 1992), 825-839.

Chong, P, et al., "Physical Placement Driven by Sequential Timing Analysis", ICCAD, (Nov. 2004), 379-386.

Cohen, G, et al., "Numerical computation of spectral elements in max-plus algebra", Proceedings of the IFAC Conference on System Structure and Control, (Jul. 1998).

Cong, J, et al., "Incremental cad", Digest of Technical Papers of the IEEE/ACM International Conference on Computer-Aided Design, (San Jose, California), (Nov. 2000), 236-243.

Cong, J, et al., "Physical planning with retiming", Digest of Technical Papers of the IEEE/ACM International Conference on Computer-Aided Design (San Jose, CA), (Nov. 2000), 2-7.

Dai, W, et al., "Useful-skew clock routing with gate sizing for low power design", Proceedings of the 33rd ACM/IEEE Design Automation Conference, (Las Vegas, NV), (Jun. 1996), 383-388.

Dasdan, A, et al., "An experimental study of minimum mean cycle algorithms", Tech. Rep. UCI-ICS 98-32, University of Illinois at Urbana-Champaign, (1998).

Fishburn, J. P, "Clock Skew Optimization", IEEE Transactions on Computers, 39, (Jul. 1990), 945-951.

Friedman, E G, et al., "Timing Optimization through Clock Skew Scheduling", Boston, Dordrecht, London: Kluwer Academic Publicsher, (2000), Table of Contents Only.

Held, S, et al., "Clock scheduling and clocktree construction for high-performance ASICs", Digest of Technical Papers of the IEEE/ACM International Conference on Computer-Aided Design, (San Jose, California), (Nov. 2003), 232-239.

Hsu, C, et al., "Proud: A sea-of-gates placement algorithm", IEEE Design & Test of Computers vol. 5, (Dec. 1988), 44-56.

Johannes, F M, et al., "GORDIAN: A global optimization / rectangle dissection method for cell placement", Digest of Technical Papers of the IEEE International Conference on Computer-Aided Design, (Santa Clara, California), (Nov. 1988), 506-509.

Koh, C, et al., "UST/DME: a clock tree router for general skew constraints", Digest of Technical Papers of the IEEE/ACM International Conference on Computer-Aided Design (San Jose, California), (Nov. 2000), 400-405.

Kuehlmann, A, et al., "Multi-domain clock skew scheduling", Digest of Technical Papers of the IEEE/ACm International Conference on Computer-Aided Design, (San Jose, California), (Nov. 2003), 801-808.

Leiserson, C, et al., "Optimizing synchronous systems", Journal of VLSI and Computer Systems vol. 1 No. 1, (Jan. 1983), 41-67.

Leiserson, C, et al., "Retiming synchronous circuitry", Algorithmica vol. 6, (1991), 5-35.

Madigan, C F, et al., Chaff: Engineering an efficient SAT solver, Proceedings of the 38th ACM/IEEE Design Automation Conference, (Las Vegas, Nevada), (Jun. 2001), 530-535.

Rudell, R., et al., "Efficient implementation of retiming", Digest of Technical Papers of the IEEE/ACM International Conference on Computer-Aided Design (San Jose, California), (Nov. 1994), 226-233.

Tsay, R S, et al., "An exact zero-skew clock routing algorithm", IEEE Transactions on Computer-Aided Design of Integrated Circuits and Systems, vol. 12, No. 2, (Feb. 1993), 242-249.

* cited by examiner

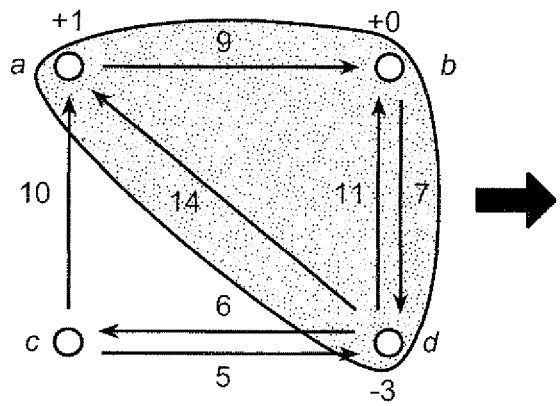
FIG. 10A
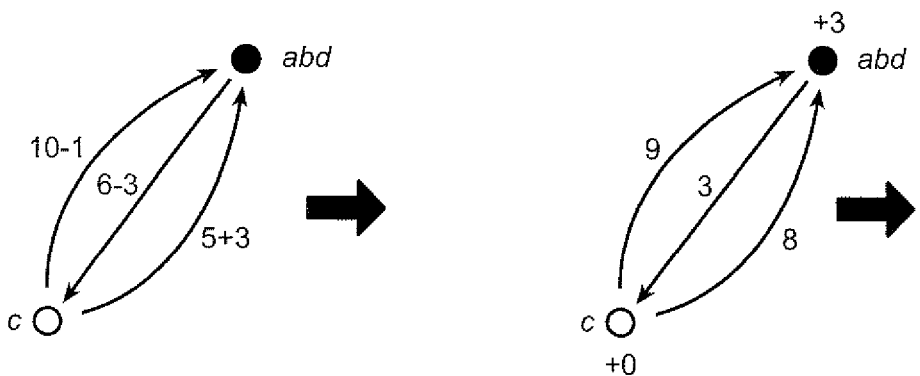
FIG. 10B      FIG. 10C
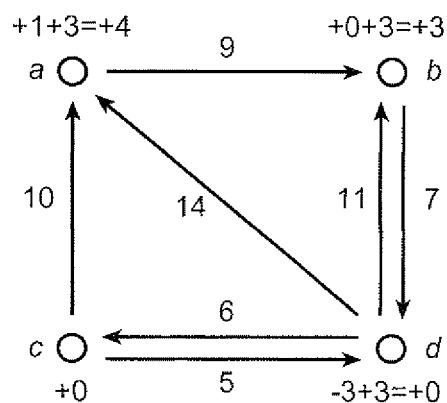
FIG. 10D

Combinational slack distributions for design d4743827 (clock period 4020ps), before and after latency assignment.

After latencies are computed with the balance algorithm.

Combinational slack distributions for design d4743827 (clock period 4020ps), before and after latency assignment.

| | | | | | | Synthesize-incremental | | | Synthesize | | |
|---|---|---|---|---|---|---|---|---|---|---|---|
| Design | PI | PO | FF | Paths | Objective | LS | 2 (BA + LS) | Improvement | LS | 2 (BA + LS) | Improvement |
| s35932 | 36 | 320 | 1728 | 4527 | clock period<br>area | 435<br>131169 | 428<br>109849 | -1.61%<br>-16.25% | 458<br>112699 | 427<br>92305 | -6.77%<br>-18.10% |
| s38417 | 30 | 106 | 1564 | 33232 | clock period<br>area | 911<br>97653 | 835<br>91559 | -8.34%<br>-6.24% | 898<br>107270 | 988<br>91295 | 10.02%<br>-14.89% |
| s38584 | 40 | 304 | 1274 | 13300 | clock period<br>area | 908<br>73323 | 792<br>72063 | -12.78%<br>-1.72% | 894<br>78961 | 796<br>74239 | -10.96%<br>-5.98% |
| s13207 | 64 | 152 | 626 | 3146 | clock period<br>area | 898<br>28956 | 604<br>28834 | -32.74%<br>-0.42% | 872<br>27343 | 600<br>25948 | -31.19%<br>-5.10% |
| s15850 | 79 | 150 | 513 | 11582 | clock period<br>area | 871<br>31100 | 773<br>29044 | -11.25%<br>-6.61% | 929<br>29599 | 750<br>29570 | -19.27%<br>-0.10% |
| Average Academic | | | | | clock period<br>area | | | -13.34%<br>-6.25% | | | -11.65%<br>-8.83% |
| design1 | 34 | 36 | 1472 | 111074 | clock period<br>area | 2921<br>216332 | 2421<br>217746 | -17.12%<br>-0.65% | 2885<br>260801 | 2850<br>177623 | 1.21%<br>-31.89% |
| design2 | 148 | 63 | 2236 | 108269 | clock period<br>area | 4546<br>176949 | 4473<br>155230 | -1.61%<br>-12.27% | 4542<br>146093 | 4621<br>123363 | 1.74%<br>-15.56% |
| design3 | 1901 | 1345 | 36641 | 12044072 | clock period<br>area | 10154<br>2702892 | 4594<br>2754891 | -54.76%<br>1.92% | 9576<br>2589811 | 5997<br>2552555 | -37.37%<br>-1.44% |
| design4 | 1095 | 611 | 38477 | 2504314 | clock period<br>area | 3077<br>5093119 | 3000<br>4895114 | -2.50%<br>-3.89% | 4628<br>5101284 | 4299<br>5034357 | -7.11%<br>-1.31% |
| Average Industrial | | | | | clock period<br>area | | | -19.00%<br>-3.40% | | | -10.99%<br>-12.55% |

Table 5.1: Results obtained with RTL Compiler. The first part shows the characteristics of the testcases: the number of primary inputs (PI), primary outputs (PO), registers (FF), and the number of logic paths between primary inputs, primary outputs and registers. The second part shows the results: LS stands for standard logic synthesis either with 'synthesize-incremental' or 'synthesize'. 2 (BA + LS) gives the results obtained by two times running the optimization loop consisting of optimally distributing the slack with the balance algorithm (BA) and logic synthesis based on the newly computed synchronization latencies.

FIG. 20

Initial Timing-driven Placement.

Initial Placement After Assigning Clock Latencies.

Second Timing-driven Placement Using New Clock Latencies.

Second Placement with Critical Cycles After Second Assignment of Clock Latencies.

| Design | Size | Reg | NW MMC | REG MMC | COM MMC | SEQ MMC | SEQ % | SEQ Run | CYCLE MMC | CYCLE % | CYCLE Run | CAPO MMC | CAPO Run | CYvsCA% |
|---|---|---|---|---|---|---|---|---|---|---|---|---|---|---|
| s13207 | 2179 | 626 | 0.87 | 1.77 | 1.37 | 1.36 | 2.4 | 3 | 1.36 | 2.4 | 4 | 1.73 | 4 | 43.0 |
| s15850 | 2496 | 513 | 1.62 | 2.60 | 2.28 | 2.27 | 1.4 | 5 | 2.27 | 1.4 | 7 | 2.36 | 6 | 12.2 |
| s35932 | 8871 | 1728 | 0.62 | 1.83 | 1.65 | 1.64 | 1.3 | 12 | 1.64 | 1.3 | 18 | 2.00 | 23 | 26.1 |
| s38417 | 7544 | 1564 | 0.74 | 1.24 | 1.17 | 1.23 | −14.8 | 12 | 1.22 | −11.0 | 66 | 1.05 | 22 | −54.9 |
| s38584 | 6903 | 1274 | 0.74 | 2.41 | 2.33 | 2.05 | 17.6 | 11 | 2.05 | 17.6 | 15 | 2.33 | 21 | 17.6 |
| Average Academic | | | | | | | 1.58 | | | 2.34 | | | | 8.80 |
| Design 1 | 6038 | 543 | 3.55 | 4.45 | 3.95 | 3.93 | 4.1 | 14 | 3.86 | 21.3 | 23 | 4.12 | 17 | 45.6 |
| Design 2 | 12800 | 106 | 3.36 | 3.37 | 3.36 | 3.36 | −16.2 | 55 | 3.36 | −16.2 | 81 | 3.41 | 33 | 99.9 |
| Design 3 | 13633 | 1154 | 13.55 | 16.21 | 16.43 | 15.94 | 16.9 | 36 | 16.51 | −3.1 | 55 | 15.94 | 52 | −23.9 |
| Design 4 | 26503 | 3986 | 1.06 | 1.60 | 1.60 | 1.47 | 24.1 | 73 | 1.47 | 24.1 | 104 | 1.45 | 118 | −5.1 |
| Design 5 | 56861 | 1189 | 1.37 | 1.80 | 1.71 | 1.59 | 33.7 | 108 | 1.56 | 43.2 | 135 | 1.74 | 260 | 48.6 |
| Design C | 101884 | 15901 | 7.65 | 13.46 | 12.42 | 11.06 | 28.5 | 1660 | 11.06 | 28.5 | 2140 | 11.47 | 688 | 10.7 |
| Design 6 | 116921 | 17124 | 4.20 | 5.06 | 4.70 | 4.38 | 62.6 | 491 | 4.38 | 62.6 | 727 | 4.65 | 633 | 60.0 |
| Design 7 | 137536 | 17650 | 4.27 | 13.18 | 9.10 | 9.75 | −13.5 | 1729 | 9.02 | 1.6 | 3155 | 8.73 | 867 | −6.5 |
| Design 8 | 140729 | 22590 | 7.88 | 10.80 | 9.91 | 10.19 | −14.1 | 573 | 9.14 | 37.9 | 1229 | 10.09 | 809 | 43.0 |
| Design B | 152066 | 18473 | 5.08 | 5.51 | 5.41 | 5.18 | 69.6 | 1892 | 5.16 | 76.8 | 2507 | 5.24 | 1063 | 50.0 |
| Average Industrial | | | | | | | 19.6 | | | 27.7 | | | | 32.2 |

Reg = Number of registers.

Run = Run times in seconds.

*FIG. 23* Experimental results for our prototype tool.

NW = No Wires, REG = Regular QP, COM = Combinational slack-weighted, SEQ = Sequential slack-weighted, CYCLE = Cycle constrained Percentages indicate reduction in wire delay compared to COM; CYvsCA = CYCLE wire delay reduction compared to CAPO.

OPTIMIZING INTEGRATED CIRCUIT DESIGN THROUGH USE OF SEQUENTIAL TIMING INFORMATION

CROSS REFERENCE TO RELATED APPLICATIONS

This application is a continuation of U.S. application Ser. No. 11/743,356 filed on May 2, 2007, entitled "OPTIMIZING INTEGRATED CIRCUIT DESIGN THROUGH USE OF SEQUENTIAL TIMING INFORMATION", which is hereby fully incorporated by reference in its entirety.

BACKGROUND OF THE INVENTION

1. Field of the Invention

The invention relates to designing integrated circuits and more particularly to optimization of circuit designs through sequential timing information.

2. Description of the Related Art

Traditional RTL-to-Layout synthesis has almost exclusively been focused on non-sequential optimization techniques. A design methodology based on fixed register and latch positions that uses a combination of static timing analysis, combinational synthesis, and formal equivalence checking generally provides an effective decomposition of the overall design problem into orthogonal issues which can be dealt with independently. In conjunction with techniques such as a standard-cell place-and-route approach, zero-skew clock distribution, and full or partial scan testing, such a methodology has proven to be robust and predictable, which stimulated broad adoption of the methodology. Complementary to the methodology's appeal from a modeling perspective, this partitioning also supports independent implementation and marketing of the individual components as point tools for which standardized interfaces provide the flexibility to adapt the flow for different needs.

In recent years, the boundaries between different design stages have become more blurred and increasingly integrated approaches have begun to dominate parts of the design methodology. This development is driven in part by the fact that a performance and area compromise made by a vertically partitioned flow does not scale proportionally for increasing chip sizes and shrinking device structures. For example, traditionally, logic synthesis and physical design have been performed by separate tools. In the past, a compact model for a logic function and delay calculation of the individual gates was sufficient to estimate and control the desired design characteristics in both applications. However, the growing chip density and size make abstract modeling of physical effects increasingly difficult. The evolution of a more integrated approach to logic and physical synthesis addresses, among other problems, the growing dominance of wire delays for the overall system performance.

Sequential optimization (SO) techniques have been researched for many years and there are a number of efficient approaches available that are applicable to practical designs. SO has the potential to significantly improve the performance, area, and power consumption of a circuit implementation to a degree that is not achievable with traditional combinational synthesis methods. SO techniques pertain in general to the staging and timing of provision of signals to combinational logic paths in a circuit design.

Sequential synthesis methods of practical interest are retiming, C. Leiserson and J. Saxe, "Optimizing synchronous systems," *Journal of VLSI and Computer Systems*, vol. 1, pp. 41-67, January 1983; C. Leiserson and J. Saxe, "Retiming synchronous circuitry," *Algorithmica*, vol. 6, pp. 5-35, 1991, and clock skew scheduling J. P Fishburn, "Clock skew optimization," *IEEE Transactions on Computers*, vol. 39, pp. 945-951, July 1990. In both methods, the traditionally stated goal is to balance the path delays between registers and thus to maximize the performance of the design without changing its input/output behavior.

Retiming is a structural transformation that moves a registers in a circuit without changing the positions of the combinational gates. Changing register positions has the effect of changing the staging of signals in a design that is changing the location in the design relative to combinational logic paths in the design, at which signals are temporarily stored (i.e. registered). Of course, changing register positions also has the effect of changing the timing of the provision of signals to combinational logic paths in the design. It is traditionally limited to designs with extremely high performance requirements, which are typically developed using a carefully crafted design and verification environment. One reason for a lack of widespread adoption of retiming has been an inability to accurately predict the impact of retiming at early design flow stages upon downstream design flow stages.

Clock skew scheduling preserves the circuit structure, but applies tuned delays to the register clocks—thus virtually moving them in time. Clock skew scheduling—or clock latency scheduling—has the effect of changing the timing of the provision of signals to combinational logic paths in the design. In recent years, clock skew scheduling has been adopted in some design flows as a post-layout optimization technique to reduce the cycle time, I. S. Kourtev and E. G. Friedman, *Timing Optimization through Clock Skew Scheduling*. Boston, Dortrecht, London: Kluwer Academic Publisher, 2000, and the number of close-to-critical paths, C. Albrecht, B. Korte, J. Schietke, and J. Vygen, "Cycle time and slack optimization for VLSI-chips," in *Digest of Technical Papers of the IEEE International Conference on Computer-Aided Design*, pp. 232-238, November 1999.

SO techniques have found only limited acceptance in contemporary ASIC design flows, e.g. in pipeline-retiming during logic synthesis or clock skew scheduling for post-layout cycle-time improvement. SO techniques sometimes have been employed as point applications. That is, SO techniques have been applied to some point in a design flow rather than to the overall design. For instance, previously published work suggests retiming as a repeated point-application interleaved with combinational synthesis (e.g. S. Malik, E. M. Sentovich, R. K. Brayton, and A. Sangiovanni-Vincentelli, "Retiming and resynthesis: Optimizing sequential networks with combinational techniques," *IEEE Transactions on Computer-Aided Design*, vol. 10, pp. 74-84, January 1991). However, computing suitable register positions is computationally expensive and actually not needed in early synthesis stages. Furthermore, such limited usage may commit a design to a specific structure using only local information and missing a significant fraction of the sequential optimization space. An analysis of some ASIC designs suggests that although ordinarily only a small fraction of a given design is likely to be sequentially critical, combinational timing analysis approaches do not reveal this information and thus traditional integrated circuit design techniques cannot take advantage of it.

Sequential optimization (SO) techniques have significant potential to improve the performance of integrated circuit designs and/or decrease their size and power consumption. Despite a rich set of theoretical and practical work on retiming and clock skew scheduling, there has been a need for improved sequential timing analysis to ascertain an improved measure of sequential flexibility (i.e. sequential slack) in order to achieve better design optimization. There also has been a need for improvement in the application of sequential flexibility to circuit design flow. The present invention meets these needs.

SUMMARY OF THE INVENTION

An aspect of the invention includes obtaining a limit upon clock cycle duration. A determination is made for a circuit element in the circuit design, from structural cycles in which the circuit element is a constituent, as to a limit upon addition of structural cycle delay, based upon a clock cycle duration that is not greater than the obtained limit upon clock cycle duration. Therefore, in accordance with an aspect of the invention, a limit upon sequential slack is determined based upon additional delay that can be added in relation to a circuit element consistent with the obtained limit upon cycle duration.

The limit upon clock cycle duration can be made, for instance, by identifying a structural cycle in a circuit design that has a highest proportionality of structural cycle delay to number of registers. This structural cycle is referred to as the critical cycle. A determination is made of a minimum clock cycle duration (i.e. maximum clock rate) that can be used to propagate a signal about that critical structural cycle without incurring a timing violation such as a setup time violation, for example.

Another aspect of the invention involves determining a first measurement of sequential slack associated with a first portion of a circuit design. The first portion of the circuit design may include structural cycles that share a particular circuit element, for example. The first measurement of sequential slack is used to evaluate a first design optimization choice for the first portion of the circuit design in the course of a first stage of an automated circuit design process. A determination is made of a second measurement of sequential slack associated with a second portion of the circuit design. The second portion of the circuit design may include structural cycles that share a different particular circuit element, for example. The second measurement of sequential slack is used to evaluate a second design optimization choice for the second portion of the design in the course of a second stage of the automated circuit design process. Sequential timing within the circuit design is adjusted. Adjustment of circuit timing occurs after completion of the first stage and after commencement of the second stage. In some embodiments, the first stage is a part of 'logical' flow and the second stage is a part of the 'physical' flow. For instance, the first stage may involve one or more operations such as, RTL source optimization, data path optimization or logic optimization, and the second stage may involve one or more operations such as, sequential placement, in-place optimization or post-placement retiming. Alternatively, the first stage may occur later in the design flow than the second stage. For instance, routing, which ordinarily occurs during the physical flow, could affect either one or both of placement or logic optimization in accordance with embodiments of the invention. Moreover, the first and second stages may involve operations within the overall logic stage or within the overall physical stage. For example, the first stage might comprise data path optimization and the second stage might comprise logic optimization. Adjustment of sequential timing may include one or more of clock latency scheduling or retiming, for example. Accordingly, sequential slack can be applied in the course of multiple stages of a circuit design process.

Yet another aspect of the invention involves determining sequential slack associated with a respective register in a circuit design. The determined sequential slack is used to evaluate a first design choice involving a structural cycle in the circuit design in which the register is a constituent. In some embodiments, the first design choice may involve one or more of RTL source optimization, data path optimization or logic optimization, for example. A maximum critical cycle delay within the circuit design is determined. The maximum critical cycle delay is used to select a second design choice in the circuit design that decreases the maximum critical cycle delay. In some embodiments, the second design choice may involve one or more of placement choices or post placement retiming choices. Hence, sequential slack is used to add to flexibility of design choices, and a critical cycle can be used as a guide to reduction in maximum cycle time.

An additional aspect of the invention involves obtaining a limit upon clock cycle duration applicable to the circuit design. A determination is made for each of multiple respective circuit elements in the circuit design, of a respective limit upon addition of structural cycle delay that is not greater than each individual maximal limit of structural cycle delay for each individual structural cycle in which such respective circuit element is a constituent, based upon a clock cycle duration that is not greater than the obtained first limit upon clock cycle duration. A visual representation of the circuit design is provided. In some embodiments the visual representation is presented as computer program code, and in others, it is presented as a computer generated schematic diagram. The visual representation is annotated to indicate the determined limits upon addition of structural cycle delay for at least one circuit element shown in the visual representation. Therefore, a circuit designer can take sequential optimization into account in optimizing a design at the RTL stage.

In a still further aspect of the invention, a limit upon clock cycle duration is obtained. A determination is made for a register in the circuit design, from structural cycles in which the circuit element is a constituent, of a limit upon addition of structural cycle delay to such structural cycles, assuming a clock cycle duration that is not greater than the obtained limit upon clock cycle duration. Combinational slack is determined for a combinational path in the circuit design. The determined limit upon addition cycle delay and the determined combinational slack are used to identify a change in a data path in the circuit design involving both a combinational logic change and register retiming. The identified change is made to the design. By using together, both a measure of sequential flexibility and a measure of combinational slack, design changes involving both retiming and combinational logic changes can be identified and implemented more readily.

A further aspect of the invention involves obtaining a limit upon clock cycle duration applicable to the circuit design. A determination is made for each of multiple respective circuit elements in the circuit design, of a respective limit upon addition of structural cycle delay that is not greater than each individual maximal limit of structural cycle delay for each individual structural cycle in which such respective circuit element is a constituent, based upon a clock cycle duration that is not greater than the obtained limit upon clock cycle duration. A determination is made of combinational slack of multiple paths in the circuit design. Both the determined limits upon addition of cycle delay and the determined combinational slack are used to evaluate multiple possible combinational logic changes to the circuit design. At least one of the changes is made. By using together, both a measure of sequential flexibility and a measure of combinational slack, design changes involving logic optimization can be identified and implemented more readily.

An additional aspect of the invention involves determining at least first and second register placement alternatives. A determination is made for the first register placement alternative, of a first value indicative of a proportionality of delay to number of registers for a structural cycle of the first placement alternative having a largest proportionality of delay to number of registers. A determination is made for the second register placement alternative, of a second value indicative of a proportionality of delay to number of registers for a structural cycle of the second placement alternative having a largest proportionality of delay to number of registers. The determined first and second values are used to evaluate the first and second register placement alternatives. One of the first and second register placement alternatives is selected. Therefore, a retiming alternative having a lesser minimum cycle time can be selected. Moreover, if one of the register placement alternatives involves a critical cycle within the circuit design and the other does not, then selection of the register placement alternative with the lesser minimum cycle time can have the effect of reducing the minimum cycle delay of the overall circuit.

A further aspect of the invention involves a method used in defining a clock tree network in a circuit design. First and second non-common clock tree paths are identified in the design that are used to impart a clock signal to trigger first and second registers that are constituents of a structural cycle. Path delay from the first register to the second register is determined. Path delay from the second register to the first register is determined. Based upon a target clock period, a determination is made of a change in delay in one or both of the first and second non-common clock tree paths that increases permissible variation of clock accuracy, consistent with the target clock period. Delay of one or both of the first and second non-common clock tree paths is changed according to the determination so as to achieve increased permissible variation of clock accuracy. Thus, sequential slack can be used advantageously to relax the accuracy required in creating a clock tree network.

These and other features and advantages of the invention will become more apparent from the following description of embodiments thereof in conjunction with the drawings.

BRIEF DESCRIPTION OF THE DRAWINGS

FIGS. 10A-10D are illustrative drawings of transformations of a register timing graph for the circuit of FIG. 6B in accordance with a balanced combinational slack algorithm used in some embodiments of the invention.

FIG. 20 is an illustrative table that shows the characteristics of the different sequential logic synthesis test cases and the results we obtained.

— FIG. 21A shows a placement obtained using a traditional quadratic programming-based placement tool, similar to GORDIAN; FIG. 21B shows the same placement obtained using a combinational slack-driven placer, using similar techniques to those found in modern timing-driven placement tools; FIG. 21C shows the design placed using CAPO, a leading-edge placement tool developed at UCLA; and FIG. 21D shows a placement obtained using a prototype sequential placement tool developed in accordance with some aspects of the present invention.

FIG. 23 is a table showing experimental results for a placement tool in accordance with some aspects of the invention, on a set of ten industrial benchmark circuits as well as five of the largest synchronous designs from the ISCAS89 benchmark suite.

DETAILED DESCRIPTION OF THE PREFERRED EMBODIMENTS

The following description is presented to enable any person skilled in the art to make and use a system and method for sequential timing analysis and for using sequential optimization to drive one or more stages in an integrated circuit design process. The description discloses the system and method in accordance with embodiments of the invention and in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Overview of Sequential Optimization Across IC Design Flow Stages

Figure 1:
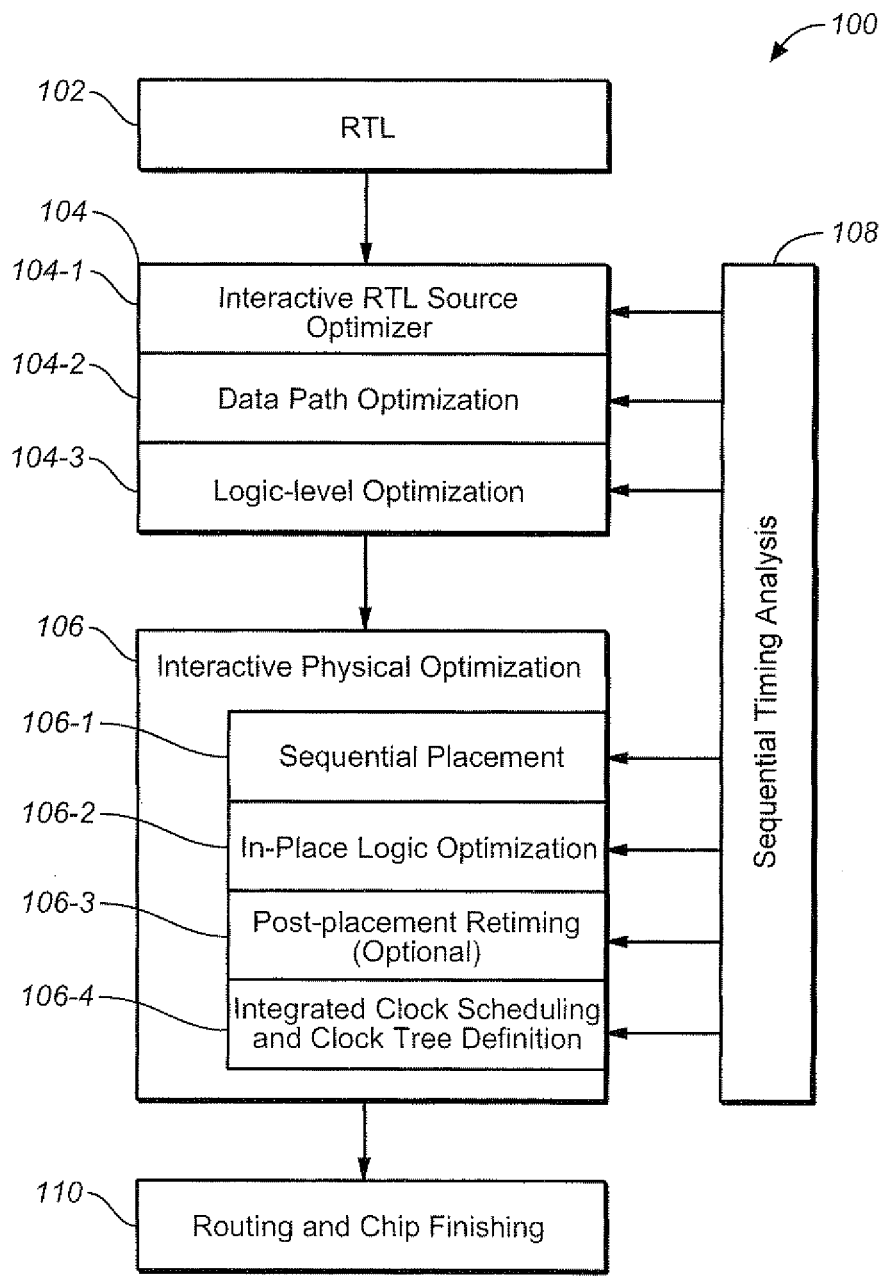
FIG. 1 is an illustrative diagram of a first design flow for the design of integrated circuit in accordance with some embodiments of the invention.

FIG. 1 is an illustrative diagram of a first design flow 100 for the design of an integrated circuit in accordance with some embodiments of the invention. The first design flow 100 receives as input a register transfer level (RTL) description 102 of a circuit design. The design flow includes an overall logic synthesis process stage 104 and an overall physical optimization process stage 106.

In this example design flow, the overall logic optimization and synthesis process stage 104 includes an interactive source optimization stage 104-1, an example of which is described below in the section, 'RTL Source Optimization Example'. The overall logic optimization and synthesis stage 104 also includes a data path optimization stage 104-2, an example of which is described in the section, 'Data Path Optimization Example' with reference to FIGS. 14A-14B. The overall logic optimization and synthesis process stages 104 also includes a logic-optimization stage 104-3, an example of which is described in the section, 'Legal Optimization Example' with reference to FIGS. 15A-15B.

Figure 15A:
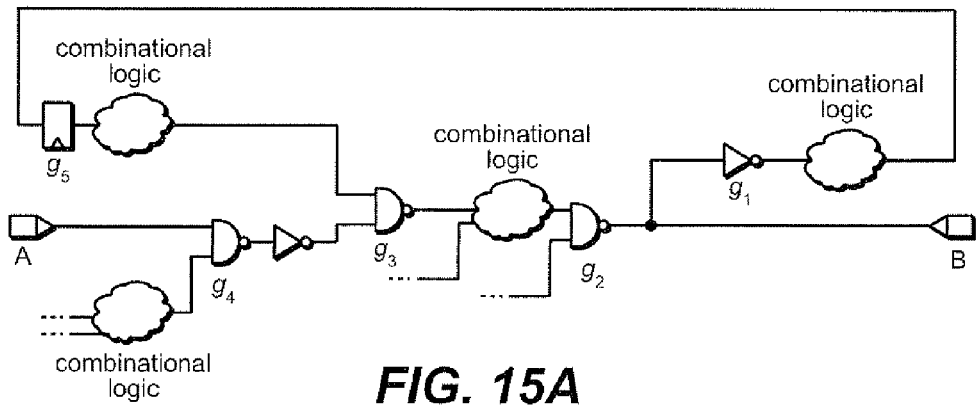
FIGS. 15A-15B are illustrative drawings of an example circuit before (FIG. 15A) and after (FIG. 15B) a possible logic optimization that can be subject to sequential analysis in accordance with some embodiments of the invention.
Figure 15B:
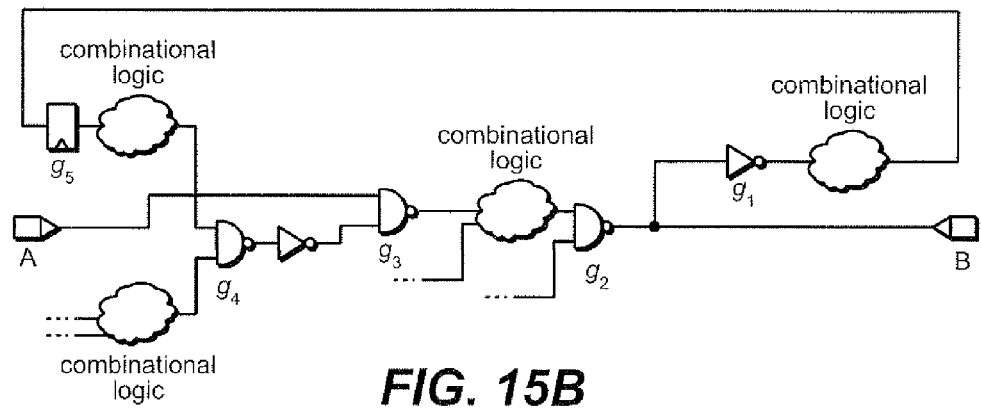
Figure 16A:
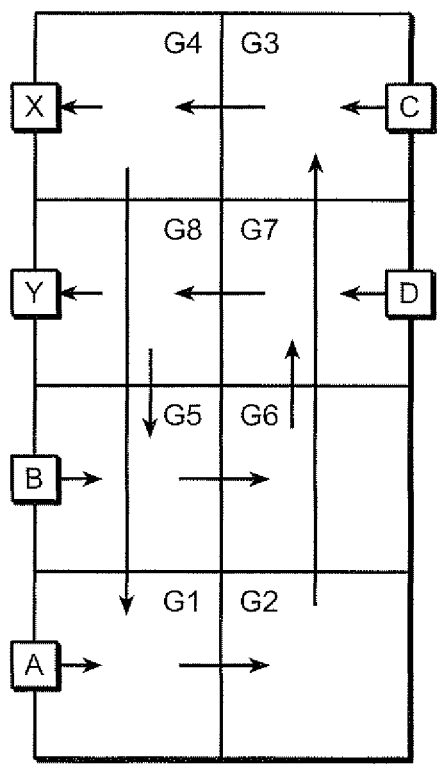
FIG. 16A-16B are illustrative drawings of two candidate placements of a circuit design that can be subject to sequential analysis in accordance with some embodiments of the invention.
Figure 16B:
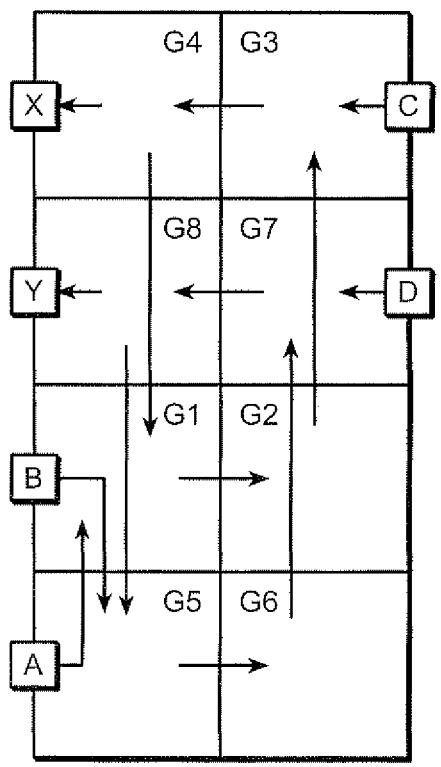

The overall physical optimization processes stage 106 includes a sequential placement stage 106-1, an example of which is described in the section, 'Placement Example' with reference to FIGS. 16A-16B. The overall physical optimization process 106 includes an in-place logic optimization stage 106-2, an example of which is described in the section, 'Logic Optimization Example' with reference to FIGS. 15A-15B. The physical optimization stage 106 also includes an optional post-placement retiming stage 106-3, an example of which is described in the section, 'Post-Placement Retiming Example' with reference to FIGS. 17A-17B. The overall physical optimization stage 106 further includes an integrated clock scheduling and clock tree definition stage 106-4, an example of which is described in the section, 'Clock Tree Example' with reference to FIG. 18.

A sequential timing analysis process 108 provides information used to drive processes within the overall logic synthesis stage 104 and to drive processes within the overall physical optimization stage 106. In particular, the sequential timing analysis process 108 determines measurements of sequential slack associated with registers in the circuit design. Different registers constitute different portions of the design; and different registers may have different sequential slacks associated with them. Thus, the sequential timing analysis process 108 provides sequential timing information at multiple stages of the design process, that indicates the degree to which sequential optimization (e.g. through adjustment of synchronization latencies) can be used to achieve design objectives such as minimal clock delay, for instance. The availability of sequential optimization to address such timing issues, for example, may influence the manner in which design issues are addressed at different stages of the design flow. As such, sequential timing analysis and the possibility of sequential optimization to address timing issues adds additional design freedom at various stages of the design flow.

Specifically, for example, during the overall logic optimization and synthesis stage 104, the sequential slack measurements are used as measures of design flexibility during the interactive source optimization stage 104-1, data path optimization stage 104-2 and logic optimization stage 104-3. It will be appreciated that these optimization stages have the effect of changing combinational logic and path delay, which in turn changes the sequential slack. The sequential timing analysis process 108 repeatedly updates sequential slack measurements in the course of the overall logic synthesis stage 104.

Similarly, for example, during the overall physical optimization stage 106, the sequential slack measurements are used as measures of design flexibility during the sequential placement stage 106-1, in-place logic optimization stage 106-2, post-placement retiming stage 106-3 and clock tree definition stage 106-4. These physical optimization stages can have the effect of altering the sequential slack, and therefore, the sequential timing analysis process 108 repeatedly updates sequential slack measurements in the course of the overall physical optimization stage 106.

In some embodiments, actual sequential timing (not shown) is performed after completion of the overall logic synthesis stage 104. Moreover, sequential timing may be further delayed until after completion of the overall physical optimization stage 106. That is, fixing of clock skew scheduling and retiming (if retiming is to be performed) is delayed until late in the overall design process. An advantage of this delayed sequential timing is that sequential optimization flexibility is maintained throughout the entire design flow. Since register timing and positioning are not fixed until late in the design flow, sequential slack can be continually recalculated and used over-and-over as a measure of design flexibility throughout much of the design flow. It will be understood that sequential timing may be insinuated into the physical design steps that occur later in the overall design process, such as in the post-placement retiming stage 106-3 and in the clock tree definition stage 106-4. Thus, delaying synchronization latency decisions until later in the design flow enhances design flexibility by permitting sequential optimization throughout multiple stages of the design flow.

In some embodiments, for example, the sequential timing analysis process 108 may use time information developed from one or more of the logic synthesis stages to drive a subsequently performed physical optimization stage. Moreover, the sequential timing analysis process 108 may use time information developed from one or more of the sub-stages or operations within the logic synthesis stage to drive a different sub-stage or operation within the logic synthesis stage. Conversely, the sequential timing analysis process 108 may use time information developed from one or more of the sub-stages or operations within the physical optimization stage to drive a different sub-stage or operation within the physical optimization stage.

Furthermore, the process of the illustrative flow diagram of FIG. 1 may be iterative in that the logic synthesis stage and the physical optimization stage 106 recurse. In that situation, time information developed from a stage in the overall design flow may be used to drive an earlier stage in the overall design flow. For instance, the overall logic synthesis stage 104 may flow to completion followed by one or more sub-stages of the overall physical optimization stage 106. One or more sub-stages of the overall logic synthesis stage 104 then may be repeated. In that situation, the sequential timing analysis process 108 may use time information developed from one or more of the physical optimization stages to drive a subsequently performed logic synthesis stage. Alternatively, for example, in an iterative flow, the sequential timing analysis process 108 may use time information developed from a stage later in the logic synthesis flow to drive a subsequently performed stage earlier in the logic synthesis flow. As yet another alternative, for example, in an iterative flow, the sequential timing analysis process 108 may use time information developed from a stage later in the physical optimization flow to drive a subsequently performed stage earlier in the physical optimization flow.

Subsequent stages of the design flow 100 entail routing and chip finishing processes 110.

The processes that comprise the design flow 100 may be implemented using computer software programs often referred to as design tools. These tools may run on different computer systems. For instance, the tools involved in the overall logic synthesis stage 104 of the flow may run on a first computer system and may produce a partially completed design encoded in computer readable medium. That partially completed design then may be loaded into a second computer system that runs tools involved in the physical optimization stage 106 of the flow.

Sequential optimization through clock latencies at the register can be applied through a combination of retiming and classical clock latency scheduling. In order to realize different clock latencies by classical clock latency scheduling, a sophisticated clock tree synthesis typically is employed. One possibility to implement large clock latencies is the use of multiple clock domains. See, K. Ravindran, A. Kuehlmann, and E. Sentovich, "Multi-domain clock skew scheduling," in *Digest of Technical Papers of the IEEE/ACM International Conference on Computer-Aided Design*, (San Jose, Calif.), pp. 801-808, November 2003, which is expressly incorporated herein by this reference.

Often, clock tree synthesis, clock skew scheduling, retiming, and physical placement are considered as one optimization problem. With such a combined consideration, the available sequential slack can be distributed optimally to compensate for the additional delay of long interconnect, for process variations of gates and wires, and for unintentional skews in the clock distribution. The iterative physical optimization stage 106 of FIG. 1 outlines such an integrated approach. Placement, clock skew scheduling, and clock tree definition occur within an iterative overall physical placement stage 106. Furthermore, an in-place logic optimization stage 106-2 driven by sequential timing analysis process 108 can be used to locally optimize timing-critical parts. A post-placement retiming stage 106-3 can optionally be applied to perform a coarse grain implementation of the synchronization latencies. Alternatively, multiple clock domains can be utilized to realize large latency differences.

Figure 2:
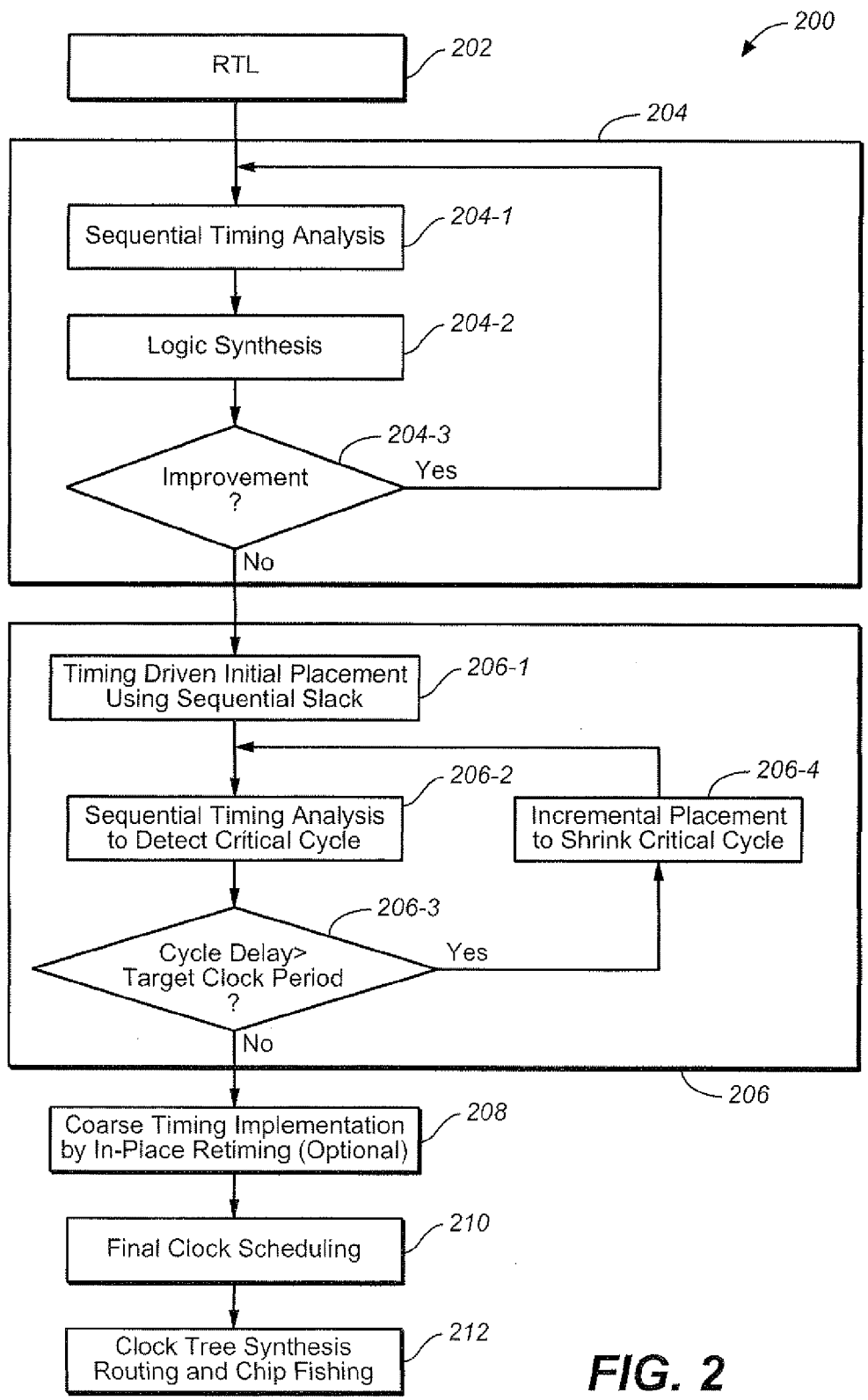
FIG. 2 is an illustrative diagram of a second design flow for the design of an integrated circuit in accordance with some embodiments of the invention.

FIG. 2 is an illustrative diagram of a second design flow 200 for the design of an integrated circuit in accordance with some embodiments of the invention. The second design flow 200 receives as input an RTL description 202 of a circuit design. The flow 200 includes a logic optimization stage 204 and a physical optimization stage 206. The flow of FIG. 2 shows additional details for the flow of FIG. 1, but also does not show some of the intermediate steps. For instance, the logic synthesis stage 104 of FIG. 1 generally corresponds to the logic optimization stage 204 of FIG. 2, and the physical optimization stage 106 of FIG. 1 generally corresponds to the physical optimization stage 206 of FIG. 2.

During the logic optimization stage 204, a sequential timing analysis process 204-1 computes the sequential slack associated with circuit elements in the design. Sequential slack provides a measure of the relative sequential design flexibility available in different portions of the design. Design portions with more sequential slack have more design flexibility. Design portions with less sequential slack have less sequential design flexibility. By sequential design flexibility, it is meant the degree to which sequential optimization can provide flexibility in design choices, whether the choices involve logic synthesis or physical optimization, for example.

A logic synthesis process 204-2 involves one or more of the following operations: decomposition, extraction, factoring, substitution, reconstitution, elimination, structuring and restructuring, technology mapping, gate sizing, buffer insertion, replication and cloning of gates. The logic synthesis process 204-2 uses sequential slack in evaluating design alternatives. For instance, in deciding among different design optimization choices, the design optimization process 204-2 factors in sequential slack associated with circuit elements in the design as one measure of degree of freedom in determining which choice to make. In decision step 204-43 a determination is made as to whether improvement in terms of delay, area and/or power continues to be made. If so, then the processes 204-1, 204-2 and 204-3 repeat. If not, then the flow 200 moves to the physical placement stage 206.

During the physical placement optimization stage 206, in step 206-1 a timing driven initial placement is made using sequential slack. A sequential timing analysis process 206-2 detects a critical cycle (e.g. gates) of a design. In decision step 206-3, a determination is made as to whether cycle delay associated with the identified critical cycle is greater than the clock period. Performance of the design ordinarily is limited by the largest cycle delay within the design. Moreover, if there is a cycle delay longer than the target clock period, then this delay should be reduced in order for the design to meet the target clock period. If the delay is greater than the clock period, then in step 206-4 an incremental placement is made to shrink critical cycle. Typically in this step, gates in a design are moved to positions such that the physical length of one or more cycles is reduced so as to reduce the cycle delay of those cycles. During this step the emphasis is on reducing the cycle delay of portions of the design having the greatest cycle delay. Next, the sequential timing analysis process 206-2 again detects a critical cycle (e.g. gates) of a design. The loop including processes 206-2 and 206-4 and decision step 206-3 continues until cycle delay is no longer greater than clock period.

It will be appreciated that physical optimization may involve additional physical synthesis stages such as, floorplanning and routing among others, for example.

In general, the minimum cycle duration (i.e. clock period) achievable through clock skew scheduling is determined not only based upon a value of the maximum proportionality of structural cycle delay to number of registers for a structural cycle within the design, but also based upon a value of the maximum proportionality of combinational delay to number of registers for all paths from a primary input to a primary output.

Simply stated, a 'structural cycle' is a cycle in the design comprising registers and combinational gates. In order to simplify the presentation and the computation of the minimum clock cycle duration (i.e. clock period) and sequential slack, a graph representing signal paths within the design is transformed as follows: all the nodes corresponding to primary inputs and primary outputs are combined into one single node. With this transformation only cycles need to be considered to ascertain the minimal clock cycle duration. As used herein, 'structural cycle' includes both structural cycles in the design and paths from a primary input to a primary output transformed to cycles.

As explained more fully below, as used herein, the critical cycle is a structural cycle in the design having a highest proportionality of path delay to number of registers. As such, the critical cycle establish a minimum clock cycle from a SO perspective. Therefore, optimizing the design to reduce the proportionality of path delay to number of registers in the critical cycle has the effect of reducing the minimum clock cycle.

Once the critical cycle delay has been reduced so as to permit the target clock period, the second flow 200 proceeds to a coarse timing implementation by in-place retiming process 208. Basically, the retiming process moves the registers in a placed design to best fit the clock latencies determined for best performance of the design. In general, it is better to use retiming to move registers with large latencies, as this makes the subsequent clock tree synthesis process easier to perform. Next, a clock latency scheduling process 210 runs. Finally, the second flow 200 reaches a clock tree synthesis routing and chip finishing processes 212. Clock tree synthesis involves choosing specific buffers and their manner of interconnection in constructing a clock network that implements the latencies for optimal performance of the design.

Note that the retiming process 208 and the clock latency scheduling process 210 are deferred so as to maintain sequential optimization flexibility throughout the logic optimization process stage 204 and throughout the physical placement optimization stage 206.

Clock Skew Scheduling and Retiming

Figure 3A:
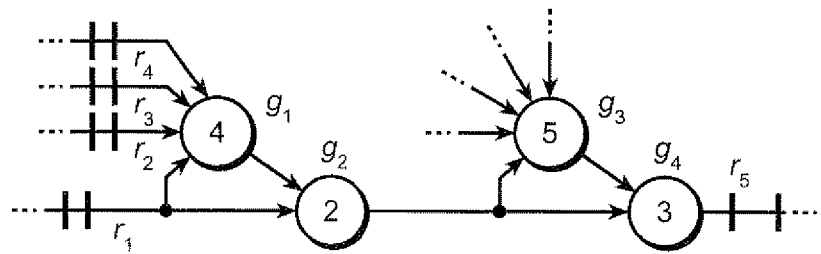
FIGS. 3A-3C are illustrative drawings of a portion of a circuit design (FIG. 3A), the circuit design annotated with timing for zero clock skew (FIG. 3B) and the circuit design annotated with timing for a prescribed clock skew scheduling (FIG. 3C).
Figure 3B:
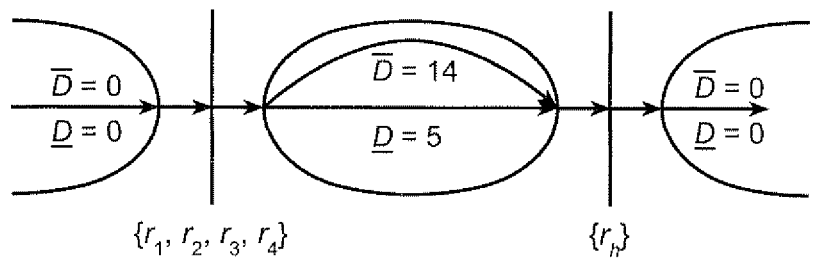
Figure 3C:
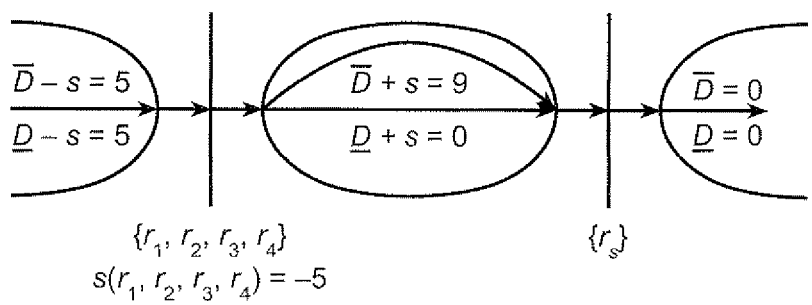

FIGS. 3A-3C are illustrative drawings of a portion of a circuit design (FIG. 3A), the circuit design annotated with timing for zero clock skew (FIG. 3B) and the circuit design annotated with timing for a prescribed clock skew scheduling (FIG. 3C). FIGS. 3A-3C provide a simple example to demonstrate the effect of clock skew (latency) scheduling and retiming and to illustrate the commonality and differences between them. For simplicity, we assume that the setup time and hold time of all registers is 0. See generally, I. S. Kourtev and E. G. Friedman, *Timing Optimization through Clock Skew Scheduling*, Boston, Dortrecht, London: Kluwer Academic Publisher, 2000, for a discussion of set up and hold time. Further, let the arrival time of all signals at the inputs of registers $r_1$, $r_2$, $r_3$, and $r_4$ and the other inputs of gate $g_3$ be 0. Assume the required time for the output of register $r_5$ is equal to the target cycle time of 7 units. FIG. 3B shows the timing diagram for the original circuit with zero skew clocking. The minimum clock period of the circuit is determined by its critical path which has a maximum delay of $\overline{D}=14$ units from the outputs of registers $\{r_1, r_2, r_3, r_4\}$ through gates $g_1, g_2, g_3$, and $g_4$ to the input of register $r_5$.

Clock skew scheduling is based on the concept that a fine-tuned advance or delay of the clocking of individual registers or latches can move them virtually in the timing diagram forward or backward, respectively. For example, by advancing the clock signal of registers $r_1$, $r_2$, $r_3$, and $r_4$, by 5 units (s ($r_1, r_2, r_3, r_4$)=−5)) these registers are virtually moved forward in the timing diagram. The result is that the effect of the critical path delay on the cycle time is reduced by 5 units, as indicated in FIG. 3C. The resulting minimum clock period is 9 units. A similar result could be achieved by delaying the clock signal of register $r_5$ by 5 units. Note that 5 units is the maximum applicable clock skew in this example. If further increased, the minimum delay of the paths from $r_1$ to $r_5$ would cause a race condition that may result in an illegal state transition. This race condition is commonly referred to as hold time violation.

Figure 4:
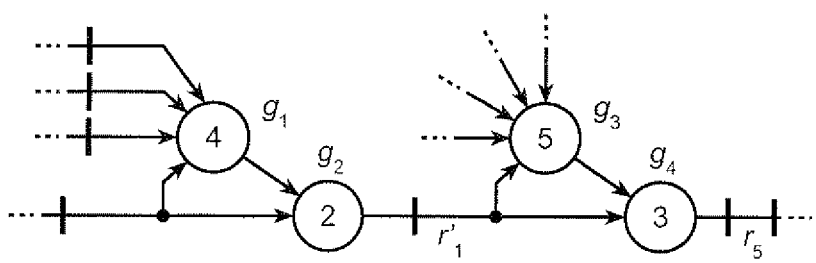
FIG. 4 is an illustrative drawing of the circuit design of FIG. 3A with clock period retiming.

FIG. 4 is an illustrative drawing of the circuit design of FIG. 3A with clock period retiming. Retiming can be used to further reduce the cycle time below 9 units. Retiming moves registers physically across gates and can therefore, potentially alleviate hold time violations. FIG. 4 shows the result of a minimum clock period retiming for the given circuit example. In order to balance the delay of the critical cycle, the set of registers $\{r_1, r_2, r_3, r_4\}$ has been relocated and merged to $r_1'$. The critical path and minimum clock period in this configuration is 8 units. Thus, by advancing or delaying the clock signal of $r_1'$ or $r_5$, respectively, by one unit, the optimum clock period can be further reduced to 7 units.

Figure 5A:
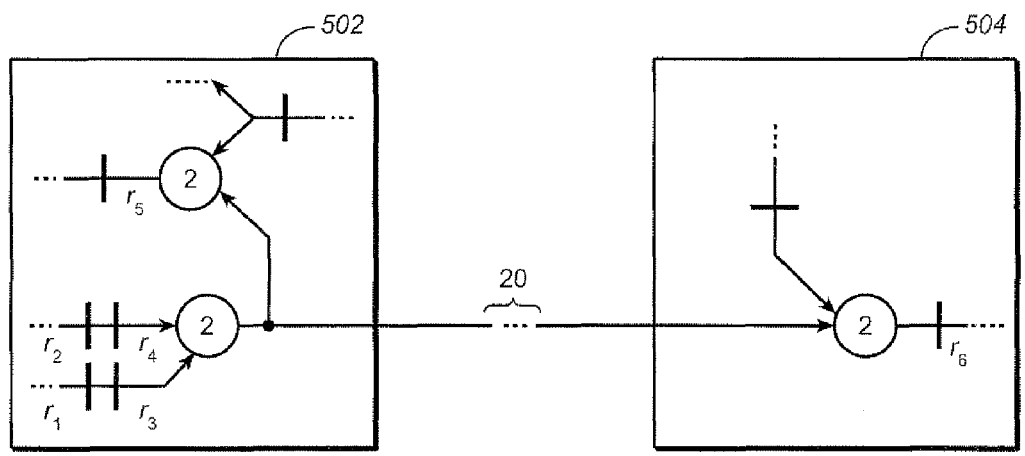
FIGS. 5A-5B are illustrative drawing of a portion of the circuit design of FIG. 3A with two modules spaced far apart (FIG. 5A) and with a combination of both clock skew scheduling and clock period retiming (FIG. 5B).
Figure 5B:
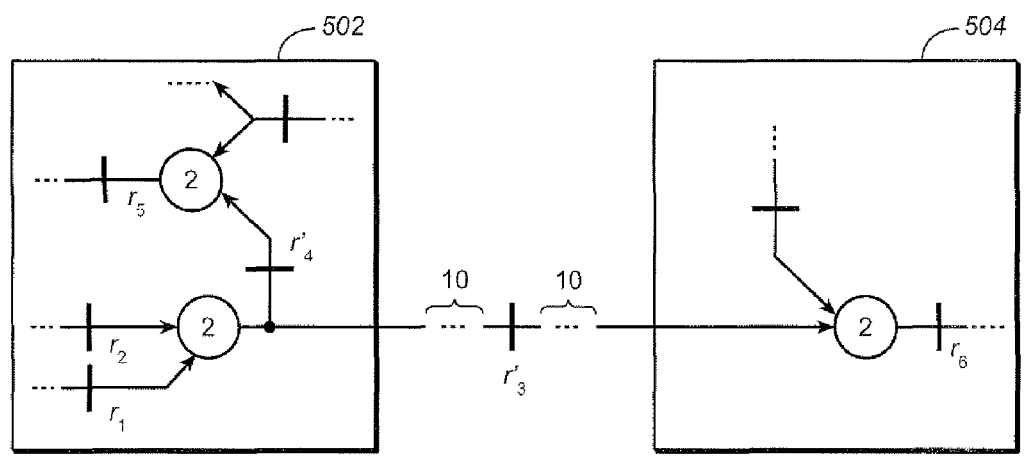

FIGS. 5A-5B are illustrative drawings of a portion of a circuit design with two modules 502 and 504 that are spaced far apart before (FIG. 5A) and after (FIG. 5B) a combination of both clock skew scheduling and retiming. FIGS. 5A-5B demonstrate the similarity of clock skew scheduling and retiming but also their differences and how both techniques could potentially be combined. The two modules 502, 504 in the example circuit design are placed far apart with a corresponding large wire delay of 20 units. Clock skew scheduling alone is not able to significantly reduce the clock period. The hold time constraint between registers $\{r_3, r_4\}$ and $r_5$ limits the best achievable clock period to 18 units. However, as shown in FIG. 5B, by retiming $\{r_3, r_4\}$ to $\{r_3', r_4'\}$ the clock period can be decreased to 12 units. The clock period can be further reduced to 10 units, if the clocks of $\{r_1, r_2\}$ and $r_6$ are skewed negatively and positively, respectively, each by 2 units.

Sequential Timing Analysis

Sequential timing analysis is used to drive a sequential synthesis flow in accordance with some embodiments of the invention. Sequential timing analysis includes determining a lower bound for a clock cycle (i.e. minimum clock period) achievable by some combination of clock skew scheduling and retiming. A critical cycle is the structural cycle comprising registers and gates that determines the minimum clock period that can propagate a signal within the circuit without incurring a timing violation, specifically a setup time violation. As such, the minimum clock cycle serves as a clock cycle limit. A critical cycle is a structural cycle, which is among structural cycles of a circuit, the cycle with a maximum value for {Delay=total delay/num_registers}. In other words, the critical cycle is the structural cycle within the circuit with the highest proportionality of delay to number of registers.

Sequential slack for a circuit element (whether a logic gate or a register) is the maximum additional delay that circuit element can assume before it becomes part of the critical cycle. Thus, the sequential slack of a circuit element is determined with reference to the critical cycle. Note the difference between combinational and sequential slack: the combinational slack is derived from a target clock period and the actual path delays of the circuit with fixed register positions and clock skews. Sequential slack is based on a lower bound of a circuit's clock period and reflects the sequential criticality or temporal mobility of registers and combinational gates assuming that the minimum clock period can be realized by retiming and/or clock skew scheduling. Analogous to the application of combinational slack in traditional logic synthesis, the sequential slack can be used to drive a transformation-based synthesis flow for exploring sequential restructuring.

Critical Cycle Computation

Figure 6A:
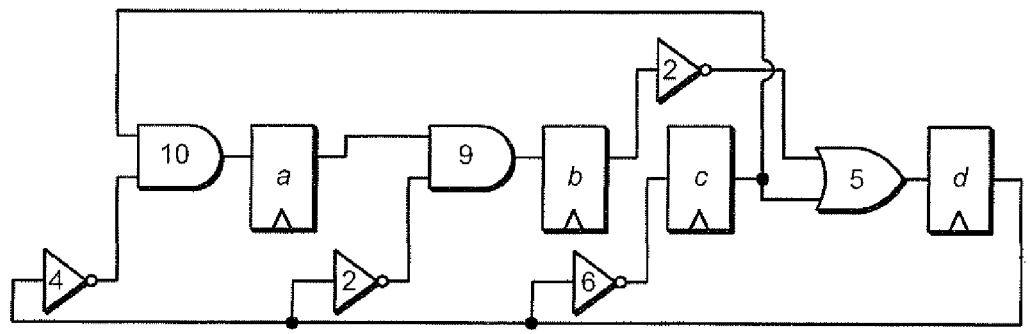
FIGS. 6A-6B are an illustrative drawings of an example circuit (FIG. 6A) and a register timing graph (FIG. 6B) for the circuit. Each node of the graph of FIG. 6B represents a register of FIG. 6A.
Figure 6B:
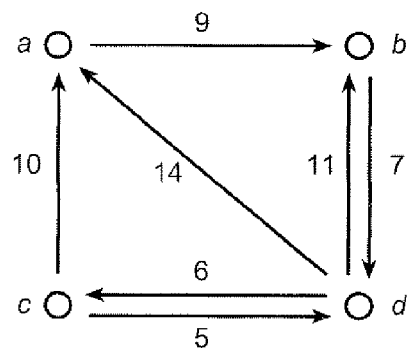

FIGS. 6A-6B are an illustrative drawings of an example circuit (FIG. 6A) and a register timing graph (FIG. 6B) for the circuit. Each node of the graph of FIG. 6B represents a register of FIG. 6A. The graph has an edge from one node to another node if a logic path starts and ends at the corresponding registers associated with each edge is the maximum delay of all paths between the corresponding registers.

In the following discussion we assume that the circuit does not have any primary inputs or primary outputs. Should the circuit have primary inputs or primary outputs, these primary inputs or primary outputs can be combined into one single node so as to tie each path from primary input to primary output within a structural cycle.

If the clock latency at each register of the example circuit of FIG. 6A is set to be zero, the design can run no faster than a clock period of 14. In this case the clock period is constrained by the delay from register d to register a.

Figure 7:
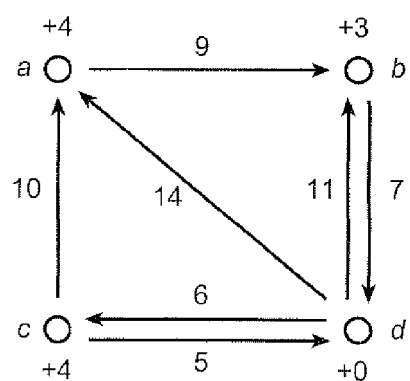
FIG. 7 is an illustrative drawing of a register timing graph for the circuit of FIG. 6A with clock skew scheduling and with critical path highlighted.

FIG. 7 is an illustrative drawing of a register timing graph for the circuit of FIG. 6A with clock skew scheduling and with critical path highlighted. The latency of register a is increased by 4, i.e. use delay tuning to cause the clock to arrive 4 time units later than normal. The latency of register b can be increased by 3, the latency of register c can be increased by 4, and the arrival of the clock at register d can be left unchanged.

With these new latencies, the example circuit is able to run at a clock period of 10. One can easily verify that, given this clock period, each edge in the graph still meets its timing requirements. For example, the edge from d to a still has a delay of 14, but since the clock at register a is delayed by 4 units, any signal along this edge will still meet the setup requirement at register a.

It turns out that for this example the given clock latencies are optimum: there does not exist another clock schedule which will allow the circuit to run with a faster clock period. This can be seen this by examining the cycle with edges (a,b), (b,d), (d,a) in FIG. 7. These edges are timing critical, in that the signals arriving on these edges just exactly meet their required setup times. As such, there does not exist an assignment of latencies that yields a smaller clock period, since such a smaller clock period would result in one of these edges having a timing violation. These edges thus form the critical cycle for this circuit design. Every cycle in the register timing graph has a mean cycle time, which is defined as the total delay around that cycle divided by the number of registers in that cycle. The critical cycle is the cycle which has the maximum mean cycle time over all cycles in the graph.

We define the register timing graph G=(V,E) as follows. Take V to be the registers of the design, together with an additional vertex $v_{ext}$ representing the primary inputs and primary outputs. Add an edge (u, v) to E if there exists a timing path from u to v in the original circuit. Every edge e=(u,v) is labeled with d(e), the maximum delay between u and v in the circuit. During placement, the estimated wire delays are included in d (e).

As noted with the example above, finding the critical cycle is equivalent to computing the maximum mean cycle (MMC) for G, which is given by $$\max\nolimits_{l \in C} \sum_{e \in l} d(e)/|l|$$

where C is the set of all cycles in G. This MMC equation provides a basis for a more mathematical explanation of a process to compute proportionality of delay to number of registers for the structural cycles of a design so as to identify a critical structural cycle having the highest value for such proportionality and so as to ascertain a minimum clock period that can propagate a signal about that critical cycle. As such, the MMC is equal to the minimum clock period which may be obtained using clock skew scheduling. We can use Howard's algorithm, J. Cochet-Terrasson, G. Cohen, S. Gaubert, M. McGettrick, and J.-P. Quadrat, "Numerical computation of spectral elements in max-plus algebra," in *Proceedings of the IFAC Conference on System Structure and Control*, July 1998, (represented below by Algorithm 1) to compute the MMC efficiently. The results of, A. Dasdan, S. S. Irani, and R. K. Gupta, "An experimental study of minimum mean cycle algorithms," Tech. Rep. UCI-ICS 98-32, University of Illinois at Urbana-Champaign, 1998, suggest that Howard's algorithm is the fastest known algorithm for computing MMC.

---

Algorithm 1 Howard's Algorithm For Computing MMC

1: for all u ∈ V do {initial guess}
2:     π(u) ← e for some e = (u,v) ∈ E
3: repeat {main loop}
4:     find all cycles $C_\pi$ in $G_\pi$ = (V,{π(u):u ∈ V} ⊆ E)
5:     for all u ∈ V do {in reverse topological order}
6:         if u = CYCLEHEAD ($L_u$) for some $L_u$ ∈ $C_\pi$ then
7:             η(u) ← MEANCYCLETIME ($L_u$),x(u) ← 0
8:         else {defined recursively}
9:             η(u) ← η(v) where π(u) = (u,v)
10:            x(u) ← x(v) + d(π(u)) − η(v)
11:     for all e = (u,v) ∈ E do {modify π}
12:         if η(u) < η(v) then
13:             π(u) ← e
14:     if π unchanged then -continued Algorithm 1 Howard's Algorithm For Computing MMC

```
15:         for all e = (u,v) ∈ E do
16:             if η(v) = η(u) and x(u) < x(v) + d(e) − η(v) then
17:                 π(u) ← e
18: until no change in π
19: return max_{u∈V} η(u)
```

Generally speaking, the idea behind Howard's algorithm is to maintain a small set of edges π, which starts as an initial guess of the critical cycle in the graph. π is chosen such that every vertex has only one outgoing edge in the induced subgraph Gπ, which is the graph obtained by removing all edges except those in π. Now Gπ contains at least one cycle, and every vertex reaches exactly one cycle through a path in Gπ.

Every cycle L in Gπ is associated with an arbitrary distinguished vertex in L, denoted by CycleHead(L). Two vertex labels η and x are also defined. If $L_v$ is the unique cycle reached from v in Gπ, then η(v) is the mean cycle time of $L_v$ and x(v) is the sequential delay from v to CycleHead($L_v$). Due to the scarcity of π, all cycles of Gπ can be enumerated in time linear in the size of the graph; likewise, η(v) and x(v) can be computed in linear time as well.

Given π and the corresponding labels (η, x), Howard's algorithm proceeds by finding a new π which yields new vertex labels which are strictly greater than the previous labels in a lexicographic sense. This can be done in a greedy and efficient manner. This procedure is iterated until no improvement can be made, at which point the critical cycle (and the corresponding MMC) is identified in π. Some details are omitted here; more information about Howard's algorithm and a proof of correctness can be found in J. Cochet-Terrasson, et al., "Numerical computation of spectral elements in max-plus algebra," Supra.

Sequential Slack

Once the critical cycle has been identified, the sequential criticality of the vertices of other cycles in the circuit can be determined relative to a minimal clock cycle derived from the proportionality of delay to number of registers of the critical cycle.

In this section, a prior notion of sequential slack, is presented, which was described in, J. Cong and S. K. Lim, "Physical planning with retiming," in *Digest of Technical Papers of the IEEE/ACM International Conference on Computer-Aided Design*, (San Jose, Calif.), pp. 1-7, November 2000. A significant shortcoming in that prior notion of sequential slack is demonstrated, and new alternative notion of sequential slack in accordance with the principles of some embodiments of this invention is introduced. We refer to that prior notion of sequential slack as reference vertex dependent sequential slack (RVD sequential slack)

Figure 8:
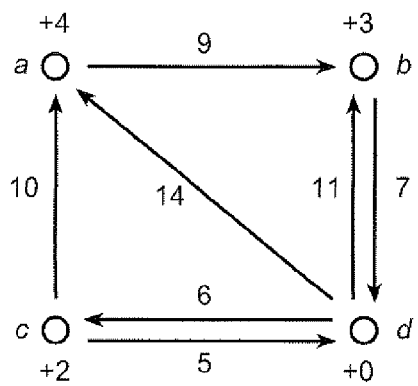
FIG. 8 is an illustrative drawing of the register timing graph of FIG. 7 with alternative latencies.

FIG. 8 is an illustrative drawing of the register timing graph of FIG. 7 with alternative latencies. Sequential slack gives rise to flexibility in the implementation of a circuit design. The alternative assignment of latencies to the registers also meets the circuit timing requirements. More particularly, for example, that the latency of register c has changed from +4 to +2, independent of the other register latencies, while still meeting the timing requirements. This is what is meant by saying that register c has sequential flexibility: the timing specification of register c is not fixed, relative to the critical cycle of the overall design. In contrast, for example, register a is sequentially critical, as it lies on the critical cycle and thus its clock latency cannot be changed without affecting the latencies of the other registers on the critical cycle.

Sequential slack is a measure of degree of flexibility available to optimize other aspects of a design. As an analogy, for example combinational timing analysis provides information that may allow resizing of gates which do not lie on the critical path in order to minimize size, or to introduce longer wires and additional wire delay along non-critical paths in order to obtain better placements. Likewise, sequential timing analysis can provide information that may allow similar trade-offs in the domain of sequential optimization for gates that do not lie on a critical cycle.

The work on the prior notion of sequential slack in, J. Cong et al. "Physical planning with retiming," supra, quantifies the concept of sequential flexibility through the use of sequential arrival time, sequential required time, and sequential slack. According to that prior work, given a target clock period of φ the sequential arrival and required times at all vertices v∈V with respect to a reference vertex $v_{ref}$ can be computed from Equations (1.1) through (1.3) below, using a modified version of the Bellman-Ford algorithm, T. H. Cormen, C. E. Leiserson, and R. L. Rivest, *Introduction to Algorithms*, The MIT Electr. Eng. and Computer Science Series, MIT Press/McGraw Hill, 1990.

$$A_{seq}(v, v_{ref}) = \max_{(u,v)\in E} A_{seq}(u, v_{ref}) + d((u,v)) - \phi \quad (1.1)$$

$$R_{seq}(v, v_{ref}) = \min_{(v,w)\in E} R_{seq}(w, v_{ref}) - d((v,w)) + \phi \quad (1.2)$$

$$A_{seq}(v_{ref}, v_{ref}) = R_{seq}(v_{ref}, v_{ref}) = 0 \quad (1.3)$$

The sequential slack is $S_{seq} = R_{seq} - A_{seq}$.

$A_{seq}$ and $R_{seq}$ represent respectively the earliest and latest relative position in time to which a register can be moved (by retiming or clock skewing) while still meeting timing with respect to the reference point. $S_{seq}$ measures the feasible range of temporal positions for v relative to the reference node. The concepts of sequential arrival time, required time, and slack are equivalent to those used in the combinational timing domain.

While this prior definition of sequential slack represents a metric for quantifying sequential criticality, one shortcoming of this prior approach is that this criticality is only with respect to the given reference vertex, $v_{ref}$. A different choice of reference vertex, $v_{ref}$ will impose different constraints. Hence, we refer to this prior notion of sequential slack as reference vertex dependent sequential slack (RVD sequential slack).

Figure 9:
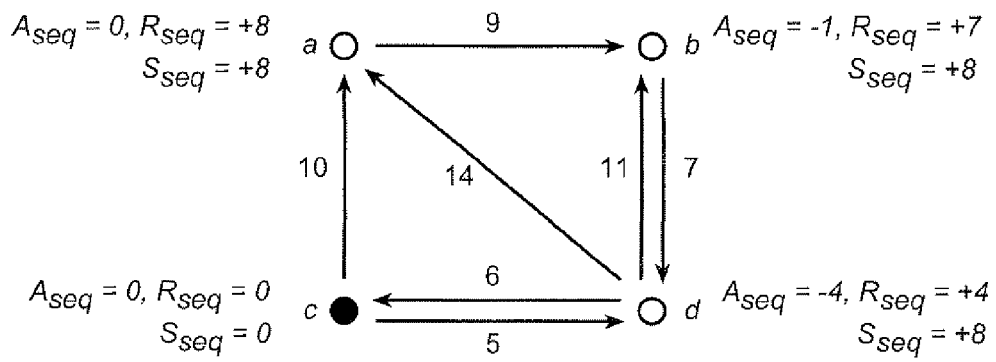
FIG. 9 is an illustrative drawing of an alternative register timing graph for the example circuit of FIG. 6A, that demonstrates that "ordinary sequential slack" in accordance with a prior approach to sequential slack analysis does not reflect sequential flexibility.

FIG. 9 is an illustrative drawing of an alternative register timing graph for the example circuit of FIG. 6A, that demonstrates that RVD sequential slack in accordance with a prior approach to sequential slack analysis does not fully reflect sequential flexibility. In FIG. 9, the choice of $v_{ref}$ gives a non-zero slack value for vertices on the critical cycle. In this example, vertex c (highlighted) is chosen to be the reference node $v_{ref}$ when computing the sequential slacks $S_{seq}$. Note that in this example, vertices a, b and d all have positive slack, despite being on the critical cycle. In accordance with principles of some embodiments of the invention, there is benefit to having a critical slack metric which yields a slack of zero for sequentially critical vertices. This, desire together with the fact that the value for sequential slack according to the above prior work depends on the choice of reference node, motivates us to conclude that the prior RVD notion of sequential slack is not optimal for determining sequential criticality and sequential flexibility.

To overcome the limitations of the prior notion of RVD sequential slack, we have developed a concept which we call reference cycle dependent (RCD) sequential slack (also referred to herein as "true" sequential slack). RCD sequential slack for a vertex is defined as the maximum delay which can be added to the outgoing edges of that vertex without increasing the MMC of the design. More specifically, the RCD sequential slack for a vertex of a structural cycle is the maximum delay that can be added to outgoing edges of a vertex of that cycle without resulting in that cycle becoming the critical cycle. As such, the MMC serves as the "reference cycle". From this definition, it is clear that vertices on the critical cycle will have a RCD ("true") sequential slack of zero, making this notion of sequential slack a more appropriate measure of sequential flexibility, compared to ordinary sequential slack.

Computing the true sequential slack of a vertex is straightforward but can be expensive. One can examine all structural cycles which pass through the specified vertex, finding the maximum delay which can be added without violating the MMC, and then taking the minimum of all these quantities.

More specifically, for example, the RCD sequential slack for a given register is determined based upon all structural cycles in which the given register is a constituent. The RCD sequential slack for the given register is the maximum delay that can be added to a structural cycle of which the given register is a constituent, using a clock cycle at or about the limit determined based upon the critical cycle, without producing a timing violation, specifically a setup time violation. In other words, a clock cycle selected for use to determine a maximum delay that can be added for a given register should be at or about the limit determined for the critical cycle. Thus, the determined maximum delay is determined based upon such selected clock cycle, which of course, could be a clock cycle selected to be at the limit determined based upon the critical cycle.

Even more specifically, for example, the RCD sequential slack for such given register is the minimum delay from among all respective maximum delays that can be added to respective structural cycles of which the given register is a constituent, based upon a clock cycle at or about the limit determined based upon the critical cycle, without producing setup time violations.

Thus, the maximum delay that can be added to a structural cycle of which the given register is a constituent is the minimum delay from among all respective maximum delays that can be added to respective structural cycles of which the given register is a constituent, assuming the use of a clock cycle at or about the limit determined based upon the critical cycle, without producing setup time violations.

For instance, assume that the given register is a constituent of three structural cycles. Also, assume a clock cycle at or about the limit determined based upon the critical cycle. Further, assume that a maximum delay that can be added to a first structural cycle of which the given register is a constituent is 3 units; and a maximum delay that can be added to a second structural cycle of which it is a constituent is 9 units; and a maximum delay that can be added to a second structural cycle of which it is a constituent is 5 units. That is, assuming a clock cycle at or about the determined limit, 3 units of delay can be added to the first structural cycle without resulting in a setup time violation; up to 9 units of delay can be added to the second structural cycle without resulting in a setup time violation; and 5 units of delay can be added to the third structural cycle without resulting in a setup time violation. Then, the RCD sequential slack of the given register is 3 units.

A more efficient approach to computing the above RCD ("true") sequential slack of a vertex $S_{true}$ is:

$$S_{true}(v) = -\max_{(u,v) \in E} \{A_{seq}(u,v) + d(u,v) - \phi\}$$

The values of $A_{seq}(u,v)$ can be computed with the Belmann-Ford algorithm. $A_{seq}(u,v)$ is the longest path from v to u with respect to the length function $d(u,v) - \phi$.

Alternatively, the true sequential slack of any node can be computed using a combination of the Belman-Ford algorithm and the Dijkstra algorithm:
First compute a clock schedule with the Belman-Ford algorithm. Let $l(u)$, $u \in V$ be the latencies of the nodes. Then the expression $$l(u) + d(u,v) - \phi - l(v)$$

is non-positive.

The sequential arrival time $A_{seq}(v, v_{ref})$ slack for any single register can then be computed using Dijkstra's algorithm with the length function $$l(u) + d(u,v) - \phi - l(v)$$

instead of the length function $$d(u,v) - \phi$$

Dijkstra's algorithm can compute longest paths more efficiently if the lengths of the edges are non-positive. The new length function does not change the length of a cycle and hence the sequential slack value computed. See, R. E. Bellman: On a routing problem. *Quarterly of Applied Mathematics* 16 (1958), 87-90; E. W. Dijkstra: A note on two problems in connexion with graphs, *Numerische Mathematik* 1 (1959), pages 269-271.

As yet another alternative, the Floyd-Warshall algorithm can be used to compute all-pair shortest paths (length function $\phi - d(u,v)$). See, R. W. Floyd: Algorithm 97—shortest path, *Communications of the ACM* 5 (1962), 345.

Despite this more efficient formulation, computing $S_{true}$ is still a computationally expensive procedure. An understanding of the concept of RCD ("true") sequential slack (as defined herein) is important in a theoretical sense in that the sequential slack metrics used in practical applications are intended to be an approximation to the theoretically ideal true sequential slack.

Balanced Combinational Slack

The complexity of computing RCD sequential slack can make its general use throughout a sequential synthesis flow computationally quite expensive, where such values might need to be recomputed many times as structural or physical changes are made to the design. Accordingly, a novel technique has been developed to distribute combinational slack in a generally balanced fashion across a design or portions of a design while avoiding the explicit computation of RCD sequential slack. As used herein combinational slack is the amount by which the delay of a gate can be increased before a combinational path through the gate becomes critical. One technique to balance path delays is described in commonly owned co-pending U.S. patent application Ser. No. 11/373, 670, filed Mar. 10, 2006, entitled OPTIMIZATION OF COMBINATIONAL LOGIC SYNTHESIS THROUGH CLOCK LATENCY SCHEDULING, invented by C. Albrecht, A. Kuehlmann, D. Seibert and S. Richter, which is expressly incorporated herein in its entirety by this reference.

For each vertex, combinational slack on the edges incident to that vertex is balanced such that the worst combinational slack among the incoming edges is substantially equal to the worst slack among the outgoing edges. One technique to achieve such balancing of combinational slack is to adjust clock latencies applied to registers, represented as vertices in a register transfer diagram, so as to achieve such balancing of combinational slack. This process provides a useful technique for distributing combinational slack throughout the design, as it helps ensure that optimization tools (e.g. the synthesis techniques described below in the section headed "Sequential Logic Synthesis" are given flexibility wherever it exists. This process is called the balanced combinational slack algorithm, which is shown as Algorithm 2.

---

Algorithm 2 Balanced Combinational Sequential Slack

---

1: while graph contains directed cycle do
2:   find critical cycle C with maximum mean cycle time
3:   assign latencies to C which satisfy timing
4:   contract cycle C to a single vertex $v_c$
5:   adjust delays on edges directed into and out of $v_c$
6: uncontract graph and compute latencies for all original vertices

---

The algorithm makes use of the fact that the vertices in a critical cycle always have their latencies in "lock-step" with each other. That is, such vertices have latencies which are all interdependent, and setting the latency for one vertex fixes the latencies of all the others in the critical cycle. This is why in each iteration the critical cycle C is contracted into a single vertex $v_c$, since only a single latency need be computed for the representative (contracted) vertex to completely determine the latencies for the entire critical cycle. The delays for edges directed into and out of $v_c$ are adjusted to account for the fact that the latencies assigned to the individual vertices in the critical cycle may be different from each other. That is, the incoming edges to the new vertex $v_c$ may, in fact, have pointed to different vertices of C, and this is reflected in the resulting graph after C is collapsed.

FIGS. 10A-10D are illustrative drawings of transformations of a register timing graph for the circuit of FIG. 6B in accordance with a balanced combinational slack algorithm used in some embodiments of the invention. FIG. 10A shows the critical cycle highlighted and having vertices (a, b, d) with latencies of (+1, 0, −3) respectively.

FIG. 10B shows the vertices (a, b, d) of the critical cycle contracted to a single vertex abd. The delays on the edges leading into and out of abd are adjusted as follows: consider the edge (c, a). Let $\tau_v$ be the latency assigned to vertex v. Since a was assigned a latency of +1 before being contracted into abd, we can consider this vertex to have a latency of +1 relative to abd, so $$\tau_a = 1 + \tau_{abd} \quad (2.1)$$

Now suppose the latency of c is set so that the edge (c, a) exactly meets its timing requirements. Then $$\tau_c + 10 - \phi = \tau_a \quad (2.2)$$

where φ is the clock period. But in that case the edge (c, abd) must exactly meet its timing requirement as well, since abd represents a in the contracted graph. Then we must have $$\tau_c + q - \phi = \tau_{abd} \quad (2.3)$$

where q is the delay assigned to the edge (c, abd). Combining Equations 2.1 through 2.3 we find q=9.

The procedure of adjusting the edge delays can be easily generalized, so that edges directed into the contracted vertex have a value subtracted from their delays, where this value is the latency of the original vertex to which the edge was previously directed. Likewise, edges directed out of the contracted vertex have the corresponding latency added to their delays as shown in FIG. 10B. More particularly, when the algorithm finds and contracts a cycle the relative differences of the latencies of the cycle are determined, and the edge delays are adjusted to account for the latencies of vertices subsumed within the contracted graph. The determination of adjustments is made based upon the following relationship representing the slack of an edge (a, b):

$$\text{slack}(a,b) = \phi - \text{delay}(a,b) - \tau_a + \tau_b$$

Referring to FIG. 10A, vertex a has a latency which is by 1 larger than the latency of vertex b, and vertex d has a latency which has a latency that is by 3 smaller than the latency of vertex b. In the modified graph of FIG. 10B-10C, there is only one vertex, the vertex abd, for the three vertices a, b, and d. In the example of FIGS. 10B-10C, the latency of the new vertex is equal to the latency of the vertex b in the original graph. Thus, the edges in the modified graph of FIGS. 10B-10C (with the contracted cycle) have a delay such that for each edge the slacks in the original and in the modified graph are equal. Specifically, since the clock on vertex d is advanced by three time units (−3), the delay (6) on directed edge (abd, c) is reduced by three time units (6−3). Conversely, the delay on (5) on directed edge (c, abd) is increased by three time units (5+3). Likewise, since the clock on vertex a is delayed by one time unit (+1), the delay (10) on directed edge (c, abd) is decreased by one time unit (10−1).

FIG. 10D is an illustrative drawing representing a final step in the process in which the graph of FIG. 10C is uncontracted and latencies are computed for the original vertices. Since the latency of abd was assigned a value of +3 and a was given a latency of +1 relative to abd (in the first iteration), then a has an overall latency of +4. Similar computations are done for the other vertices. The new latencies provide additional slack on the edges, which provides additional freedom for optimization.

The sequential slack indicates how much delay can be added at some point in a design by changing the latencies at the registers such that setup constraints are met. Whereas, combinational slack indicates how much delay can be added at some point in a design but without changing the latencies at the registers.

As noted earlier, the final solution obtained has the property that for each vertex the worst slack of all incoming edges substantially equals the worst slack of all outgoing edges, hence we call the algorithm balanced. In the example, register c has a RCD ("true") sequential slack of +8, and can take on any latency between +4 and −4. The balanced combinational slack algorithm assigns register c a latency of 0, balancing the slack so that half of this slack is distributed to the worst outgoing edge (c, a) and the other half to the worst incoming edge (d, c).

More specifically, For a clock period of φ=10, the RCD sequential slack of register c is 8. The combinational slack of the edge (c, a) is 4 and the combinational slack of the edge (d, c) is also 4 with respect to the latencies and according to the slack formula, slack(a, b)=φ−delay(a, b)−$\tau_a$+$\tau_b$. If there were additional combinational slack on the edges (a, b) and (b, d), the true sequential slack would be higher.

We note that an equivalent property to the combinational slack balancing property is the following global optimization criterion: the vector obtained by taking the slacks for each edge and sorting them in increasing order is lexicographically the greatest among all such vectors. In our example this slack vector is (0, 0, 0, 2, 4, 4, 5); no other assignment of latencies to the registers yields a lexicographically greater slack vector. Basically, we computed the slack with the formula slack (a, b)=ϕ−delay(a, b)−$\tau_a$+$\tau_b$ for each edge. Edges (a, b), (b, d) and (d, a) have a slack of 0, edge (d, b) has a slack of 2, edges (d, c) and (c, a) have a slack of 4 and edge (c, d) has a slack of 5. Lexicographically greater means that we compare the vector (after sorting) component by component until a component is different, and this first component which is different determines which of the vectors is lexicographically greater. For example (0, 0, 0, 2, 4, 4, 5)>(0, 0, 0, 2, 3, 4, 5), and (0, 0, 0, 2, 4, 4, 5)<(0, 0, 2, 2, 4, 4, 5).

Computing RCD sequential slack can be computationally more expensive to compute that to compute RVD sequential slack or balanced combinational slack. However, in practice, it is not necessary to compute the RCD sequential slack for all registers (all nodes in the register-to-register graph). The following approach is possible:

1. Compute the balanced combinational slack for all registers of the design.
2. Fix the latencies for those registers which have a balanced combinational slack larger than a specified value.
3. Compute the RCD sequential slack for the registers which have a balanced combinational slack less than or equal to the specified value and for which the latencies have been fixed in step 2.

In the second step, the registers for which the latencies are fixed can be considered as primary inputs and primary outputs. As mentioned above, primary inputs and primary outputs are combined into a single node for the computation of sequential slack. Combining the primary inputs and primary outputs into a single node reduces the size of the graph and hence the complexity of the computation of the sequential slack. The final slack value is either the balanced combinational slack for the registers for which the latency has been fixed in step 2 or the RCD ("true") sequential slack computed in step 3. This slack value is a lower bound on the RCD sequential slack. If the slack value is smaller than the specified value used to determine the registers for which the latency is fixed, then the value is equal to the sequential slack.

The specified slack can be an external parameter set by a user, for example, or an internal parameter determined so as to achieve an acceptable tradeoff between degree of optimization and runtime of the computer software design tool.

The maximum mean cycle (MMC) is the minimum clock period achievable by clock latency scheduling. If the target clock period is equal to this value, all the slacks, the balanced combinational slack and the RCD sequential slack are nonnegative. The balanced combinational slack is smaller than or equal to the RCD sequential slack, and fixing the latencies for some registers cannot increase the RCD sequential slack. Hence, the slack computed by this scenario is a lower bound of the RCD sequential slack.

Partially Balanced Combinational Slack

In the above subsection it is shown that combinational slack can be distributed and balanced over all edges. It is also of interest to distribute and maximize the combinational slack only over some of the edges, while the slack of other edges is simply constrained to be nonnegative, i.e. the inequality constraint holds.

Figure 11A:
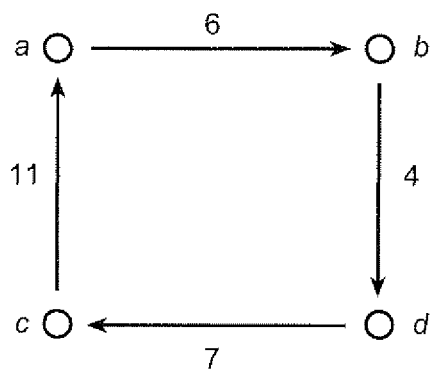
FIGS. 11A-11C are illustrative register timing graphs showing examples of an original unbalanced graph (FIG. 11A), slack distribution balanced over all edges (FIG. 11B) and slack distributed over three edges with a fourth edge handled as a simple constraint (FIG. 11C).
Figure 11B:
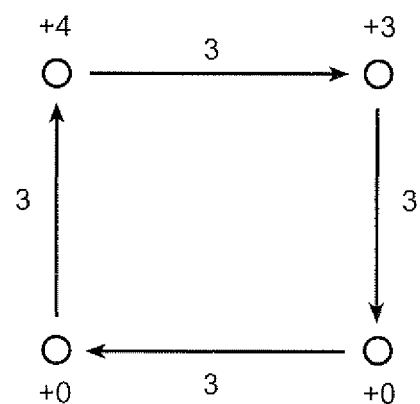
Figure 11C:
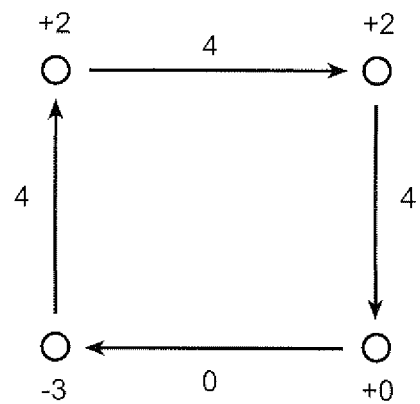

FIGS. 11A-11C are illustrative register timing graphs showing examples of an original unbalanced graph (FIG. 11A), slack distribution balanced over all edges (FIG. 11B) and slack distributed over three edges with a fourth edge handled as a simple constraint (FIG. 11C). FIG. 11A is an illustrative drawing of a register timing graph corresponding to a circuit (not shown) with unbalanced combinational slack and a clock period ϕ=11. FIG. 11B is an illustrative drawing of a register timing diagram corresponding to the same circuit as FIG. 11A except with combinational slack distribution balanced over all four edges. FIG. 11C is an illustrative drawing of a register timing diagram corresponding to the same circuit as FIG. 11A except with combinational slack partially balanced such that edge (d, c) is simply handled as constraint, i.e., the edge is required to have nonnegative slack.

An abstract formulation of this problem is as follows: Given a directed graph G=(V,E) weights c:E→$\Re$, and a partition E=$E_1 \cup E_2$. Find an assignment τ:V→$\Re$ such that τ(u)+c((u,v))≤τ(v) for all edges (u,v)∈$E_1$ and τ(u)+c((u,v))+s((u,v)) ≤τ(v) for all edges (u,v)∈$E_2$, and such that the slack vector $((s((u,v)))_{(u,v) \in E_2})$ sorted in non-increasing order is the greatest possible by lexicographic order. In the following we will refer to the edges in $E_1$ as non-parameterized and to the edges in $E_2$ as parameterized. In the previous subsection we have solved the problem for $E_2$=E.

Note, that in this formulation c((u,v)) does not necessarily correspond to the delay of the path from u to v, in fact if the edges correspond to a setup constraint, c((u,v)) would be the delay of the edge minus the given clock period. In our example, the variables τ(v),v∈V, correspond to the latencies of the registers. However, in a more general application the nodes can also model other components as we will show in the next section.

For solving the partial balancing problem, one can modify Howard's algorithm (Algorithm 1) and solve it in combination with the balanced sequential algorithm (Algorithm 2). For more details the refer to C. Albrecht, B. Korte, J. Schietke, and J. Vygen, "Maximum mean weight cycle in a digraph and minimizing cycle time of a logic chip," in *Discrete Applied Mathematics*, vol. 123, pp. 103-127, November 2002; and C. Albrecht, B. Korte, J. Schietke, and J. Vygen, "Cycle time and slack optimization for VLSI-chips," in *Digest of Technical Papers of the IEEE International Conference on Computer-Aided Design*, pp. 232-238, November 1999, in which the same basic problem is solved, using a different algorithm for the MMC computation.

Figure 12A:
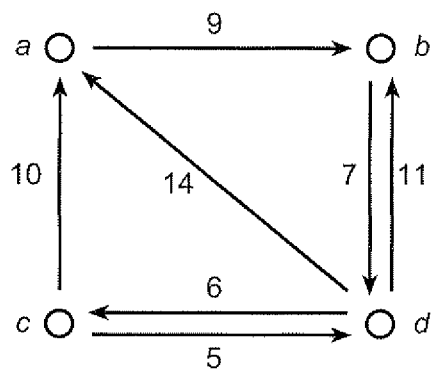
FIGS. 12A-12C are illustrative diagrams showing a register-to-register graph with delays on the edges (FIG. 12A), a diagram showing true sequential slack for each node (FIG. 12B) and a diagram showing the maximal compatible slack (FIG. 12C).
Figure 12B:
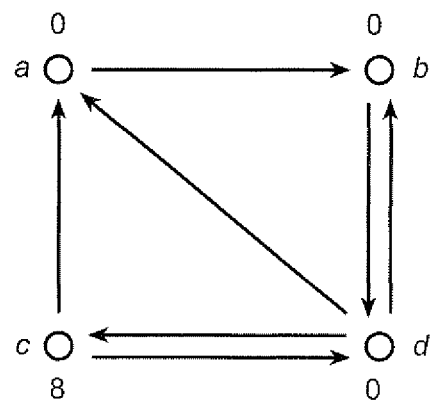
Figure 12C:
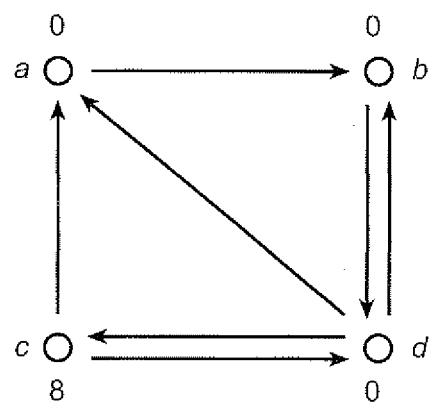

Examples of RCD ("True") Sequential Slack,
Maximal Compatible Sequential Slack and Balanced Compatible Sequential Slack FIGS. 12A-12C are illustrative diagrams showing a register-to-register graph with delays on the edges (FIG. 12A), a diagram showing RCD ("true") sequential slack for each node (FIG. 12B) and a diagram showing the maximal compatible slack (FIG. 12C). The register-to-register graph of FIG. 12A is identical to the diagram of FIG. 6B, which represents the example circuit of FIG. 6A. The critical cycle in the register transfer diagram of FIG. 12A is the structural cycle, a→b→d→a, since (9+7+14)/3=10, which is the maximum average delay per register of all cycles in the diagram of FIG. 12A. Thus, in the example illustrated in FIG. 12A, the formulation (9+7+14)/3=10 represents a proportionality of delay to number of registers. Moreover, that formulation represents the maximum proportionality of delay to number of registers in the example. Therefore, the minimum clock period, ϕ=10.

In contrast, note for example, that the structural cycle, c→a→b→d→c, is not critical since it has an average register delay of $(10+9+7+6)/4=8$, which not the maximum average delay of all cycles under consideration in the diagram.

In FIG. 12B, the value 8 associated with node c represents the RCD sequential slack. The true sequential slack represents how much delay needs to be added before or after a given register (in this example a register represented by node c) such that the register becomes part of a critical cycle. The RCD sequential slack is a value equal to the length of the shortest cycle through the node with respect to the length function $\phi-d(u,v)$.

Stated differently, the RCD sequential slack is the minimum delay from among respective maximal delays that can be added to respective structural cycles in which the a circuit element (e.g. a register) represented by node c is a constituent, based upon use of a clock cycle duration that is not greater than the obtained limit upon clock cycle duration. In this example, node c is a constituent of structural cycle, $$c \rightarrow a \rightarrow b \rightarrow d \rightarrow c,$$

and node c is a constituent of structural cycle, $$c \rightarrow d \rightarrow c$$

The RCD sequential slack for node c calculated as the slack about structural cycle, $$c \rightarrow a \rightarrow b \rightarrow d \rightarrow c, \text{ is,}$$

$$8=(10-10)+(10-9)+(10-7)+(10-6),$$

which means that 8 time units is the greatest delay that can be added to the corresponding structural cycle without resulting in a setup time violation, assuming a clock cycle $\phi=10$.

In contrast, note for example, that RCD sequential slack for the structural cycle, $$c \rightarrow d \rightarrow c,$$

has a length with respect to $\phi-d(u,v)$, which is calculated as, $$9=(10-5)+(10-6),$$

which means that 9 time units is the greatest delay that can be added to the corresponding structural cycle without resulting in a setup time violation, assuming a clock cycle $\phi=10$.

Since 9 time units is greater than 8 time units, the structural cycle, $$c \rightarrow d \rightarrow c,$$

does not have a length of the shortest cycle through the node with respect to the length function $\phi-d(u,v)$. In other words, the structural cycle, $$c \rightarrow a \rightarrow b \rightarrow d \rightarrow c,$$

has the minimum delay (8) from among respective maximal delays (8) and (9) that can be added to respective structural cycles in which the a circuit element represented by node c is a constituent, assuming a clock cycle $\phi=10$, that is not greater than the obtained limit upon clock cycle duration.

Thus, in this example, adding a delay of 8 before or after the node (or register) c would make the maximum average delay of all cycles through node c be $\phi=10$. For instance, adding a delay of 4 to edge $c \rightarrow a$ and adding a delay of 4 to edge $d \rightarrow c$ results in the average register delay for the cycle, $$c \rightarrow a \rightarrow b \rightarrow d \rightarrow c \text{ being,}$$

$$(10+4)+9+7+(6+4)/4=10.$$

Thus, in accordance with some embodiments of the invention, based upon use of a clock cycle $\phi=10$, an RCD sequential slack of 8 time units indicates that an additional combinational delay of 8 time units can be added to the structural cycle, $$c \rightarrow a \rightarrow b \rightarrow d \rightarrow c.$$

This additional combinational delay can be added using the clock cycle $\phi=10$, since timing of a register represented by node c can be adjusted through sequential optimization (SO) involving adjustment of clock latency scheduling or through retiming adjustments, for example.

FIG. 12C is an illustrative drawing showing compatible slack. A set of compatible sequential slacks for multiple circuit elements comprise slacks that for any one of the multiple circuit elements, can be used in any way, that for which the other slacks are still valid. For example, assume that a set of registers $R_1$-$R_N$ have a set of compatible sequential slacks. That is, $R_1$ has slack $S_1$, $R_2$ has slack $S_2$, ... $R_N$ has slack $S_N$. Further, assume, for example, that R1 has a sequential slack of 5. In that case, the delay associated with register R1 can be increased by 1, 2, 3, 4, or 5, and the slacks of all of registers $R_2$-$R_N$ are still valid and can be used to their maximum as well.

The maximal compatible slack represents how much delay should be added to every register (simultaneously but can be different values for different registers) such that all registers are part of a critical cycle. Referring to FIG. 12C, for example, nodes (registers) a, b, and d each is part of a critical cycle already, which means that the RCD sequential slack as well as the maximal compatible slack for those nodes is zero. Therefore, additional slack can be added only with respect to node c, and 8 is the maximal delay value that can be added before or after node c to make sure that node c is also part of a critical cycle.

Figure 13A:
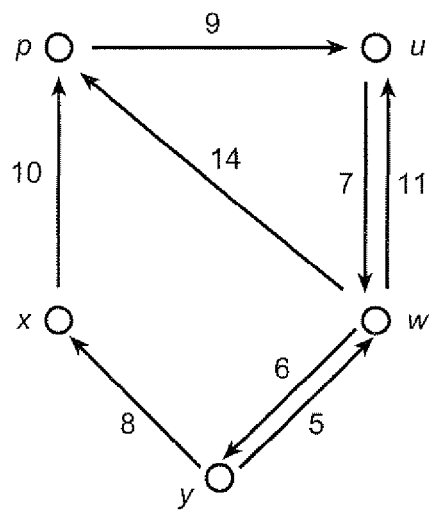
FIGS. 13A-13D are illustrative diagrams showing a register transfer diagram (FIG. 13A), a diagram showing true sequential slack of nodes x and y (FIG. 13B), a diagram showing maximal compatible slack (FIG. 12C), and a diagram showing balanced compatible slack (FIG. 13D).
Figure 13B:
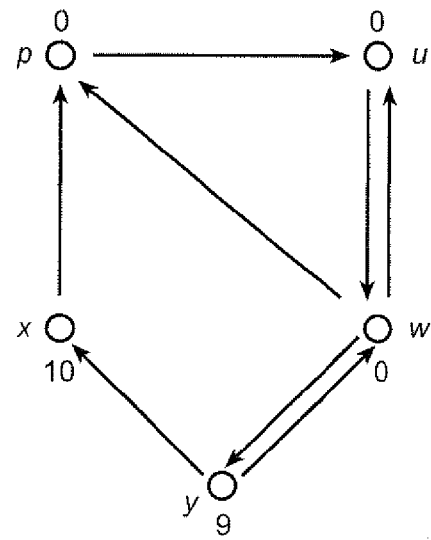
Figure 13C:
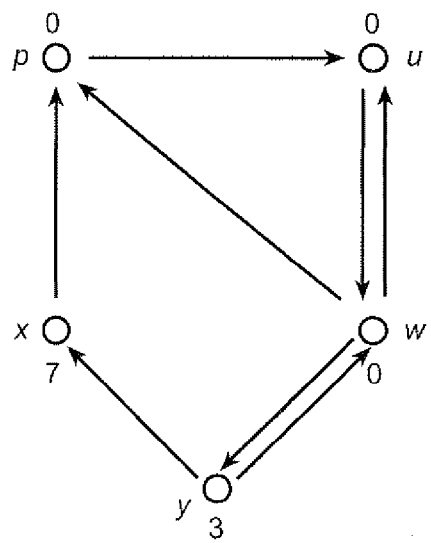
Figure 13D:
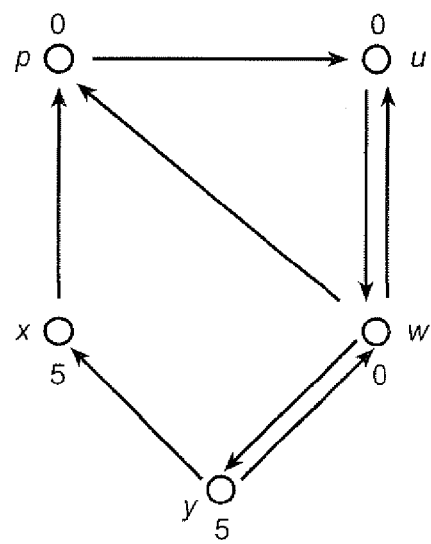

FIGS. 13A-13D are illustrative diagrams showing a register transfer diagram (FIG. 13A), a diagram showing RCD sequential slack of nodes x and y (FIG. 13B), a diagram showing maximal compatible slack (FIG. 12C), and a diagram showing balanced compatible slack (FIG. 13D). The cycle, $$p \rightarrow u \rightarrow w \rightarrow p$$

is critical cycle in the diagram of FIG. 13A. The average delay of the critical cycle, 10 in this example, is by definition the maximum average cycle delay for the diagram. The minimum clock period, as determined from the maximum average cycle delay is $\phi=10$.

FIG. 13B shows the RCD sequential slack of nodes x and y to be 10 and 9 respectively. The node x is present in one cycle, and the true sequential slack of that one cycle is computed as, $$10=(10-10)+(10-9)+(10-7)+(10-6)+(10-8).$$

The node y is present in two cycles. One cycle is the same one that node x is in. The other is the cycle, $y \rightarrow w \rightarrow y$, which has a RCD sequential slack computed as, $$9=(10-6)+(10-5).$$

Note that the RCD sequential slacks for nodes x and y cannot be applied simultaneously to those nodes. Thus, a determination of maximal compatible slacks is beneficial. FIG. 13C is an illustrative drawing showing an example of maximal compatible slack for each of the nodes of the diagram of FIG. 13A.

FIG. 13D is an illustrative drawing showing an example of balanced compatible slack which also is another maximal compatible slack. A balanced compatible slack is a maximal compatible slack with the additional property that it is not possible to increase the compatible slack of one register by decreasing the slack of another register which has a larger slack. In contrast, the slacks of FIG. 13C do not represent balanced compatible slack because it is possible to increase the (compatible) slack of the node y (which is 3 in FIG. 13C) by decreasing the slack of node x (which is 7 in FIG. 13C) at the same time.

Examples of the Use of Sequential Optimization in a Design Flow

Referring again to FIG. 1, there is shown an illustrative diagram of the first design flow for the design of integrated circuit in accordance with some embodiments of the invention. The following sections describe some details of constituent process modules of the design flow that use sequential optimization (SO) in accordance with principles of the invention. It will be appreciated that the design flow of FIG. 1 is just one example design flow, and that the following sections describe example design flow processes that employ SO in the course of the overall design flow.

RTL Source Optimization Example

This section describes an example interactive RTL source optimizer process 104-1 of the design flow of FIG. 1. More specifically, this section explains that one can utilize an interactive RTL editor incorporating sequential timing analysis to yield design improvements.

Consider the following example Verilog RTL source code:

```
module sample(in_a, in_b, in_c, in_d, in_e, in_f, in_g, in_h, clk);
input [31:0] in_a;
input [31:0] in_b;
input [31:0] in_c;
input [31:0] in_d;
input [31:0] in_e;
input [31:0] in_f;
input [31:0] in_g;
input [31:0] in_h;
reg [31:0] reg_a;
reg [31:0] reg_b;
reg [31:0] reg_c;
always @(posedge clk)
begin
  reg_a <= (((reg_b | in_a) & in_b) | in_c) & in_d;
  reg_b <= reg_a | in_e;
  reg_c <= ((reg_c | in_f) & in_g) | in_h;
end
endmodule
```

Assume synthesis does not modify the logical structure from what is given in the RTL, and suppose each logical operator requires the same amount of time to evaluate (i.e. the gate delay for AND and OR gates are the same).

A designer who is interested in improving the performance of this design might focus on the large expression for reg_a, thinking that this is the critical path of the design.

However, if the back-end synthesis tools are permitted to apply sequential optimization techniques, this is not the true critical section of the design. reg_a and reg_b participate in a cycle, with a total of 5 gate delays. Therefore clock skew scheduling and retiming can optimize this cycle so that its minimum clock period is 2.5 gate delays. However, the cycle containing reg_c requires 3.0 gate delays to evaluate. Thus, if sequential optimization is taken into account, one would better spend effort in optimizing this section of the design instead.

Sequential optimization techniques, therefore, increases the flexibility of the overall design process. In this example, the relative benefit that can be achieved through sequential optimization techniques such as clock skew scheduling and retiming, is greater for the cycle containing registers reg_a and reg_b than for the cycle containing register reg_c. Moreover, sequential optimization techniques can optimize the cycle with reg_a and reg_b to have a shorter minimum clock period (i.e. 2.5 gate delays) than the cycle with reg_c (i.e. 3.0 gate delays). Since sequential optimization techniques are able to shorten the minimum clock delay for the cycle with reg_a and reg_b to be less than the minimum clock cycle with reg_c, it perhaps makes more sense to spend effort optimizing the RTL source associated with the cycle containing reg_c. Under these circumstances, perhaps sequential optimization can be relied upon to achieve improved minimum clock delay for the cycle containing reg_a and reg_b.

Integration of sequential timing analysis with the RTL editor can also be used to provide a mechanism for aiding manual path balancing. For instance, after running sequential timing analysis on the above design, the editor could make textual annotations to each of the three register assignments indicating both their combinational delays and sequential timing information. The reg_a assignment would show a combinational delay of 4 and a sequential timing (e.g. the maximum mean cycle time over all cycles containing the corresponding logic path) of 2.5. This would inform the designer that this path best could be shortened through sequential optimization, by moving logic across its register boundaries. The reg_c assignment would be given an annotation showing a combinational delay of 3 and sequential timing of 3, indicating to the designer that sequential optimization would not be effective, and suggesting that RTL design optimization should be applied instead.

An RTL editor that uses sequential timing analysis to determine criticality of design subsections would thus be able to highlight visually (e.g. with a color change or some form of textual annotation) the appropriate portion of the RTL, to identify to the designer where effort should be spend for design optimization.

Data Path Optimization Example

This section describes an example data path optimization process 104-2 of the design flow of FIG. 1. More specifically, this section explains that data path optimization can be affected by sequential slack data as the following example illustrates.

Figure 14A:
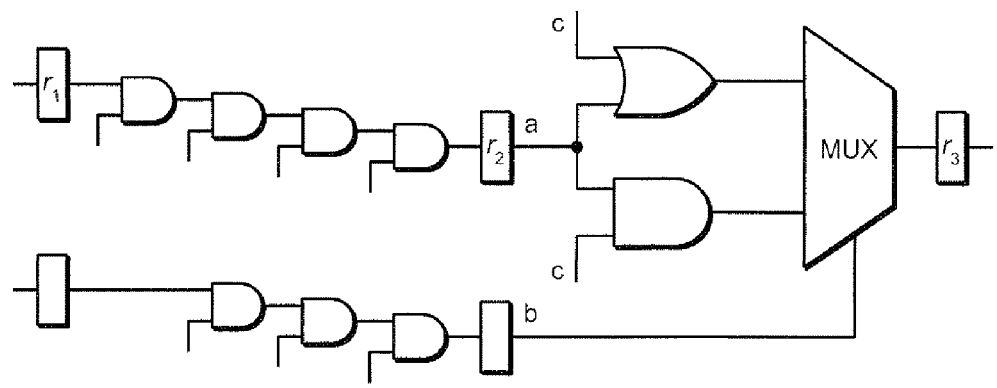
FIGS. 14A-14B are illustrative drawings of a partial circuit design before (FIG. 14A) and after (FIG. 14B) data path optimization in accordance with some embodiments of the invention.
Figure 14B:
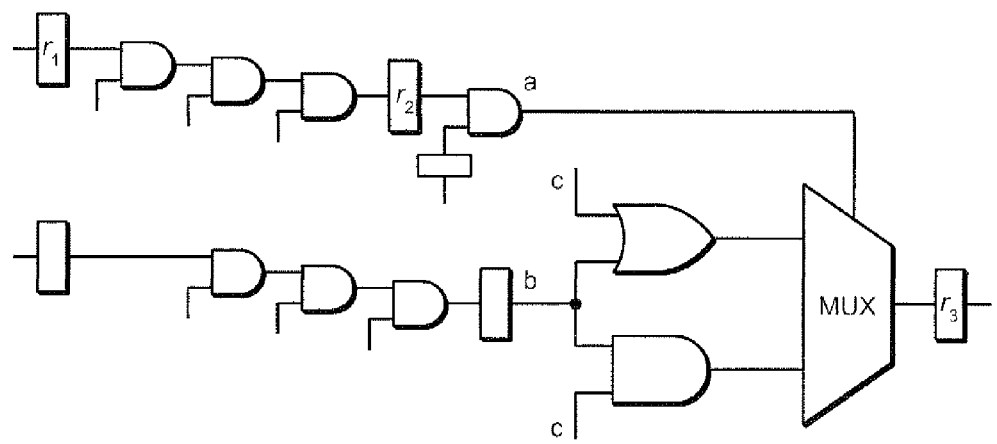

FIGS. 14A-14B are illustrative drawings of a partial circuit design before (FIG. 14A) and after (FIG. 14B) data path optimization in accordance with some embodiments of the invention. The partial design assumes gate delays are 1 and the MUX delay is 2. The cycle time of the partial design is 4 (determined by the path from $r_1$ to $r_2$). However, register $r_2$ has some flexibility in its timing. If the data path optimization tool is made aware of the fact that signal a is on the critical path and signal b is not, then it can make a combinational logic transformation followed by a retiming to produce the circuit in FIG. 14B. The combinational transformation involves moving the signal a forward by making it the enable signal of the mux, and moving signal b backward by removing it as the enable. The retiming moves register r2 backwards across an AND gate. The cycle time in the circuit of FIG. 14B is 3, and the design has been improved. This result cannot be achieved by iterating retiming and data path optimization, since in the case of this example partial circuit, neither technique applied alone would make any changes to the original design.

Logic Optimization Example

This section describes an example logic optimization process 104-3 of the design flow of FIG. 1. More particularly, this section explains the use of sequential slack for logic synthesis operations. The example shows that greater improvements can be achieved compared to a method which uses only the combinational slack.

FIGS. 15A-15B are illustrative drawings of an example circuit before (FIG. 15A) and after (FIG. 15B) a possible logic optimization in accordance with some embodiments of the invention. More specifically, FIG. 15A is an illustrative drawing of a circuit that is to be subject to logic optimization process in accordance with principles of some aspects of the invention. It is assumed in this example that a path from a primary input A to a primary output B is critical and that the total delay of this path is larger than the target clock period. In this example we consider the following two possible operations to reduce the delay of the path.

A first possible operation is to reduce the size of the inverter g1. This reduces the total capacitance driven by the NAND gate g2 and hence the delay of the gate g2. However, this operation also increases the delay of the inverter g1, and it is assumed that the total delay of gate g2 and gate g1 increases as well. However, decreasing the size of the inverter g1 reduces the overall area and power consumption of the circuit.

A second possible operation is to directly connect the primary input A to the NAND gate g3 and to connect the output of the combinational logic from the register g5 to gate g4. The resulting circuit is shown in FIG. 15B. The logic function of the circuit is not changed by this operation. The delay of the path from the primary input A to the primary output B is reduced because the path is shorter and contains one NAND gate and one inverter less after the operation. The delay of the path from the register g5 increases. The total area of the circuit is unchanged.

In this example, an automatic synthesis tool must to evaluate these two possible operations: The tool has to check whether the operation improves the worst slack and what the cost of the operation in area and power is.

Both operations increase the slack of the critical path from the primary input A to the primary output B. The first operation increases the delay of the path leading towards register g5, and the second operation increases the delay of the path leaving the register g5.

The combinational slack is computed on a register-to-register path basis. In this example the combinational slack is partitioned between the two paths, the incoming and outgoing path of register g5: If the clock latency of register g5 is increased, the slack of the incoming path increases, and the slack of the outgoing path decreases. If the clock latency of the register g5 is decreased, the effect is opposite.

If the combinational slack of the incoming path of register g5 is below a certain limit, it might not be possible to perform the first operation without decreasing the worst slack. Similarly, if the slack of the outgoing path is below a certain threshold, it might not be possible to perform the second operation without decreasing the worst slack. The optimization possibilities by the synthesis tool are limited and depend on the clock latency of register g5. Furthermore, if one operation is applied it may no longer be possible to apply the second operation even if the clock latency of register g5 is adjusted.

The view of the sequential slack analysis is different: each path has a sequential slack equal to the sum of the combinational slacks of the two sub-paths; hence it does not depend on the clock latency of register g5. Thus, a sequential slack analysis looks at the slack of the entire cycle containing g5 and determines whether "sequential" slack is increased or decreased by each of options 1 and 2—Whereas, traditional logic optimization focuses separately on the combinational input sub-path to g5 and on the combinational output sub-path from g5. Both operations can be evaluated and if both operations improve the worst slack, the synthesis tool can chose the operation bringing the greatest improvement at the lowest cost.

Placement Example

This section describes an example sequential placement process 106-1 of the design flow of FIG. 1. The following example describes a sequentially-driven placement methodology used to improve circuit performance compared to traditional placement methods. Consider the following netlist, given in standard Verilog format:

```
module test(A, B, C, D, X, Y);
input A, B, C, D;
output X, Y;
NOR2 G1(.A(A), .B(n4), .O(n1));
DFF G2(.D(n1), .Q(n2));
NOR2 G3(.A(n2), .B(C), .O(n3));
DFF G4(.D(n3), .Q(n4));
OR2 G5(.A(B), .B(n8), .O(n5));
DFF G6(.D(n5), .Q(n6));
NAND2 G7(.A(n6), .B(D), .O(n7));
DFF G8(.D(n7), .Q(n8));
assign X = n4;
assign Y = n8;
endmodule
```

Clock and power nets are omitted for simplicity.

Suppose, for example, that this design was constructed in a library in which all cells had a geometric height of 1 micron and a geometric width of 1 micron, and for simplicity assume the pin locations for each cell lie at the exact geometric center of the cell. Also suppose the design is to be placed in a bounding box with height of 4 microns and width 2 microns, and suppose the inputs and outputs of the design have been assigned fixed geometric locations. Specifically, assume that the lower-left corner of the placement bounding box is denoted as (0,0), and the upper-right corner of the bounding box is denoted as (2,4). Moreover, the I/O locations are: A(0,0.5), B(0,1.5), C(2,3.5), D(2,2.5), X(0,3.5), Y(0,2.5)

FIG. 16A-16B are illustrative drawings of two candidate placements of the above circuit design. For clarity in the figures, nets are not drawn to connect to the geometric center of the cells where the pins should be. However it is assumed that routing is done pin-to-pin to/from the cell centers in a Manhattan fashion.

Assume that the total wire length for the placement shown in FIG. 16A is 15 microns, and the total wire length for the placement shown in FIG. 16B is 17 microns. Thus a wirelength-driven placement tool will prefer the placement (that is, assign a lower cost to the placement) shown in FIG. 16A over the placement of FIG. 16B.

Suppose a simple delay model is given where each NAND2 gate has an intrinsic delay of 3 picoseconds, each NOR2 gate has an intrinsic delay of 5 picoseconds, each OR2 gate has an intrinsic delay of 7 picoseconds, and wires have a delay of 1 picosecond/micron. We allow setup and hold times of 0 picoseconds, and assume zero intrinsic delays for the DFF cells for simplicity. Under this timing model, the layout in FIG. 16A has a minimum clock period of 9 picoseconds (with the critical path from G8(DFF) through G5(OR2) to G6(DFF)), while the layout of FIG. 16B has a minimum clock period of 10 picoseconds (also with a critical path from G8 through G5 to G6, but with an extra picosecond of wire delay). A combinational timing-driven placement tool would prefer the layout shown in FIG. 16A over that in FIG. 16B as well.

However, if we allow clock skew scheduling to take place after placement, the layout of FIG. 16B should have a higher figure of merit than that of FIG. 16A. In FIG. 16A, the critical cycle is G1-G2-G3-G4, with a mean cycle time (total delay around the cycle divided by the number of registers) of 9 picoseconds. In FIG. 16B, the critical cycle is also G1-G2-G3-G4, but the mean cycle time here is 8 picoseconds (due to decreased wire delay). Thus, a sequentially-driven placement tool can properly identify the improvement in the maximum mean cycle time for the layout in FIG. 16B and assign it a higher figure of merit than that of FIG. 16A.

Post-Placement Retiming Example

This section describes an example sequential placement process 106-3 of the design flow of FIG. 1. The following example describes the use of sequential analysis to improve the results of post-placement retiming optimization.

Consider the following netlist, given in standard Verilog format:

```
module test(A, B, C, D, X);
input A, B, C, D;
output X;
wire NB, ND, XD;
INV I1(.A(B), .O(NB));
INV I2(.A(D), .O(ND));
OR4 O1(.A(A), .B(NB), .C(C), .D(ND), .O(XD));
DFF R1(.D(XD), .Q(X));
endmodule
```

Clock and power nets are omitted for simplicity.

Assume that this design was constructed in a library where all cells have a square geometry with height and width both 1 micron, and for simplicity assume the pin locations for each cell lie at the exact geometric center of the cell. Also suppose the design is to be placed in a square bounding box with height 3 microns and width 3 microns, and suppose the inputs and outputs of the design have been assigned fixed geometric locations. The lower-left corner of the placement bounding box is denoted as (0,0). The upper-right corner of the bounding box is denoted as (3,3). The I/O locations are: A(1.5,0), B(0,1.5), C(1.5,3), D(X(3,1.5).

Figure 17A:
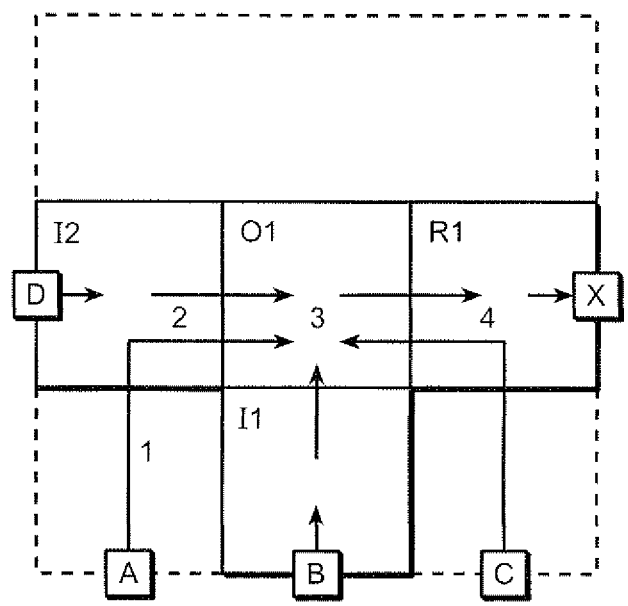
FIG. 17A-17B are illustrative drawings of two candidate placements of a circuit design that can be subject to post-placement sequential analysis in accordance with some embodiments of the invention.
Figure 18:
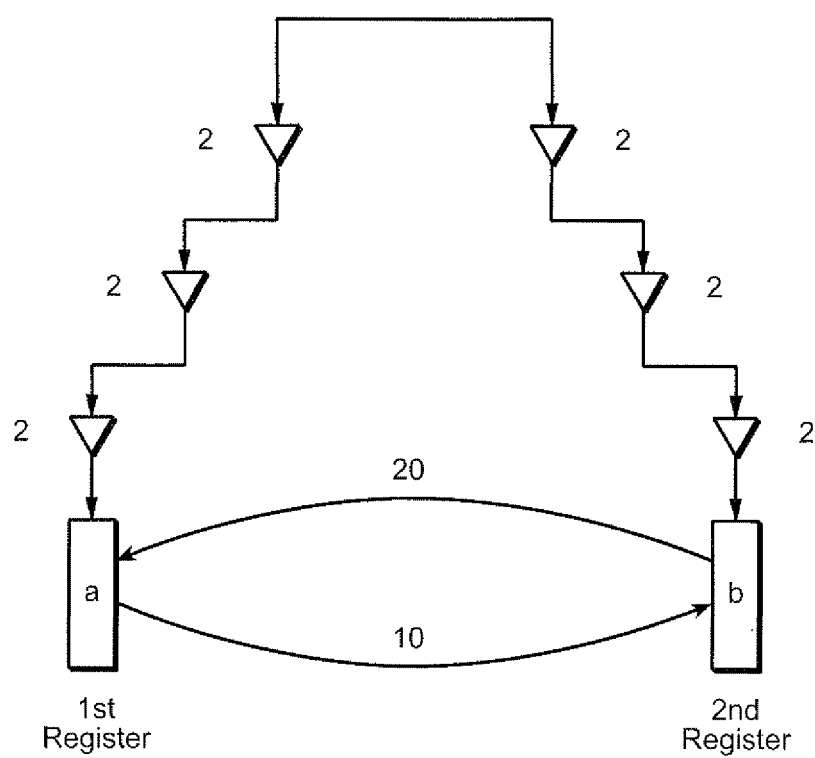
FIG. 18 is an illustrative drawing showing a portion of a circuit that includes two example registers coupled in a loop and showing non-common portions of a clock tree network coupled to the registers and that can be subject to sequential analysis in accordance with some embodiments of the invention.

Suppose this design has been placed as shown in FIG. 17A. For clarity in the figures, nets are not drawn to connect to the geometric center of the cells where the pins should be. We assume routing is done pin-to-pin to/from the cell centers in a Manhattan fashion.

Suppose the delay of an INV gate is 1 picosecond and the delay of an OR4 gate is 2 picoseconds. Assume registers have a 0 picosecond setup requirement, and assume there is a wire delay of 1 picosecond per micron of wire.

Suppose the arrival time at all inputs is taken to be 0, and the required arrival time at the output X is taken to be the same as the clock period of the design. Then the arrival time at all the inputs of O1 is 2.5 picoseconds and the arrival time at the input of R1 is 5.5 picoseconds. Therefore the clock period for this design without any changes is 5.5 picoseconds.

Figure 17B:
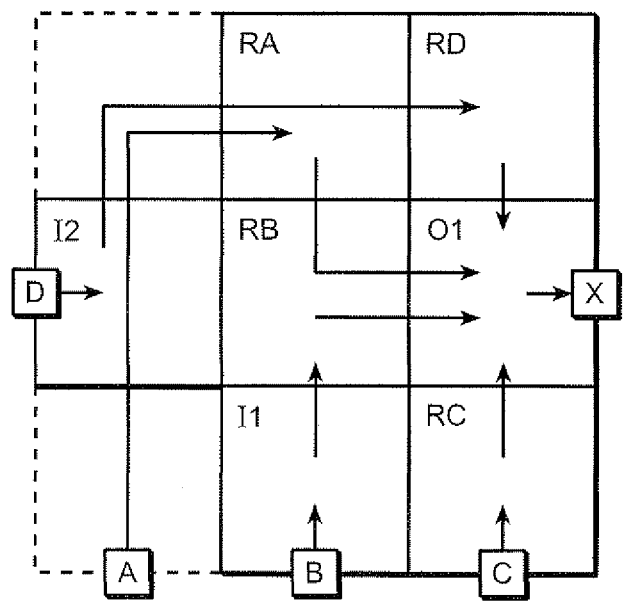

Now suppose post-placement retiming optimization is allowed, but that this is done naively without regard to sequential analysis techniques. The register R1 would be retimed across the gate O1, in order to better distribute the slack on either side of R1. However, doing so would increase the wire delay, regardless of how the retimed design is placed. To see why this must be the case, note that after the retiming there will be a total of seven gates in the design (I1, I2, O1 and four new registers introduced by the retiming of R1 across O1). This means that at least one gate must lie in the uppermost third of the design (the rectangle defined by the corners (0,2) and (3,3)). Therefore some wire must cross from the bottom section (the rectangle defined by the corners (0,0) and (3,2)) to the top section. There must also be a wire back from the top section to the bottom section, as the output X lies in the bottom section. This additional meandering of wires will incur at least an additional 2 units of delay somewhere, regardless of the layout. FIG. 17B shows one possible layout for such a retimed design. Registers associated with inputs A-D are named RA-RD, respectively. For this placement, the critical path is from RA to O1 to X, of length 4.5 picoseconds. It can be shown that this placement is optimal for the retimed design with respect to the clock period.

While this naïve post-placement retiming improves the performance of the design, we can do much better by applying sequential timing analysis and optimization. In this situation, the primary inputs and outputs can be considered a "host node" in the sequential timing graph. For the original design in FIG. 17A, the critical cycle passes through the host node represented by input A, through O1, R1 and back to the host node represented by X. The critical cycle has a mean cycle time of 3 picoseconds, meaning that sequential optimization can apply useful skew to the clock of R1 to obtain a clock period of 3 picoseconds. This is in contrast to the 4.5 picosecond clock period obtained by the retiming without consideration of sequential analysis.

The integration of the sequential analysis and optimization with the post-placement retiming is essential. While one may certainly apply clock skew scheduling to the placement of FIG. 17B as a post-processing technique, this yields inferior results, as the performance improvements due to clock skew scheduling are insufficient to overcome the degradation to the design made due to the extra wire delay added during the naïve post-placement retiming step.

Clock Tree Example

This section describes an example clock tree definition process 106-4 of the design flow of FIG. 1. The following example helps illustrate the benefits that clock scheduling provides when the sequential slack is used to relax the accuracy required in creating the clock distribution network. Assume two registers a and b are connected by two paths with delay 10 and 20 units, respectively, forming a loop, as show in FIG. 18. The non-common path in the clock tree that leads to the two registers includes three buffers, each inserting a delay of 2 units, for a total of 6 units. Assume further that the target clock period is 22 time units. If, for simplicity, hold time violations are ignored, the design must satisfy the following setup constraints:

$$(2+2+2)(1+\epsilon)+10 \leq 22+(2+2+2)(1-\epsilon)$$

$$(2+2+2)(1+\epsilon)+20 \leq 22+(2+2+2)(1-\epsilon)$$

By solving for $\epsilon$ we find that the largest permissible variation in the clock tree is $$\varepsilon = \frac{1}{6}$$

The value ϵ denotes the permissible variation, or flexibility, of the delays in the buffers of the clock tree, i.e., the delay of a buffer varies in the range 2(1−ϵ) to 2(1+ϵ). For simplicity, in this example we use one value of ϵ for the entire tree, corresponding to the maximum possible variation across all buffers. This technique is however not limited to this case, and can be applied with different flexibilities for each buffer in the tree. In addition, in this example we assume that the worst case variations in the delays of the paths connecting the two registers are already accounted for in their delays. An alternative that can be used in our approach is to consider the variations in the register to register path delays explicitly.

The flexibility in this case is due to the 2 units of combinational slack still available in the most critical of the two paths. From a sequential point of view, however, the slack is much larger, and should therefore lead to a larger flexibility in the clock tree. This can be seen by, for example, moving register b backwards in time by two units, i.e. by removing one of the buffers in the clock tree leading to register b, thus altering the clock schedule. In this case, the setup constraints become (2+2+2)(1+ϵ)+10≤22+(2+2)(1−ϵ)

(2+2)(1+ϵ)+20≤22+(2+2+2)(1−ϵ)

By solving for ϵ again we find the largest permissible variation to be $$\varepsilon = \frac{2}{5}$$

which is much larger that the previous value of ⅙. An intermediate result can be obtained by delaying the clock at register a by, for example, adding an extra buffer with delay 2. In that case, the constraints become (2+2+2+2)(1+ϵ)+10≤22+(2+2+2)(1−ϵ)

(2+2+2)(1−ϵ)+20≤22+(2+2+2+2)(1−ϵ)

giving a flexibility of $$\varepsilon = \frac{2}{7}$$

An optimization technique can be employed to maximize the flexibility available in the clock tree by using an appropriate clock schedule. For example, one optimization approach seeks to maximize design flexibilities. Given a circuit with a clock tree, additional delay can be added at each branching point. A determination is made of how much the delay can increase or decrease for different points in the clock tree. The optimization problem is formulated as a linear program in which the variables are the flexibilities of the delays of each of the buffers in the clock tree, the delay change at each branching point, and the earliest and latest arrival times in the tree. The inequality constraints are the propagation of the earliest and latest arrival times and the setup and hold constraints. The objective is to maximize the flexibilities. The optimization approach maximizes the minimum flexibility, then sets the flexibilities which form a cycle constraint, and then continues to maximize the next minimum flexibility.

Prototype of a Sequential Timing Analysis Tool

We have developed the sequential timing analysis tool (i.e. a computer program based process), that we have named "MAC". Given a register timing graph, it computes the critical cycle and the associated latencies required to achieve the minimum clock period. It can then adjust the latencies to balance the slack, in accordance with the balanced combinational slack process while maintaining the clock period.

For advanced features, the tool has the capability of distinguishing between different types of edges. This provides the opportunity to run different optimization scenarios. In one particular optimization step of the scenario, the algorithm can be configured to ignore one subset of the edges, increase the slack of the edges of a second subset (parameterized edges), while ensuring that the slack of a third subset does not decrease below a certain specified value (non-parameterized edges).

To illustrate the flexibility of this concept, consider an example with setup and hold edges. Hold constraints are important if the clock schedule is implemented only by adjusting the latencies of the clock signal at the registers and not by retiming. Hold time violations may also arise due to process variations in the clock tree. A hold time violation can be fixed by inserting additional delay with buffers or by routing detours. Naturally, it is desirable to limit the number of buffers and routing detours.

Using the MAC computer program, the following optimization scenario is possible. First, compute the minimum clock period ignoring all hold edges. Second, improve the slack of the setup edges further up to a certain specified value, after which the hold edges are added. Third, increase the slack of the hold edges subject to the constraint that the slack of a setup edge does not decrease if it is equal to or smaller than the value up to which the slack was optimized. At this step, the hold edges are treated as parameterized edges (we want to increase the slack) whereas the setup edges are treated as non-parameterized edges (we just want to keep their slack). As explained above, these two sets of edges are handled differently by the balancing algorithm.

If for some reason it is not possible to insert buffers to fix hold time violations, another optimization scenario can be applied: first, only the hold edges are considered and the setup edges are ignored. The balance algorithm increases the slack of the hold edges up to zero, i.e. they are not violated. The purpose of this step is to check if all hold constraints can be fulfilled. If not, only a limited number of all hold constraints will be violated; the corresponding edges have negative slacks. In a second optimization step, we can then add the setup edges, compute the minimum clock period subject to the hold constraints and improve the slack on the setup edges.

Another aspect of the MAC program concerns the representation of the timing data. The register timing graph as described with reference to FIGS. 6A-6B implies that the register-to-register delays are computed for the entire circuit, which could be expensive. However is not necessary to compute the entire graph. Using the capability to distinguish between parameterized and non-parameterized edge, the presented algorithms can work directly on the gate-level timing graph. Thus, the principles of the invention are not limited to a register level view of the circuit design, and they are applicable to a gate level—combinational logic level view—of a circuit design as well.

In this graph representation, each pin is represented by a vertex. The edges correspond to the combinational timing arcs of the gates, the setup and hold arcs of the registers, and the driver-to-load net connections. In addition, in order to accurately model the different delays for rising and falling edges, one can introduce two nodes for each pin, one node for the arrival time of the rising edge, and a second node for the arrival time of the falling edge. The size of the register-to-register graph can potentially grow quadratically with the size of the circuit, whereas the size of the gate-level timing graph is always linear in the size of the circuit. Being able to work on the gate-level timing graph is an important feature allowing MAC to work on large designs.

Sequential Logic Synthesis

This section describes the application of sequential timing analysis in logic synthesis. We first introduce the general concept behind our procedure and then we describe the experiments we performed using a computer software tool known as, RTL Compiler, which is produced by Cadence Design Systems of San Jose, Calif.

Figure 19A:
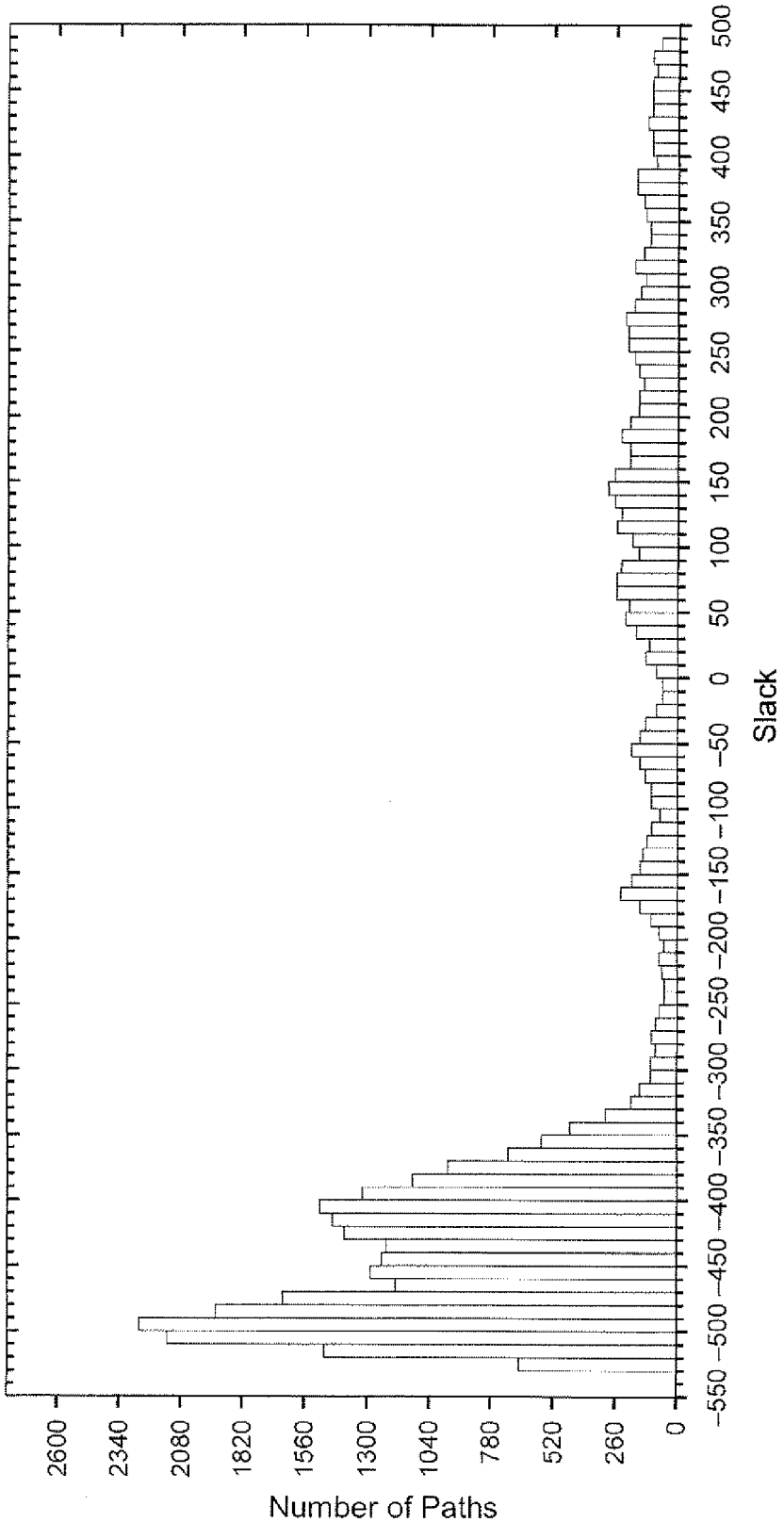
FIG. 19A-19B shows the distribution of slack over all the register-to-register paths in an example typical design (paths with over 500 ps of slack were omitted) (FIG. 19A) and the distribution of slacks for the same circuit, after clock latencies have been determined for all registers using the balanced combinational slack algorithm described with reference to FIGS. 10A-10-D (FIG. 19B).
Figure 19B:
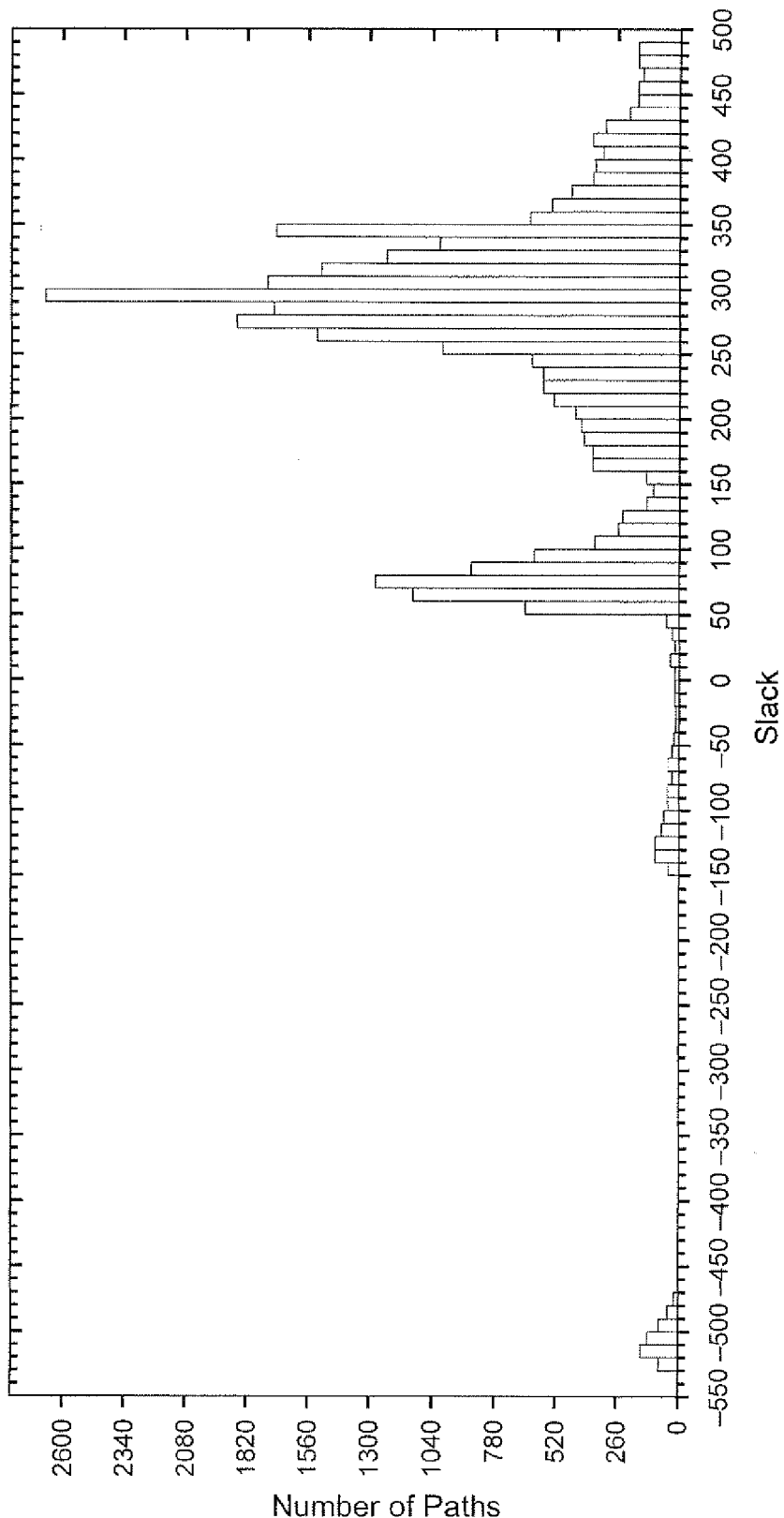

We motivate the use of sequential flexibility during logic synthesis by examining statistics for the distribution of combinational slack across a typical design. FIG. 5.1 shows these statistics for one example. FIG. 19A shows the distribution of slack over all the register-to-register paths in the design (paths with over 500 ps of slack were omitted). As can be seen, most paths are critical or near-critical in the combinational sense. FIG. 19B shows the distribution of slacks for the same circuit, after clock latencies have been determined for all registers using the balanced combinational slack algorithm described with reference to FIGS. 10A-10D. Note the strong contrast between the two histograms: the vast majority of the paths which were initially critical have been given significant flexibility after slack balancing.

Noting the striking change to the combinational slack profile after sequential flexibility is taken into account is the key to understanding how exploiting sequential flexibility can bring about significant savings in area, delay and power during logic synthesis. Without sequential flexibility, tools are forced to believe that most paths in the design are critical, restricting the scope of optimizations that can be performed. On the other hand, with the application of sequential flexibility during optimization, synthesis tools have the freedom of an expanded solution space, allowing substantial improvements to the design. This is best illustrated by noting how gate sizing algorithms tend to increase the size of gates on the critical path in order to ensure timing requirements are met. In a typical synthesis flow, a design such as the one in the example would be significantly over-sized, as many paths start off as being critical. However, by applying clock latencies to distribute slack in the circuit, many paths are no longer critical, enabling a sequential synthesis tool to save large amounts of area.

In the next section, we describe experiments performed with RTL Compiler which quantify the benefits of using sequential flexibility during logic synthesis.

Experiments with RTL Compiler

In the following we describe our experiments with RTL Compiler. We use a repeated adjustment of register clock latencies interleaved with the combinational optimization capabilities of RTL Compiler to emulate sequential logic synthesis.

Performance Optimization

We implemented an optimization loop which iteratively extracts the maximum delay for each register-to-register path using the RTL Compiler timing analysis, computes new latencies and then optimizes the design with RTL Compiler subject to the new synchronization latencies at the registers. Algorithm 3 gives an outline of this optimization loop.

---

Algorithm 3 Sequential Logic Synthesis

---

1: synthesize the circuit
2: repeat
3:    analyze timing and extract register timing graph
4:    sequential timing analysis and balance algorithm
5:    set synchronization latencies
6:    combinational logic synthesis (either with command 'synthesize'
      or command 'synthesize - incremental')
7: until terminated or no improvement

---

For the combinational optimization step we experimented with two different options, implemented by the commands 'synthesize' and 'synthesize-incremental'. 'synthesize-incremental' performs mostly local operations, for example adding or removing buffers and sizing or replicating gates. It also globally optimizes the area of the design. The 'synthesize' command structures and restructures the design in addition to the optimization mentioned before, and also performs redundancy removal.

FIG. 20 is an illustrative table that shows the characteristics of the different sequential logic synthesis test cases and the results we obtained. The first five test cases are the largest test cases of the ISCAS benchmark circuits and the last four test cases are customer designs. In this table 'clock period' is the minimum clock period with which the design can be run. The columns 'LS' show the clock period and area which can be achieved in the standard RTL Compiler flow. The following columns show the result, which we obtained by running the optimization loop (sequential optimization, logic synthesis) two times. The last column shows the relative change—a negative percentage indicates improvement. We remark that these are hypothetical results. The different latencies need to be realized by retiming or clock scheduling. Retiming may increase the number of registers and clock scheduling alone may not be possible if the difference in the latencies are too large. Violations of hold constraints may have to be fixed by inserting additional delay buffers. For these test cases we decreased the clock period such that the slack was negative, and for most of the test cases the slack remained negative even after the optimization. The primary goal was therefore to improve the cycle time. However, the results also show that for some test cases the area could be decreased quite substantially.

A detailed analysis has shown that the main improvements in the clock period are not due to the newly set synchronization latencies at the registers, but rather that the clock period is decreased in the following synthesis step. In some cases the worst path goes directly from a primary input to a primary output without passing through an intermediate register. In this situation it is not possible to improve the clock period by clock scheduling. However, one can consider assigning slack to the registers in the transitive fanin of the given primary output. This can enable refactorization to be done to reduce the delay along the worst path and improve timing in this fashion.

Area Optimization

In the sequential optimization step we use the balance algorithm to compute the latencies. It equally balances the slack such that the worst slack of all incoming paths equals the worst slack of all outgoing paths. To reduce the area of the design this is obviously not the best possible solution. For area minimization, one needs to consider the area-delay sensitivity of the incoming and outgoing logic cone of each register and adjust the register latency such that both sensitivities are equal R. Broderson, M. Horowitz, D. Markovic, B. Nikolic, and V. Stojanovic, "Methods for true power minimization," in *Digest of Technical Papers of the IEEE International Conference on Computer-Aided Design*, (San Jose, Calif.), pp. 35-42, November 2002. This is because if the sensitivity is unbalanced, one could simply gain area by increasing the delay for the side with a higher area/delay ratio.

We implemented a simple heuristic algorithm that iteratively adjusts the register latencies with the goal of reducing area. First, we increase the latency of each register by the amount of the worst slack of all paths leaving the register. Then we perform incremental synthesis. Similarly, we decrease the latencies of each register by the amount of the worst slack of all paths directed into the register, and again perform incremental synthesis.

Second, we implemented a loop over all registers: For each register we increase or decrease the latency, do an incremental synthesis step for the logic within the transitive fanin or transitive fanout, check the slacks and compute the change in area. Such a change in the latency is accepted if the slack does not become negative and the area decreases.

With this additional optimization step we found we could decrease the area further, by between 1.5% and 5.5%. Inspired by these results we intend to direct further research to developing a new global sequential optimization algorithm which can minimize the area subject to a given clock period. We note that reducing area also reduces the power consumption of a chip, especially in the case that the latency adjustments simply change the gate sizing.

Sequential Placement

Growing design sizes and increasingly aggressive timing requirements have led to the abandonment of the traditional separation between logic synthesis and physical optimization. Abstract modeling is no longer sufficient to capture the true impact of physical effects on a finished design. This holds equally true for our sequential synthesis flow. Retiming and clock skew scheduling must take interconnect delays into account in a true and accurate fashion in order to be effective. Thus, in our studies we have included experiments that incorporate sequential optimization techniques with physical placement.

There are two primary concepts we wish to capture in combining layout and sequential optimization. First, we wish to consider the impact of wire delays on the overall design performance. Interconnect delay is generally an important consideration for those wires which lie on the critical cycle. Introducing additional delay on the critical cycle directly impacts the clock period of the final design, while those portions of the circuit which do not lie on the critical cycle can typically tolerate larger delays. Second, we wish to account for the problem of clock distribution to those registers which lie on the critical cycle. We recognize that uncontrolled clock skew (e.g. through process or manufacturing variation) is generally detrimental to the clock period of the final product when it is encountered on the registers of the critical cycle, since there is zero timing flexibility for those registers. As such, we wish to minimize inadvertent skew for the critical cycle.

Both of these primary concepts translate directly into spatial locality in the placement domain. Ensuring the critical cycle is localized to a small area helps keep wirelengths short. Additionally, locality helps keep the clock distribution network among the critical registers short, which helps reduce harmful skew. However, today's placement tools generally do not deal with sequential optimization. Generally, the metrics in use today focus on minimization of total wirelength, with additional consideration for combinational timing requirements. As such, there is a huge opportunity for optimization that is currently not being exploited. To see this, we show in FIG. 6.1 placements obtained from different placement tools.

Figure 21A:
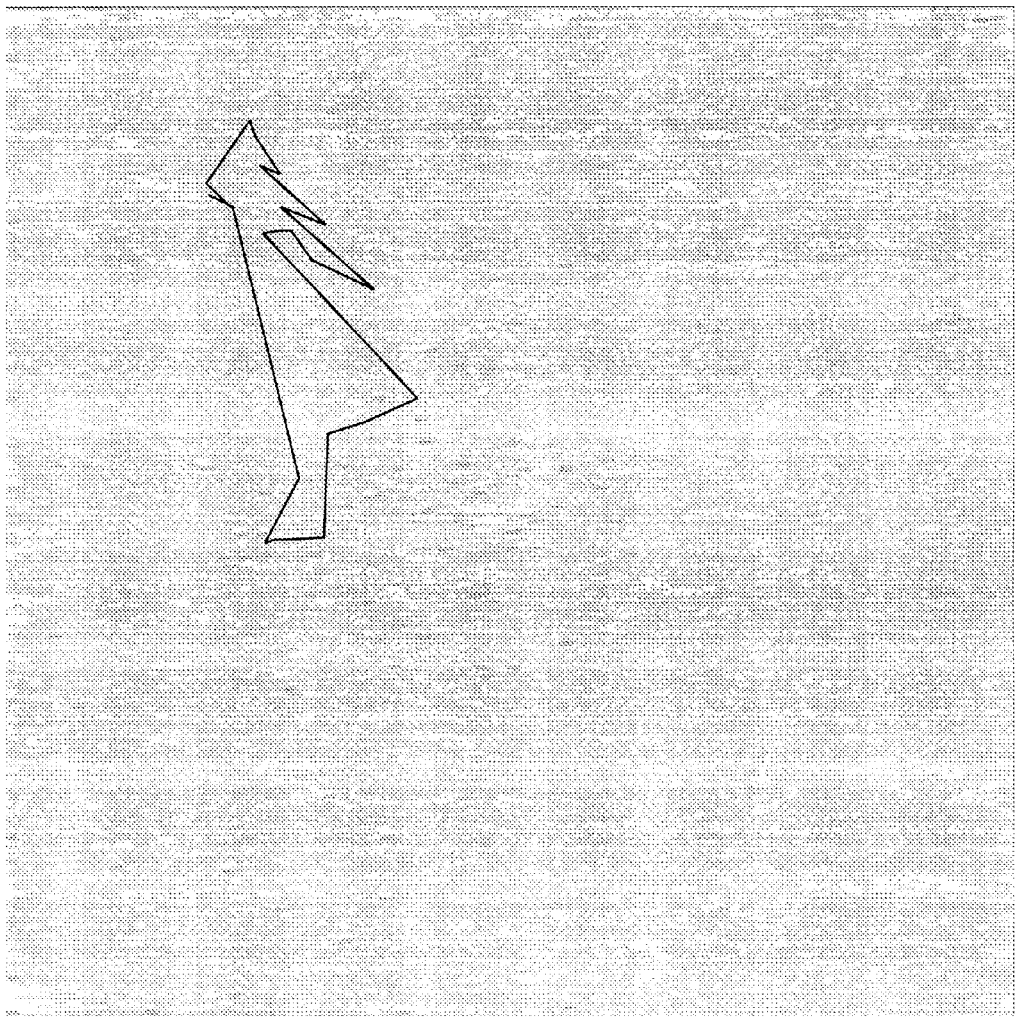
FIG. 21A-21D are illustrative representations of four different placements using different placement techniques.
Figure 21B:
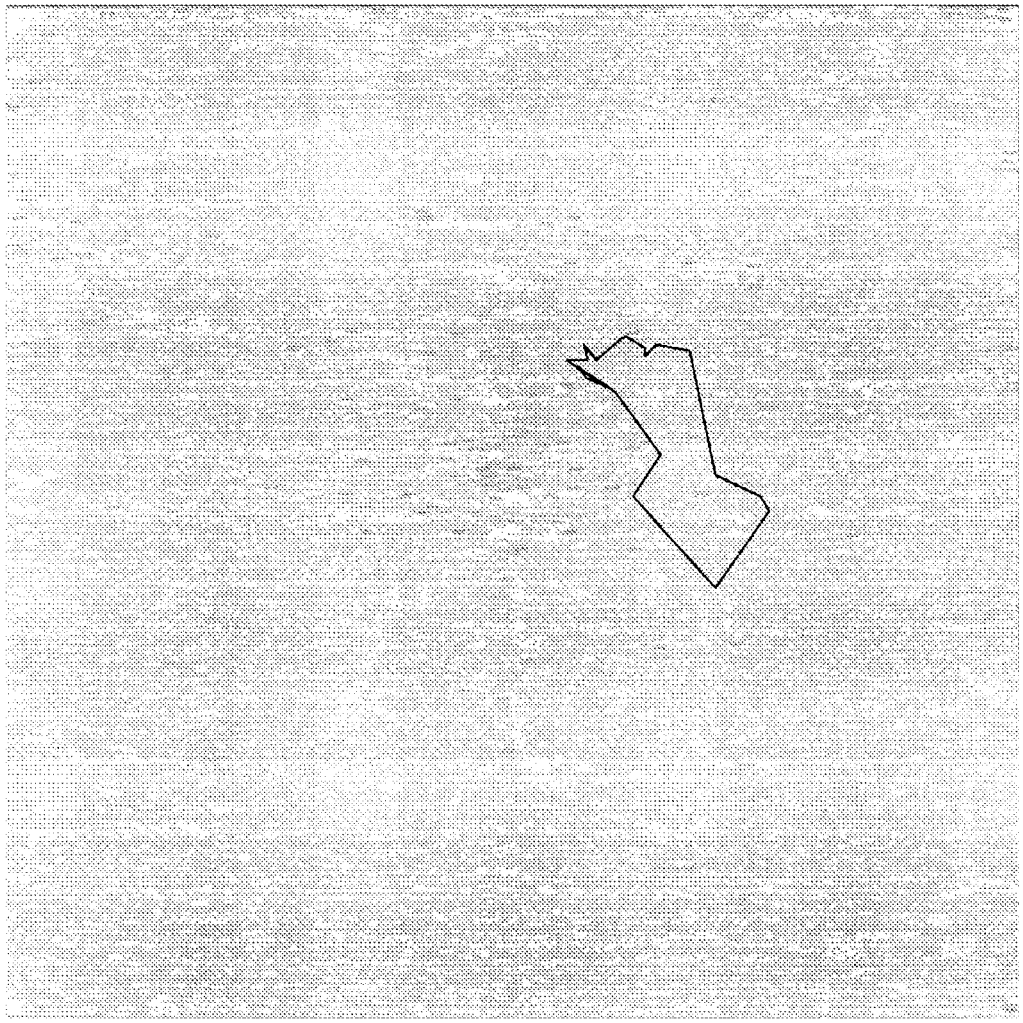
Figure 21C:
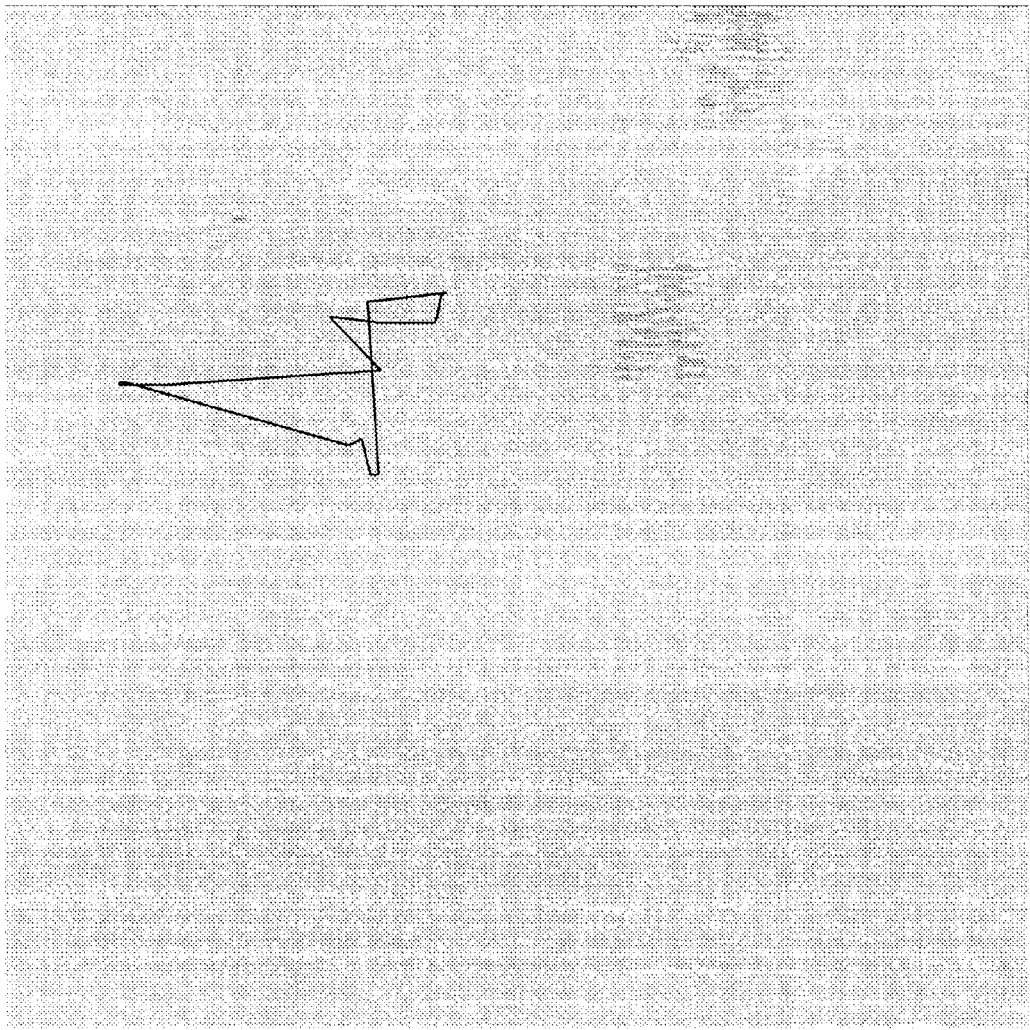

FIG. 21A shows a placement obtained using a traditional quadratic programming-based placement tool, similar to, GORDIAN. See, J. M. Kleinhans, G. Sigl, and F M. Johannes, "GORDIAN: A global optimization/rectangle dissection method for cell placement," in *Digest of Technical Papers of the IEEE International Conference on Computer-Aided Design*, (Santa Clara, Calif.), pp. 506-509, November 1988. FIG. 21B shows the same placement obtained using a combinational slack-driven placer, using similar techniques to those found in modern timing-driven placement tools. FIG. 21C shows the design placed using CAPO, a leading-edge placement tool developed at UCLA. In all three placements, note that the critical cycle (shown darkened) spans across a substantial portion of the die. The additional wire delay on the critical cycle leads to significant degradation in performance. Also, the registers for the critical cycle are physically spaced apart, making accurate clock delivery much less reliable and hence subject to detrimental skew introduced by process and manufacturing variations. For reference, the given design contains over 150,000 cells; the wirelengths and distances involved are non-negligible.

Figure 21D:
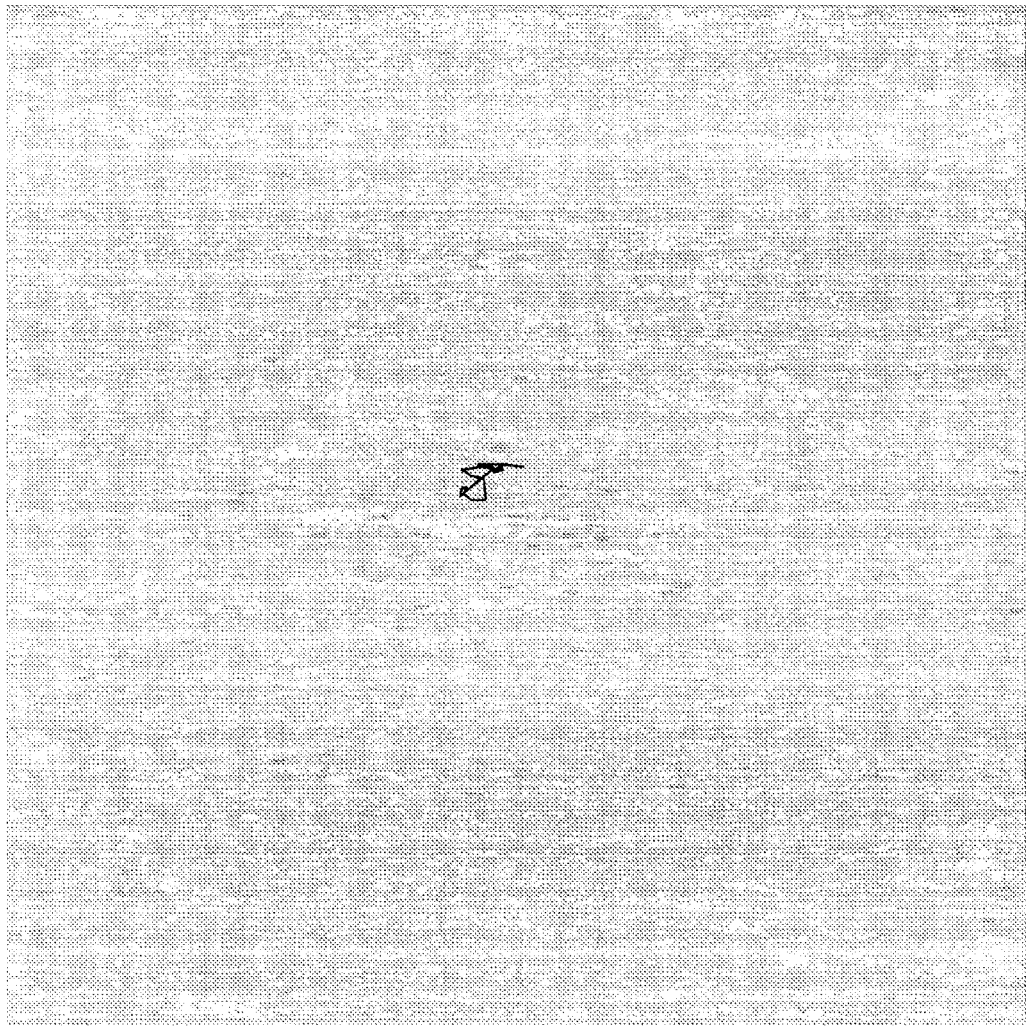

In contrast, FIG. 21D shows a placement obtained using a prototype sequential placement tool we have developed, described below. Our tool has clearly localized the critical cycle. This translates directly into a faster design, due to less wireload on the critical portions, and greater simplicity of clock tree construction necessary to support the faster design. For this example, our tool yields a 50% reduction in wire delay compared to the solution found by Capo, and a 77% reduction in wire delay compared to the combinational slack-driven placer.

We examined two approaches to introducing sequential optimization awareness into a placement technique. The first experiment uses SoC Encounter, a computer software tool named produced by Cadence Design Systems of San Jose Calif., which we augmented with our sequential timing analysis techniques. Results from this experiment are mixed, and suggest that a placement tool that optimizes combinational timing does not adequately handle sequential flexibility, and thus such a tool may not be ideal for incorporating into a sequential synthesis flow. For our second experiment, we developed a unique placement tool prototype. This novel tool accounts for sequential flexibility using sequential slack-based net weights along with physical layout constraints derived from our sequential timing analysis. Although we must stress that this is still an early prototype, the initial results obtained are excellent, suggesting that this will likely be a fruitful avenue for future work.

Experiments with SoC Encounter

Many concepts related to using sequential timing information during placement are explained in C. Hurst, P. Chong, A.

Kuehlmann, Physical Placement Driven by Sequential Timing Analysis, *ICCAD*, 2004, pp. 379-386, November, 2004.

Similar to our experiments with RTL Compiler, we have implemented a TCL interface between SoC Encounter and the clock scheduling program MAC to perform a sequential timing driven placement. The basic flow is presented in Algorithm 4.

---
Algorithm 4 Sequential Placement with SOC Encounter
---
1: Set latencies of all registers to zero
2: Timing driven placement (TDP 1)
3: Trial Route, extraction and timing analysis to extract the register timing graph
4: Sequential timing analysis: Balanced Slack Algorithm (STA 1)
5: Set computed latencies at registers
6: Timing driven placement (TDP 2)
7: Trial Route, extraction and timing analysis to extract the register timing graph
8: Sequential timing analysis: Balanced Slack Algorithm (STA 2)
---

First we generate a timing-driven placement with SoC Encounter. Based on a simple "Trial Route" (a procedure of Encounter) the register-to-register timing information is extracted from the layout. New register latencies are computed using the balanced combinational slack algorithm described above with reference to FIGS. 10A-10D. As timing information comes from the initial placement, the latencies should thus be more accurate than a pre-placement timing estimation without wire delays. The computed clock latencies are applied to the registers with the Encounter command set_clock_latency. With these latencies a second timing-driven placement is generated with SoC Encounter. Finally, wire delays are extracted from this second placement and used to generate a second set of clock latencies.

The results are shown in Table 1. Our expectations were that the second timing driven placement generated with the clock latencies would give better results. These expectations were not fulfilled. In fact, for all our test cases we obtained exactly the opposite outcome: the slack of the new placement was worse.

TABLE 1

| Design | Clock Period (ns) | TDP 1 Slack (ns) | CS 1 Slack (ns) | TDP 2 Slack (ns) | CS 2 Slack (ns) |
|---|---|---|---|---|---|
| Design A | 7.50 | −0.752 | −0.467 | −1.565 | −0.442 |
| Design B | 3.85 | −3.053 | −2.949 | −4.378 | −3.155 |
| Design C | 5.00 | −32.173 | −14.832 | −50.106 | −37.787 |
| Design D | 1.43 | −3.423 | −2.653 | −3.893 | −2.720 |

Table 1 shows results obtained with SoC Encounter: First, a standard timing driven placement is generated (TDP 1). Next, the timing is optimized using the balanced combinational slack algorithm (CS 1). Based on the new latencies another timing driven placement is generated (TDP 2). Timing is optimized by applying a new clock schedule (CS 2).

Figure 22A:
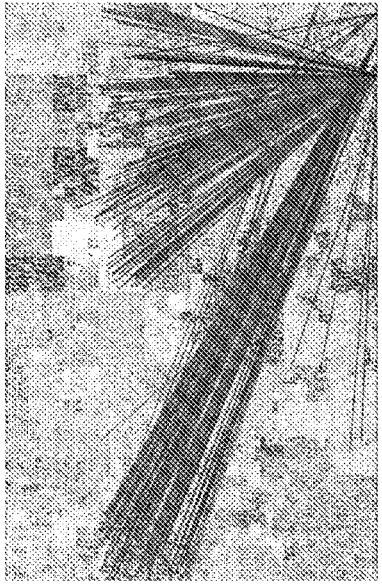
FIGS. 22A-22D show a progression of placement results using the Encounter™ tool and the balanced combinational slack algorithm applied to one example circuit.
Figure 22B:
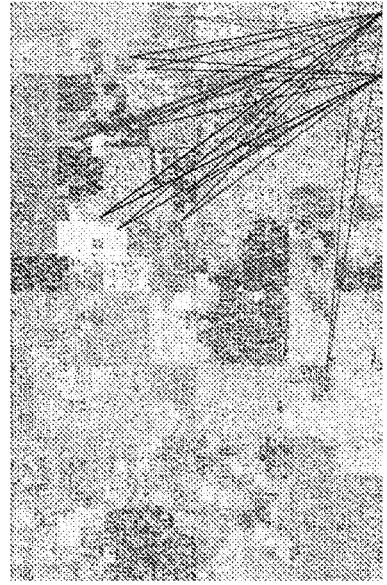
Figure 22C:
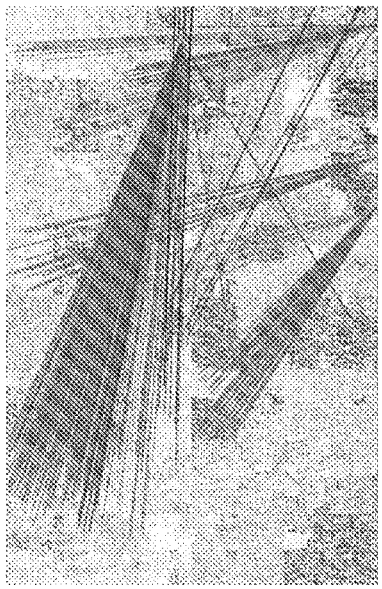
Figure 22D:

FIGS. 22A-22D show a progression of placement results using the Encounter™ and the balanced combinational slack algorithm applied to one example circuit. FIG. 22A and FIG. 22C show critical paths. FIG. 22B and FIG. 22D show critical cycles. Cells are colored (shaded in B&W) according to module hierarchy. In FIG. 22B and FIG. 22D, the 20 most critical cycles are shown. As can be seen from the FIG. 22B and FIG. 22D, there is little noticeable improvement in the physical locations of critical cycles found in the second placement, even after sequential optimization has been introduced.

Although the experimental work using this approach is still fairly young, the results suggest that this approach using the Encounter placer is not entirely suited for dealing with sequential criticality in a sequential synthesis flaw. We thus turn to a placement tool customized for our task.

Prototype of a Sequential Placement Tool

The following sections describe a prototype placement tool that uses sequential timing information to maximize the potential of post-placement retiming or clock skew scheduling. The general procedure, outlined in Algorithm 5, involves three phases: (1) sequential timing analysis, (2) assignment of weights based on sequential criticality, and (3) introduction of explicit cycle constraints.

---
Algorithm 5 Sequential Slack-Weighted Placement
---
1: sequential timing analysis
2: assign net weights w(i)
3: partition $P_0 \leftarrow allcells$
4: while $\exists P(|P| > m)$ do {GORDIAN main loop}
5:   solve global constrained QP
6:   bipartition all P where $|P| > m$
7: solve final global constrained QP
8: (optional) do placement with cycle constraints (Algorithm 7)
9: legalize placement into rows
---

We have implemented a modified version of GORDIAN See, J. M. Kleinhans, et al., "GORDIAN: A global optimization/rectangle dissection method for cell placement,", supra. In this procedure, phases of global optimization are interleaved with bipartitioning. A quadratic programming (QP) problem is constructed to minimize the total weighted quadratic wirelength $$\Sigma \alpha_{ij}[(x_i-x_j)^2+(y_i-y_j)^2]$$

subject to a set of linear constraints. This problem is solved for the entire chip, and the positions of all cells are updated. Based on this information, the cells in every subregion that contain more than m members are bipartitioned in a manner similar to that described by, R. S. Tsay, E. S. Kuh, and C.-P. Hsu, "PROUD: A sea-of-gates placement algorithm," *IEEE Design & Test Of Computers*, vol. 5, pp. 44-56, December 1988, in order to minimize the total number of wires across the cut and maintain reasonably balanced halves. The coordinates of the center of each subregion are computed and a linear center-of-gravity (COG) constraint is imposed on its members. The QP is updated to include these new constraints and the global optimization is repeated. GORDIAN is well suited to the requirements described above; nets can be easily weighted in both the global optimization and bipartitioning phases, and additional constraints can be seamlessly imposed on the solution of the QP.

Sequential Slack Weighting

Net are assigned weights proportional to its relative sequential criticality. This is done to give priority to minimizing the lengths of the most critical wires as they are the most likely ones to limit the achievable clock period. After performing a sequential timing analysis as described above, we have a function $S_{seq}$ that gives an approximation of the sequential flexibility at each timing point; this is the inverse of sequential criticality. A timing point is the input or output of any gate in the circuit; this is in contrast with the nodes in the register timing graphs, which only correspond to the registers.

The sequential slack of a timing point is equal to the minimum slack for any register in its transitive fanin or fanout; i.e. the minimum slack of any cycle in which that timing point participates.

We use the following equation to compute the net weight w(i):

$$w(i) = 1 + \frac{\beta}{\gamma + S_{seq}(i)/\phi}$$

The constants $\beta$ and $\gamma$ are chosen to tune the distribution of weights between the most and least critical nets. This is then applied to every connection $\alpha_{ij}$, in addition to scaling based on fanout.

This weighting alone is enough to produce layouts with improved sequential timing characteristics, but its limitations should be recognized. Like their combinational counterparts, sequential slacks are inherently incompatible. Also, without computing the true sequential slacks, the problems described above with respect to ordinary sequential slack can also arise. Both of these problems can be solved with the introduction of cycle constraints. Our iterative algorithm to handle these constraints helps ensure that we catch all critical cycles.

Explicit Cycle Constraints

Assuming complete flexibility in assigning skew to all registers, for a cycle l in the circuit to satisfy a target clock period $\phi$, we must have, $$t_g(l) + t_w(l) \leq N(l)\phi$$

where $t_g(l)$ is total intrinsic gate delay around l, $t_w(l)$ is the total wireload delay around l, and $N(l)$ is the number of registers in l.

Suppose we have a existing placement P' in which the above constraint is violated. Let $t_w'(l)$ be the wireload delay around l for P', and let d(l) be the total delay around l for P'. Then we have, $$t_g(l) + t_w'(l) = d(l) \text{ and } \frac{t_w(l)}{t_w'(l)} \leq \frac{N(l)\phi - t_g(l)}{d(l) - t_g(l)} \triangleq \mu(l)$$

which defines the wireload delay reduction factor $\mu(l)$ necessary for l to have a valid clock skew schedule for the target period.

Let (x',y') be the locations of the cells for the given placement P'. We wish to derive a new placement P=(x, y) which satisfies the above given delay constraints. As an approximation, we take the wire delay for a cycle as being proportional to the sum of the squared Euclidean distances between cells in that cycle. That is, $$t_w(l) = \eta \sum_{(u,v) \in l} (x_u - x_v)^2 + (y_u - y_v)^2$$

where $\eta$ is a constant. Thus the physical placement constraints are, $$\frac{\sum_{(u,v) \in l} (x_u - x_v)^2 + (y_u - y_v)^2}{\sum_{(u,v) \in l} (x_u' - x_v')^2 + (y_u' - y_v')^2} \leq \mu(l) \quad (6.1)$$

The denominator in inequality (6.1) as well as $\mu(l)$ are completely determined from the given placement and timing information. Thus inequality (6.1) contains only quadratic terms in (x, y). Also note that these constraints are convex.

We justify approximating total wire delay with the sum of square Euclidean distances by our use of an iterative algorithm to solve the constrained system. We aim to make only small changes to the layout during each iteration, so that any error in this approximation can be subsequently corrected. Details may be found below.

Lagrangian Relaxation

To realize the placement constraints, we use Lagrangian relaxation, a standard technique for converting constrained optimization problems into unconstrained problems. For brevity, we only present a simplified description of this approach here. More information about Lagrangian relaxation can be found in: P. M. Pardalos and M. G. Resende, eds., *Handbook of Applied Optimization*. Oxford University Press, 2002; E. Golshtein and N. Treityakov, *Modified Lagrangians and Monotone Maps in Optimization*. John Wiley and Sons, 1996; and A. Srinivasan, K. Chaudhary, and E. S. Kuh, "RITUAL: A performance-driven placement algorithm," *IEEE Transactions on Circuits and Systems*, vol. 37, pp. 825-839, November 1992.

Let f (x, y) be the sum of square wirelengths over all wires in the design for the placement (x, y). Recall that the classical analytic placement formulation is simply the unconstrained problem $\min_{x,y} f(x,y)$. Our constrained problem then is, $$\min_{x,y} f(x, y) \text{ such that } g(x, y) \leq 0 \quad (6.2)$$

where the vector g represents the placement constraints. For each cycle in the design, there is a single element in g which corresponds to the constraint inequality (6.1) for that cycle. We create the Lagrangian L(x,y,k)=f(x,y)−k·g(x,y), where k is a vector of Lagrangian multipliers; k can be thought of as "penalties" which serve to increase the value of the cost function whenever a constraint is violated. The Lagrangian dual problem is $$\max_{k \geq 0} \min_{x,y} L(x, y, k) \quad (6.3)$$

Our interest in the dual problem lies in the fact that, for convex problems such as ours, a solution for (6.3) corresponds directly to a solution for the original problem (6.2). We use a standard technique of subgradient optimization to solve the dual (Algorithm 6).

---

Algorithm 6 Subgradient Optimization For Lagrangian Dual

1: k ← 0
2: x,y ← arg $\min_{x,y}$ L(x,y,k)

| Algorithm 6 Subgradient Optimization For Lagrangian Dual |
| --- |
| 3:    while KKT conditions are not satisfied do |
| 4:       $k \leftarrow \max(0, k+\gamma \cdot g(x,y))$ |
| 5:       $x,y \leftarrow \arg\min_{x,y} L(x,y,k)$ |

For a fixed k, $\min_{x,y}$ solved as an ordinary unconstrained quadratic program. k is then adjusted based on the violated constraints which are found; if a constraint is violated, the corresponding penalty is increased, so that subsequent iterations will reduce the violations to minimize the cost function. Heuristics are available to determine an appropriate step size γ to adjust k; e.g. A. Srinivasan, K. Chaudhary, and E. S. Kuh, "RITUAL: A performance-driven placement algorithm," *IEEE Transactions on Circuits and Systems*, vol. 37, pp. 825-839, November 1992; and .P. M. Pardalos and M. G. Resende, eds., *Handbook of Applied Optimization*. Oxford University Press, 2002. The Karush-Kuhn-Tucker (KKT) conditions for stopping the algorithm are described fully in P. M. Pardalos, et al., *Handbook of Applied Optimization*. Roughly speaking, the procedure stops once the penalty multipliers grow large enough to force all constraint violations to zero.

Of course, the design may have many cycles, and thus there may be many constraints involved. We propose an iterative technique, given in Algorithm 7, which reduces the number of cycles under consideration by ignoring non-critical cycles.

| Algorithm 7 Placement Using Cycle Constraints |
| --- |
| 1:   input: an initial placement |
| 2:   $T_c \leftarrow$ current MMC, $S \leftarrow$ {critical cycles} |
| 3:   while $T_c > T_f$ do |
| 4:      choose target clock period $T, T_f \leq T < T_c$ |
| 5:      for all cycles $l \in S$ do |
| 6:         add cycle constraint for $l$ with target T |
| 7:      remove all cells in S from COG bins |
| 8:      solve QP with cycle constraints (ALGORITHM 6) |
| 9:      reassign all cells in S to nearest COG |
| 10:     solve QP with cycle constraints (ALGORITHM 6) |
| 11:     $T_c \leftarrow$ current MMC, $S \leftarrow S \cup$ {critical cycles} |

In each iteration, we add the critical cycles found in the current placement to the constraint set S. A clock period T is chosen which we use as a target period for determining the cycle constraints for S. T is decreased slowly from $T_c$, the feasible clock period for the current placement, down to $T_f$, the final overall target clock period for the design. A slow adjustment of T helps ensure that we do not overconstrain the current constraint set S while ignoring other cycles. That is, we do not wish to "squeeze too hard" on those cycles which are currently critical, as this may cause some other cycle not under consideration to violate its timing constraint. Also, as noted before, we wish to perturb the placement only by small amounts, so that any error in our quadratic approximation of the wire delays can be corrected.

A significant benefit to using the iterative technique proposed in Algorithm 7 is that we are able to correct errors in our estimate of the true sequential slack so that subsequent iterations may have a better estimate of the sequential flexibility of each gate. Recall that true sequential slack $S_{true}(v)$ is computationally expensive. Our experiments show balanced combinational slack and ordinary sequential slack can be used to estimate true sequential slack in practical applications.

In this example approach, we use the ordinary sequential slack $S_{seq}(v, v_{ref})$ to estimate true sequential slack $S_{true}(v)$; here we choose $v_{ref}$ to be a vertex on the critical cycle, in order to minimize the potential error. Nonetheless, there will still be error present in this estimation. However, as we use an iterative technique for placement, the set of critical cycles tends to change with each iteration, which helps to ensure that we compute $S_{seq}$ with respect to several different choices of $v_{ref}$. This way, if we mistakenly identify a critical vertex as non-critical, we will be able to correct the mistake in subsequent iterations. In contrast, J. Cong and S. K. Lim, "Physical planning with retiming," in *Digest of Technical Papers of the IEEE/ACM International Conference on Computer-Aided Design*, (San Jose, Calif.), pp. 1-7, November 2000, always takes $v_{ref} = v_{ext}$, and so has no opportunity to correct such errors.

Center-of-gravity (COG) constraints are typically used in analytic placement techniques to ensure that the cells are spread out relatively evenly over the entire die area. We also wish our constrained placement to be appropriately spread out over the die area, but we do not wish the COG constraints to overconstrain our solution. We approach this problem using steps 7-10 in Algorithm 7, which allows critical cells to "migrate" to appropriate locations on the die to avoid violation of timing constraints.

As a practical point, we also introduce cycles which are near-critical during each iteration, instead of only the critical cycles, to help reduce the number of iterations performed. Instead of finding one critical cycle, adding it to the constraints, solving the constrained system to get new placement locations, and repeating this, adding one cycle at a time, we seek to add many cycles at a time, so that we reduce the number of times we update our constraints and compute new placements, saving computation effort. But we should not add just any cycles, only those which we expect would become critical in later iterations of this algorithm. As such, we only take the near-critical cycles (i.e. cycles with very little slack) as these are the candidates most likely to become critical later on. Also, the main loop is terminated whenever either of the constrained QPs indicate that the problem may have become overconstrained, as no further improvement becomes possible in such case.

Our approach shares some similarity with that of, A. Srinivasan, K. Chaudhary, and E. S. Kuh, "RITUAL: A performance-driven placement algorithm," *IEEE Transactions on Circuits and Systems*, vol. 37, pp. 825-839, November 1992, which also uses Lagrangian relaxation in an analytic placement framework to resolve timing constraints. However, there are several key differences between our work and that of A. Srinivasan, K. Chaudhary et al. First, and most important, is that we deal with the cyclic timing constraints which arise during clock skew scheduling, rather than simply path constraints. Second, we do not use the analytic placement step itself to perform timing analysis. The practical effect of this is twofold: our approach allows us to use general, nonlinear (and nonconvex) wire delay models, and we also do not encounter the degeneracy problems inherent in the constraints which come from timing analysis, as mentioned by A. Srinivasan, K. Chaudhary et al. Finally, we enjoy much greater computational efficiency, as our Lagrangian function can be seen as simply augmenting the weights of edges between cells by k. Solving the Lagrangian dual for fixed k requires no more computation than solving an unconstrained QP for our circuit.

Row Legalization

Our approach to assigning cells to nonoverlapping positions in standard cell rows differs from the techniques typically used for this problem. Rather than the usual minimization of wirelength, our goal is instead to minimize the perturbation of the final layout with respect to the solution of the QP, to avoid disturbing the placement of critical cycles. To this end, we first sort all cells into the nearest cell rows, moving cells to adjacent rows whenever rows become overfilled. Next, for each row we solve a linear program to minimize the sum of the deviations of each cell from the QP solution. Linear constraints are added to handle the non-overlap of cells within the row.

Experimental Setup

We ran our placement tool on a set of ten industrial benchmark circuits as well as five of the largest synchronous designs from the ISCAS89 benchmark suite. The ISCAS89 circuits were techmapped using an industrial synthesis tool into an arbitrary library from the industrial benchmarks.

The industrial libraries provided with the designs used interpolated lookup-table based models to characterize the cells. Both capacitive load and slew rate dependencies were incorporated in our timing model. The design technology files gave the electrical characterization for the wires; in all cases, we assumed the use of metal layer 3 for routing. We used the half-perimeter bounding box metric as our estimate of the wirelength, noting that our algorithms are actually independent of the wireload estimation technique used, unlike other works, e.g. A. Srinivasan, K. Chaudhary, et al., supra.

Currently, our placement tool can only handle single-row cells, so we found it necessary to convert some circuit elements to single-row instances, for the purpose of our experiments. Double-row cells were given a different aspect ratio, keeping the same area. Large macros were given an arbitrary size. I/O pads were assigned randomly around the die perimeter.

Limitations in our timing analysis tool required some design changes to be made. Transparent latches were treated as ordinary registers, and combinational cycles were broken arbitrarily. Some hard macros did not have timing information associated with them, so for the purpose of timing analysis hard macros were treated as if they were I/Os for the overall circuit. Some designs used multiple clock domains. As we had no additional information regarding the relative phases and clock frequencies of such, we uniformly regarded the circuits as having only a single clock domain. We note, however, that the techniques described in this paper can be easily extended to multiple clock domains.

Experimental Results

Our experimental results are shown in table of FIG. 23. The Size column indicates the number of placed instances for the design. The Reg column indicates the number of registers. The NW MMC column gives the MMC for the design when no wireload is taken into consideration; this is the minimum feasible clock period. The REG MMC column shows the MMC achieved for a completely placed design using our placement flow with equal weights attached to the wires; effectively, this is a placement tool similar to GORDIAN. The COM MMC column shows the MMC achieved after placement using a combinational slack-based weighting function for the nets.

The SEQ MMC column indicates the MMC achieved after placement using the sequential slack-based weighting for the nets. The percentage figure indicates the wire delay reduction for the SEQ MMC result compared with the COM MMC result. This is arguably a better figure of merit than the absolute reduction in clock period, since no placer can ever hope to reduce the clock period below the no wireload MMC. The Run column indicates the run time for this algorithm, in seconds.

The CYCLE MMC column indicates the MMC achieved after placement using the cycle constraint technique described above, again with the percentage indicating reduction in wire delay compared to the combinational-weighted technique, and the Run column indicating the run time in seconds.

We also compare our placement tool against Capo, a leading-edge placer which focuses on wirelength minimization. See A. E. Caldwell, A. B. Kahng, and I. L. Markov, "Can recursive bisection alone produce routable placements?," in *ACM/IEEE Design Automation Conference*, pp. 477-482, 2000. As the two placers have different objectives, we certainly do not expect either one to be competitive in the other's problem domain. However, the comparison serves to quantity the benefit of using a sequential flexibility-aware placer, rather than choosing an placer which is best suited for another task. The CAPO MMC column in the table of FIG. 23 shows the MMC obtained after placement using Capo, the Run column indicates the run time for Capo in seconds, and the CYvsCA column indicates the percentage improvement in wire delay of our cycle constraint-based technique compared to the placement from Capo.

We show significant improvement in achievable clock period through application of our algorithm. We achieved an improvement in wire delay of 27.7% over a combinational slack-weighted placement technique, and 32.2% improvement over the results of Capo.

On average, our tool gives a 57.1% increase in total wirelength compared with Capo. We note that our tool currently does little to control the total wirelength of the final placed design. As there are many nets in the design which are not critical, there is much opportunity for us to further reduce wirelength, especially during row legalization, which, as noted before, seeks only to minimize the perturbation of the QP solution and ignores wirelength completely. Additionally, modern partitioning techniques such as those found in Capo can replace the simple partitioning algorithm we use, especially at the coarsest levels of partitioning, where the information provided by the QP solution is limited. These are just a couple of the techniques we can apply to further reduce wirelength in our tool.

Run times are measured in CPU seconds on a 3 GHz Pentium 4 processor. Our placement flow is competitive with Capo with regard to run time, even with the inclusion of computationally expensive sequential timing analysis which is absent in Capo. Still, there is significant potential to decrease run time further.

Post-Placement Retiming and Clock Skew Scheduling General Concept

Clock skew scheduling and retiming are two alternative techniques to implement the synchronization latencies assumed for the sequential optimization steps described before. In clock skew scheduling, the intentional differences in the clock arrival times, also referred to as "useful skew", are implemented by designing dedicated delays into the clock distribution. Alternatively, retiming balances the path delays by relocating the registers.

Retiming, applied as post-placement step, is a straightforward extension of existing in-place optimization techniques such as re-buffering or local logic restructuring. See, O. Coudert, J. Cong, S. Malik, and M. S. Sarrafzadeh, "Incremental cad," in *Digest of Technical Papers of the IEEE/ACM*

*International Conference on Computer-Aided Design*, (San Jose, Calif.), pp. 236-243, November 2000. For a given placement, e.g. derived by the algorithm described above, the exact timing of the gates and fairly good estimates of the interconnect timing are known. One possible approach to compute the new register positions is based on the traditional delay-constrained min-area retiming formulation. See, I. S. Kourtev and E. G. Friedman, *Timing Optimization Through Clock Skew Scheduling*. Norwell, M A: Kluwer Academic Publishers, 2001. For implementing the retiming solution, the placement should be updated incrementally to provide space for the new registers. This, in turn, changes some of the interconnect delays thus possibly requiring a repeated application of retiming and incremental placement until it reaches a stable solution. Ultimately, the register retiming should be integrated into the second phase of the sequential placement algorithm described above. By considering the register areas during the iterative processing of the critical cycle, the delay updates are automatically taken into account and a legal placement is generated.

In a combined approach of retiming and clock skew scheduling, the availability of dedicated clock latencies can be used to relax the strict requirements on register relocations. For example, instead of moving the register backward through a gate, its clock latency can be increased resulting in an identical impact on the timing behavior. Depending on the range of implementable clock latencies, the application of retiming can then be reduced to the few cases where the clock delays would be too large for a reliable implementation.

Clearly, there is a three way trade-off between (1) the amount of register retiming moves, (2) the capability of reliably implementing large clock latencies for individual registers, and (3) the amount of sequential flexibility usable for sequential optimization. For example, in the absence of retiming and with a zero-skew clock distribution, the optimization potential is reduced to the pure combinational case. If only retiming is available, a large number of retiming moves might be required to implement substantial sequential optimization moves. This, in turn, may increase the number of registers, power consumption, and resources for clock routing. On the other hand, if large clock latencies can be implemented in a reliable manner, retiming might be fully avoided, addressing some of the practical acceptance problems. In another extreme, the use of large clock latencies could enable a low-power design methodology based on min-area retiming.

Overview of Current Clock Implementation Methods

Traditionally, clock distribution networks were implemented using a "zero-skew" methodology, which minimizes the difference of the clock signal arrival time at the registers. Such approach directly reflected the underlying combinational synthesis paradigm where the longest delay of any combinational path adjusted by the unintentional clock skew between its two registers determines the maximal clock frequency of a design. High-performance designs with extreme requirements on low clock skew use expensive clock distribution methods such as clock meshes, H-trees, or a combination. See, P. Restle, T. McNamara, D. Webber, P. Camporese, K. Eng, K. Jenkins, D. Allen, M. Rohn, M. Quaranta, D. Boerstler, C. Alpert, C. Carter, R. Bailey, J. Petrovick, B. Krauter, and B. McCredie, "A clock distribution network for microprocessors," *Journal of Solid-State Circuits*, vol. 36, no. 5, pp. 792-799, 2001. Because of their high power consumption and large routing resources such methods are only practical for selected custom-designed chips for critical parts of ASIC designs.

Low-cost clock solutions for ASIC designs are typically based on a bottom-up construction of a balanced or unbalanced clock tree using some modification of the clock tree synthesis algorithm presented in R. S. Tsay, "An exact zero-skew clock routing algorithm," *IEEE Transactions on Computer-Aided Design of Integrated Circuits and Systems*, vol. 12, pp. 242-249, February 1993. In the past few years, clock skew scheduling has found some adaptation in ASIC design flows. See, C. Leiserson and J. Saxe, "Optimizing synchronous systems," *Journal of VLSI and Computer Systems*, vol. 1, pp. 41-67, January 1983; I. S. Kourtev and E. G. Friedman, *Timing Optimization Through Clock Skew Scheduling*. Norwell, M A: Kluwer Academic Publishers, 2001; C. W. Tsao and C.-K. Koh, "UST/DME: a clock tree router for general skew constraints," in *Digest of Technical Papers of the IEEE/ACM International Conference on Computer-Aided Design*, (San Jose, Calif.), pp. 400-405, November 2000; and J. Xi and W.-M. Dai, "Useful-skew clock routing with gate sizing for low power design," in *Proceedings of the 33rd ACM/IEEE Design Automation Conference*, (Las Vegas, Nev.), pp. 383-388, June 1996. In these applications, clock skew scheduling is applied as a mere post-placement optimization step for improving the cycle time. Most practical tools with the exception of, S. Held, B. Korte, J. Maβberg, M. Ringe, and J. Vygen, "Clock scheduling and clocktree construction for high-performance ASICs," in, *Digest of Technical Papers of the IEEE/ACM International Conference on Computer-Aided Design*, (San Jose, Calif.), pp. 232-239, November 2003, first compute a single clock schedule which is then implemented by the clock tree synthesis step. In S. Held et al., a clock tree synthesizer is presented that accepts ranges of clock latency values provided by the scheduler.

Up until now, clock tree synthesis and clock scheduling have been implemented as two disconnected steps in the design flow. The clock scheduler computes a set of register clock latencies that optimizes the performance for a given design. The computed latencies or intervals of the latencies are implemented by the clock tree synthesizer. Ultimately, both the scheduling step and clock tree synthesis should be combined for globally optimizing the clock tree topology and clock schedule.

Multi-Domain Clock Skew Scheduling

In practice, a clock schedule with large variations of the register latencies generally cannot be realized in a reliable manner. This is because the implementation of dedicated delays using additional buffers and interconnections is highly susceptible to within-die variations of process parameters. As a consequence, the practically applicable maximum differences for the clock arrival times are typically restricted to less than 10% of the clock period, which limits the optimization potential of clock skew scheduling.

Multiple clocking domains are routinely applied in designs to realize several clocking frequencies and also to address specific timing requirements. For example, a special clocking domain that delivers a phase-shifted clock signal to the registers close to the chip inputs and outputs is regularly used to achieve timing closure for ports with extreme constraints on their arrival and required times.

A multi-domain approach could also be used to realize larger clock latency variations for all registers. In combination with a within-domain clock skew scheduling algorithm, they could implement an aggressive sequential optimization that would be impractical with individual delays of register clocks. The motivation behind this approach is based on the fact that large phase shifts between clocking domains can be implemented reliably by using dedicated, possibly expensive circuit components such as "structured clock buffers," K. M. Carrig, "Chip clocking effect on performance for IBM's SA-27E ASIC technology," *IBM Micronews*, vol. 6, no. 3, pp. 12-16, 2000, adjustments to the PLL circuitry, or simply by deriving the set of phase-shifted domains from a higher frequency clock using different tapping points of a shift register.

In current design methodologies, the specification of multiple clocking domains is mostly done manually as no design automation support is available. We have developed a new algorithm for constrained clock skew scheduling which computes for a user-given number of clocking domains the optimal phase shifts for the domain clocks and the assignment of the circuit registers to the domains. See, K. Ravindran, A. Kuehlmann, and E. Sentovich, "Multi-domain clock skew scheduling," in *Digest of Technical Papers of the IEEE/ACM International Conference on Computer-Aided Design*, (San Jose, Calif.), pp. 801-808, November 2003.

For the clock distribution within a domain, the algorithm can assume a zero-skew clock delivery or apply a user-provided upper bound for the within-domain latency. Experiments demonstrate that a clock skew schedule using a few domains combined with a small within-domain latency can reliably implement the full optimization potential of an unconstrained clock schedule.

Our algorithm is based on a branch-and-bound search for the assignment of registers to clocking domains. For every complete assignment of registers to domains, the timing graph is analyzed and the best cycle time is improved if possible. We apply a satisfiability (SAT) solver based on a problem encoding in conjunctive normal form (CNF) to efficiently drive the search and compactly record parts of the solution space that are guaranteed to contain no solutions better than the current one. The combination of a modern SAT solver, M. W. Moskewicz, C. F. Madigan, Y. Zhao, L. Zhang, and S. Malik, "Chaff: Engineering an efficient SAT solver," in *Proceedings of the 38th ACM/IEEE Design Automation Conference*, (Las Vegas, Nev.), pp. 530-535, June 2001, with an underlying orthogonal optimization problem provides a powerful mechanism for a hybrid search that has significant potential for other applications in many domains. More details of the algorithm can be found in, K. Ravindran et al., in *Digest of Technical Papers of the IEEE/ACM International Conference on Computer-Aided Design*, supra.

Experiments indicate that despite the potential complexity of the enumeration process, the multi-domain clock skew scheduling algorithm is efficient for modestly sized circuits and works reasonably fast for circuits with several thousand registers. Our results show that a constrained clock skew schedule with few clocking domains and zero or 5% within-domain latency can in most cases achieve the optimal cycle time dictated by the critical cycle of the circuit. We believe that multi-domain clock skew scheduling provides an important component of an overall clocking solution for the critical design parts.

Figure 24:
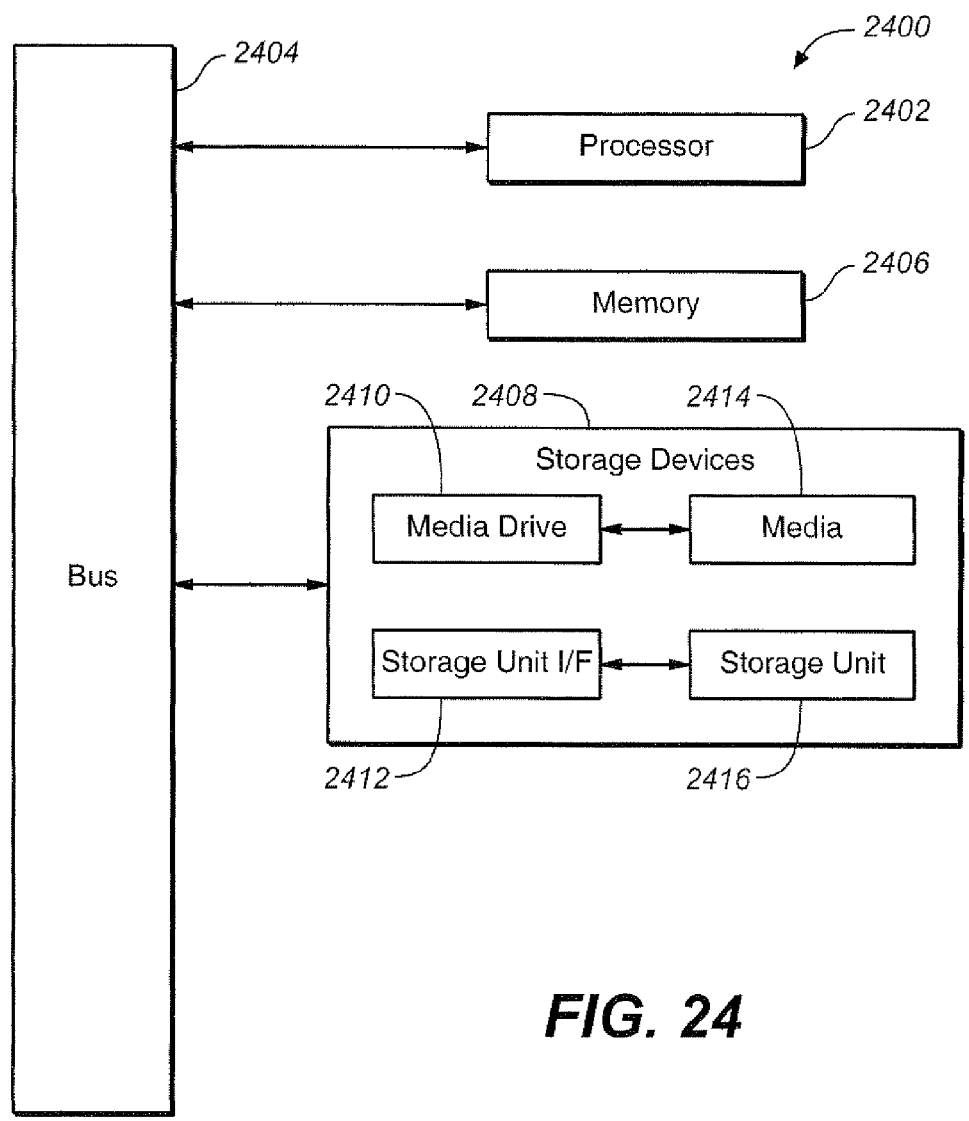
FIG. 24 is an illustrative block level diagram of a computer system that can be programmed to implement processes involved with the optimization of circuit design using sequential timing information in accordance with embodiments of the invention.

FIG. 24 is an illustrative block level diagram of a computer system 2400 that can be programmed to implement processes involved with the optimization of circuit design using sequential timing information in accordance with embodiments of the invention. Computer system 2400 can include one or more processors, such as a processor 2402. Processor 2402 can be implemented using a general or special purpose processing engine such as, for example, a microprocessor, controller or other control logic. In the example illustrated in FIG. 24, processor 2402 is connected to a bus 2404 or other communication medium.

Computing system 2400 also can include a main memory 2406, preferably random access memory (RAM) or other dynamic memory, for storing information and instructions to be executed by processor 2402. Main memory 2406 also may be used for storing temporary variables or other intermediate information during execution of instructions to be executed by processor 2402. Computer system 2400 can likewise include a read only memory ("ROM") or other static storage device coupled to bus 2404 for storing static information and instructions for processor 2402.

The computer system 2400 can also include information storage mechanism 2408, which can include, for example, a media drive 2410 and a removable storage interface 2412. The media drive 2410 can include a drive or other mechanism to support fixed or removable storage media 2414. For example, a hard disk drive, a floppy disk drive, a magnetic tape drive, an optical disk drive, a CD or DVD drive (R or RW), or other removable or fixed media drive. Storage media 2414, can include, for example, a hard disk, a floppy disk, magnetic tape, optical disk, a CD or DVD, or other fixed or removable medium that is read by and written to by media drive 2410. Information storage mechanism 208 also may include a removable storage unit 2416 in communication with interface 2412. Examples of such removable storage unit 2416 can include a program cartridge and cartridge interface, a removable memory (for example, a flash memory or other removable memory module). As these examples illustrate, the storage media 2414 can include a computer useable storage medium having stored therein particular computer software or data.

In this document, the terms "computer program medium" and "computer useable medium" are used to generally refer to media such as, for example, memory 2406, storage device 2408, a hard disk installed in hard disk drive 210. These and other various forms of computer useable media may be involved in carrying one or more sequences of one or more instructions to processor 2402 for execution. Such instructions, generally referred to as "computer program code" (which may be grouped in the form of computer programs or other groupings), when executed, enable the computing system 2400 to perform features or functions of the present invention as discussed herein.

The foregoing description and drawings of preferred embodiment in accordance with the present invention are merely illustrative of the principles of this invention, and that various modifications can be made by those skilled in the art without departing from the scope and spirit of the invention.

The invention claimed is:

1. A circuit design data path optimization method comprising:
  using a computer to perform the acts of:
  determining combinational slack for registers in the circuit design;
  determining sequential slack for at least some of the registers of the design;
  wherein the act of determining includes obtaining a limit upon clock cycle duration applicable to the circuit design; and
  wherein the act of determining further includes determining as the sequential slack, an amount of delay that is not greater than each individual maximal limit of delay for each individual structural cycle of which the respective register is a constituent, based upon a clock cycle duration that is not greater than the obtained limit upon clock cycle duration;

using combinational slack to analyze at least one of an input or an output combinational logic path of a register in the design;
using sequential slack to analyze at least one structural cycle that includes a register in the design; and
optimizing the design based upon the analyses.

2. The method of claim 1,
wherein determining combinational slack for registers in the circuit design includes determining balanced combinational slack for the registers in the circuit design.

3. The method of claim 1,
wherein determining the sequential slack for at least some of the registers of the design includes determining reference cycle dependent sequential slack.

4. The method of claim 1 further including:
obtaining a limit upon clock cycle duration applicable to the circuit design;
wherein determining sequential slack for a register in the design includes determining, from structural cycles in which the register is a constituent, a limit upon addition of structural cycle delay to such structural cycles, based upon a clock cycle duration that is not greater than the obtained limit upon clock cycle duration.

5. The method of claim 1,
wherein using combinational slack to optimize includes determining a combinational logic design alternative that incurs a delay that falls within the combinational slack determined for the register having a fixed latency.

6. The method of claim 1,
wherein using sequential slack to optimize includes using sequential slack to change clock latency of at least one register of the design.

7. The method of claim 1,
wherein using sequential slack to optimize includes determining from among multiple possible design changes, a design change that results in increased sequential slack.

8. The method of claim 1,
wherein determining combinational slack includes determining balanced combinational slack for registers in the circuit design; and further including:
fixing latencies of registers determined to have balanced combinational slack greater than a specified value;
wherein using combinational slack to optimize includes using balanced combinational slack of at least one of an input or an output combinational logic path of a register having a fixed latency;
wherein using sequential slack to optimize includes using sequential slack to optimize at least one structural cycle that includes a register not having a fixed latency.

9. The method of claim 1,
wherein determining combinational slack includes determining balanced combinational slack for registers in the circuit design; and further including:
fixing clock latencies of registers determined to have balanced combinational slack greater than a specified value;
wherein using combinational slack to optimize includes determining a combinational logic design alternative that incurs a delay that falls within the combinational slack determined for the register having a fixed latency;
wherein using sequential slack to optimize includes using sequential slack to change clock latency of at least one register of the design that does not have a fixed latency.

10. An article of manufacture that includes a non-transitory storage device that encoded with computer readable instructions to perform a process comprising:
using a computer to perform the acts of:
determining combinational slack for registers in the circuit design;
determining sequential slack for at least some of the registers of the design;
wherein the act of determining includes obtaining a limit upon clock cycle duration applicable to the circuit design; and
wherein the act of determining further includes determining as the sequential slack, an amount of delay that is not greater than each individual maximal limit of delay for each individual structural cycle of which the respective register is a constituent, based upon a clock cycle duration that is not greater than the obtained limit upon clock cycle duration;
using combinational slack to analyze at least one of an input or an output combinational logic path of a register in the design; and
using sequential slack to analyze at least one structural cycle that includes a register in the design; and
optimizing the design based upon the analyses.

11. The article of manufacture of claim 10 to perform a process further including:
using a computer to perform the acts of:
obtaining a limit upon clock cycle duration applicable to the circuit design;
wherein determining sequential slack for a register includes determining, from structural cycles in which the register is a constituent, a limit upon addition of structural cycle delay to such structural cycles, based upon a clock cycle duration that is not greater than the obtained limit upon clock cycle duration.

12. The article of manufacture of claim 10 to perform a process including:
using a computer to perform the further acts of:
wherein determining combinational slack includes determining balanced combinational slack for registers in the circuit design; and further including:
fixing latencies of registers determined to have balanced combinational slack greater than a specified value;
wherein using combinational slack to optimize includes using balanced combinational slack of at least one of an input or an output combinational logic path of a register having a fixed latency;
wherein using sequential slack to optimize includes using sequential slack to optimize at least one structural cycle that includes a register not having a fixed latency.

13. The article of manufacture of claim 10,
wherein determining combinational slack includes determining balanced combinational slack for registers in the circuit design; and using a computer to perform the further acts of:
fixing clock latencies of registers determined to have balanced combinational slack greater than a specified value;
wherein using combinational slack to optimize includes determining a combinational logic design alternative that incurs a delay that falls within the combinational slack determined for the register having a fixed latency;
wherein using sequential slack to optimize includes using sequential slack to change clock latency of at least one register of the design that does not have a fixed latency.

14. A system that includes processor and a non-transitory storage device that encoded with computer readable instructions to perform a process comprising:
determining combinational slack for registers in the circuit design;

determining sequential slack for at least some of the registers of the design;

wherein the act of determining includes obtaining a limit upon clock cycle duration applicable to the circuit design; and wherein the act of determining further includes determining as the sequential slack, an amount of delay that is not greater than each individual maximal limit of delay for each individual structural cycle of which the respective register is a constituent, based upon a clock cycle duration that is not greater than the obtained limit upon clock cycle duration;

using combinational slack to analyze at least one of an input or an output combinational logic path of a register in the design; and using sequential slack to analyze at least one structural cycle that includes a register in the design; and optimizing the design based upon the analyses.

* * * * *